(12) United States Patent
Ma et al.

(10) Patent No.: US 11,407,770 B2
(45) Date of Patent: Aug. 9, 2022

(54) AMPHIPHOBIC POROUS MATERIALS

(71) Applicants: University of South Florida, Tampa, FL (US); Zhejiang University, Hangzhou (CN)

(72) Inventors: Shengqian Ma, Tampa, FL (US); Feng-Shou Xiao, Hangzhou (CN); Qi Sun, Tampa, FL (US)

(73) Assignees: UNIVERSITY OF SOUTH FLORIDA, Tampa, FL (US); ZHEJIANG UNIVERSITY, Hangzhou (CN)

( * ) Notice: Subject to any disclaimer, the term of this patent is extended or adjusted under 35 U.S.C. 154(b) by 141 days.

(21) Appl. No.: 16/475,711

(22) PCT Filed: Jan. 5, 2018

(86) PCT No.: PCT/US2018/012700
§ 371 (c)(1),
(2) Date: Jul. 3, 2019

(87) PCT Pub. No.: WO2018/129406
PCT Pub. Date: Jul. 12, 2018

(65) Prior Publication Data
US 2019/0345171 A1    Nov. 14, 2019

Related U.S. Application Data

(60) Provisional application No. 62/443,099, filed on Jan. 6, 2017.

(51) Int. Cl.
*C07F 3/06* (2006.01)
*B01J 20/22* (2006.01)
(Continued)

(52) U.S. Cl.
CPC .............. *C07F 3/06* (2013.01); *B01J 20/226* (2013.01); *C08J 9/36* (2013.01); *B01J 20/0244* (2013.01);
(Continued)

(58) Field of Classification Search
CPC ........ C07F 3/06; B01J 20/226; B01J 20/0244; C08J 2300/102; C08J 9/36; C01B 39/52; Y02P 30/00
See application file for complete search history.

(56) References Cited

U.S. PATENT DOCUMENTS

2008/0188677 A1* 8/2008 Schubert ................. C07F 5/069
556/27
2010/0282080 A1* 11/2010 Omary .................. F17C 11/005
95/141
2015/0291870 A1    10/2015 Van Horn et al.

OTHER PUBLICATIONS

Sun et al. Imparting amphiphobicity on single-crystalline porous materials. Nature Communications | 7:13300 | DOI: 10.1038/ncomms13300 (Year: 2016).*

(Continued)

*Primary Examiner* — Michael M Dollinger
*Assistant Examiner* — Christina H. W. Rosebach
(74) *Attorney, Agent, or Firm* — Quarles & Brady LLP

(57) ABSTRACT

A variety of amphiphobic porous materials are provided. The materials can include a variety of porous frameworks that have an outer surface functionalized by a plurality of perfluoroalkyl moieties. By careful selection of appropriate perfluoralkyl moieties, hydrophobic properties can be imparted to the exterior surface of the porous materials without significantly impacting the wetting properties of the porous interior. This can be used to create a variety of highly amphiphobic porous materials. Methods of making and using the amphiphobic porous materials are also provided.

16 Claims, 37 Drawing Sheets

Amphiphilic MOFs

Amphiphobic MOFs

(51) Int. Cl.
C08J 9/36 (2006.01)
B01J 20/02 (2006.01)
C01B 39/52 (2006.01)
(52) U.S. Cl.
CPC ......... C01B 39/52 (2013.01); C08J 2300/102 (2013.01); Y02P 30/00 (2015.11)

(56) References Cited

OTHER PUBLICATIONS

Q.Sun; H. He; W-Y. Gao;, B. Aguila; L. Wojtas; Z. Dai; J. Li; Y-S. Chen; F-S. Xiao; S. Ma.Imparting amphiphobicity on single-crystalline porous materials. Nature Communications. 7:13300. Published Oct. 31, 2016. (Year: 2016).*
J. Kujawa; S. Cerneaux; W. Kujawski; M. Bryjak; J. Kujawski. How To Functionalize Ceramics by Perfluoroalkylsilanes for Membrane Separation Process? Properties and Application of Hydrophobized Ceramic Membranes. ACS Appl. Mater. Interfaces 2016, 8, 7564-7577 (Year: 2016).*
H. Bellanger; T. Darmanin; F. Guittard. Surface Structuration (Micro and/or Nano) Governed by the Fluorinated Tail Lengths toward Superoleophobic Surfaces. Langmuir2012, 28, 186-192 (Year: 2012).*
"Superhydrophobic and Oleophobic Surfaces" by Biolin Scientific. Available at https://www.biolinscientific.com/functional-surfaces/superhydrophobic-and-oleophobic-surfaces. Accessed Jan. 12, 2022. (Year: 2022).*
International Search Report and Written Opinion issued in PCT/US2018/012700 dated Feb. 28, 2018.
Sun, et al., "Imparting amphiphobicity on single-crystalline porous materials." Nature Communications, 2016, 1:13300, doi:10.1038/ncomms13300.
Park, et al., "Exceptional chemical and thermal stability of zeolitic imidazolate frameworks" PNAS, 2006, 103(27), pp. 10186-10191.
Quan Xu et al., "Robust self-cleaning and micromanipulation capabilities of gecko spatulae and their bio-mimics", Nature Communications 6, 8949 (2015), pp. 1-9.
Zhongxin Xue, "A Novel Superhydrophilic and Underwater Superoleophobic Hydrogel-Coated Mesh for Oil/Water Separation", Advanced Materials. 2011, 23, 4270-4273.
Seung Jae Yang, et al., "Preparation of Highly Moisture-Resistant Black-Colored Metal Organic Frameworks", Advanced Materials. 2012, 24, 4010-4013.
Yao, Jianfeng, et al., "Zeolitic imidazolate framework composite membranes and thin films: synthesis and applications, Chemical Society Reviews"., 2014, 43, 4470-4493.
Chi Yang et al., "Fluorous MetalOrganic Frameworks with Superior Adsorption and Hydrophobic Properties toward Oil Spill Cleanup and Hydrocarbon Storage", Journal of the American Chemical Society, 2011, 133, 18094-18097.
Jie-Peng Zhang, "Metal Azolate Frameworks: From Crystal Engineering to Functional Materials", Chem. Rev. 2012, 112, 1001-1033.
Wang Zhang, et al., "A Facile and General Coating Approach to Moisture/Water-Resistant Metal-Organic Frameworks with Intact Porosity", J. Am Chem. Soc. 2014, 136, 16978-16981.
Zhenjie Zhang et al., "Polymer-Metal-Organic Frameworks (polyMOFs) as Water Tolerant Materials for Selective Carbon Dioxide Separations", J. Am. Chem. Soc. 2016, 138, 920-925.
Chaoqun Zhang et al., "Nano/Micro-Manufacturing of Bioinspired Materials: a Review of Methods to Mimic Natural Structures", Adv. Mater. 2016, 28, 6292-6321.
Jingmin Zhou et al., "A Bimetallic Lanthanide Metal-Organic Material as a Self-Calibrating Color-Gradient Luminescent Sensor", Adv Mater 2015, 27, 7072-7077.
Yuxiu Sun et al., "A molecular-level superhydrophobic external surface to improve the stability of metal-organic frameworks", J. Mater. Chem. A, 2017, 5, 18770-18776.

Qi Sun et al., "Superhydrophobicity:ConstructingHomogeneous CatalystsintoSuperhydrophobicPorousFrameworks to Protect Them from Hydrolytic Degradation", Chem 1, 628-639, Oct. 13, 2016.
Bellanger et al., "Chemical and Physical Pathways for the Preparation of Superoleophobic Surfaces and Related Wetting Theories", 2014 American Chemical Society, Chem. Rev. 2014, 114, 2694-2716.
Burtch et al., "Water Stability and Adsorption in Metal-Organic Frameworks", Chemical Reviews 2014, 114, 20, 10575-10612.
Carné-Sánchez, et al.,Protecting Metal-Organic Framework Crystals from Hydrolytic Degradation by Spray-Dry Encapsulating Them into Polystyrene Microspheres, Adv. Mater. 2015, 27, 869-873.
Chen et al., "Superhydrophobic perfluorinated metal-organic frameworks", The Royal Society of Chemistry 2013, Chem. Commun., https://doi.org/10.1039/C3CC41564C, 2013, 49, 6846-6848.
Chen et al., "Thermally robust and porous noncovalent organic framework with high affinity for fluorocarbons and CFCs", Nat Commun 5, 5131 (2014). https://doi.org/10.1038/ncomms6131, pp. 1-8.
Chen et al., "Mesoporous Fluorinated Metal-Organic Frameworks with Exceptional Adsorption of Fluorocarbons and CFCs", Angew Chem Int Ed 2015, 54, 13902-13906.
Darmanin et al., "Superhydrophobic Surfaces by Electrochemical Processes", wileyonlinelibrary.com, Adv. Mater. 2013, 25, 1378-1394.
Decoste et al.,"Metal-Organic Frameworks for Air Purification of Toxic Chemicals", Chem. Rev. 2014, 114, 11, 5695-5727, Publication Date:Apr. 21, 2014, https://doi.org/10.1021/cr4006473.
DeCoste et al., Enhanced Stability of Cu-BTC MOF via Perfluorohexane Plasma-Enhanced Chemical Vapor Deposition, J. Am. Chem. Soc. 2012, 134, 3, 1486-1489.
Deria et al, Perfluoroalkane Functionalization of NU-1000 via Solvent-Assisted Ligand Incorporation: Synthesis and CO2 Adsorption Studies, J. Am. Chem. Soc. 2013, 135, 16801-16804.
Furukawa et al,The Chemistry and Applications of Metal-Organic Frameworks, Science 341, 1230444 (2013). DOI: 10.1126/science.1230444.
Hayase et al., "A Superamphiphobic Macroporous Silicone Monolith with Marshmallow-like Flexibility", Angew. Chem. Int. Ed. 2013, 52, 10788-10791.
Hu et al, "Luminescent metal-organic frameworks for chemical sensing and explosive detection", Chem. Soc. Rev., 2014, 43, 5815-5840.
Hu et al., "Microporous metal-organic framework with dual functionalities for highly efficient removal of acetylene from ethylene/acetylene mixtures", Nat Commun 6, 7328 (2015). https://doi.org/10.1038/ncomms8328, pp. 1-9.
Huang et al., "Polydimethylsiloxane Coating for a Palladium/MOF Composite: Highly Improved Catalytic Performance by Surface Hydrophobization", Angew. Chem. Int. Ed. 2016, 55, 7379-7383.
Ionov et al., "Smart Microfluidic Channels**", Adv. Funct. Mater. 2006, 16, 1153-1160.
James et al., "Metal-organic frameworks", Chem. Soc. Rev., 2003, 32, 276-288.
Jayaramulu et al., "Biomimetic Superhydrophobic/Superoleophilic Highly Fluorinated Graphene Oxide and ZIF-8 Composites for Oil-Water Separation", Angew. Chem. Int. Ed. 2016, 55, 1178-1182.
Kitagawa et al., "Metal-Organic Frameworks (MOFs)", Chem. Soc. Rev., 2014, 43, 5415-5418.
Kota et al., "Hierarchically Structured Superoleophobic Surfaces with Ultralow Contact Angle Hysteresis", Adv. Mater. 2012, 24, 5838-5843.
Li et al., "Platinum-nickel frame within metal-organic framework fabricated in situ for hydrogen enrichment and molecular sieving", Nat Commun 6, 8248 (2015). https://doi.org/10.1038/ncomms9248.
Li et al., "What do we need for a superhydrophobic surface? A review on the recent progress in the preparation of superhydrophobic surfaces", Chem. Soc. Rev., 2007, 36, 1350-1368.
Liao et al.,"Efficient purification of ethene by an ethane-trapping metal-organic framework", Nat Commun 6, 8697 (2015). https://doi org/10.1038/ncomms9697.
Liu et al.,"Applications of metal-organic frameworks in heterogeneous supramolecular catalysis", Chem. Soc. Rev., 2014, 43, 6011-6061.

(56) References Cited

OTHER PUBLICATIONS

Liu et al.,"Bioinspired Design of a Superoleophobic and Low Adhesive Water/Solid Interface", Adv. Mater. 2009, 21, 365-669.

Liu et al., "Bioinspired Super-antiwetting Interfaces with Special Liquid-Solid Adhesion", cc. Chem. Res. 2010, 43, 3, 368-377, Publication Date:Dec. 2, 2009.

Ma et al., "Gas storage in porous metal-organic frameworks for clean energy applications", Chem. Commun., 2010, 46, 44-53.

McDonald et al.,"Cooperative insertion of $CO_2$ in diamineappended metal-organic frameworks", Nature 519, 303-308 (2015). https://doi org/10.1038/nature14327.

McGuire et al.,"The surface chemistry of metal-organic frameworks", Chem. Commun., 2015, 51, 5199-5217.

Mo et al., "A Homochiral Metal-Organic Framework as an Effective Asymmetric Catalyst for Cyanohydrin Synthesis", J. Am. Chem. Soc. 2014, 136, 1746-1749.

Morris et al., "Crystals as Molecules: Postsynthesis Covalent Functionalization of Zeolitic Imidazolate Frameworks", J. Am. Chem. Soc. 2008, 130, 12626-12627.

Mottillo et al., "Carbon Dioxide Sensitivity of Zeolitic Imidazolate Frameworks", Angew. Chem. Int. Ed. 2014, 53, 7471-7474.

Nguyen et al., "Moisture-Resistant and Superhydrophobic Metal-Organic Frameworks Obtained via Postsynthetic Modification", J. Am. Chem. Soc. 2010, 132, 4560-4561.

Padial et al., "Highly Hydrophobic Isoreticular Porous Metal-Organic Frameworks for the Capture of Harmful Volatile Organic Compounds", https://doi.org/10.1002/anie.201303484, Angew Chem Int Ed 2013, 52, 8290-8294.

Pan et al.,"Superomniphobic Surfaces for Effective Chemical Shielding", J. Am. Chem. Soc. 2013, 135, 578-581.

Park et al., "Cation-Dependent Intrinsic Electrical Conductivity in Isostructural Tetrathiafulvalene-Based Microporous Metal-Organic Frameworks", J Am. Chem. Soc 2015, 137, 1774-1777.

Peng et al., "Engineering chiral porous metal-organic frameworks for enantioselective adsorption and separation", Nat Commun 5, 4406 (2014). https://doi.org/10.1038/ncomms5406, pp. 1-9.

Pera-Titus et al.,"Porous Inorganic Membranes for $CO_2$ Capture: Present and Prospects", Chem. Rev. 2014, 114, 1413-1492.

Phan et al., Synthesis, Structure, and Carbon Dioxide Capture Properties of Zeolitic Imidazolate Frameworks, Accounts of Chemical Research 58-67 Jan. 2010 vol. 43, No. 1.

Rabone et al.,"An Adaptable Peptide-Based Porous Material", Science Aug. 27, 2010: vol. 329, Issue 5995, pp. 1053-1057.

Rao et al., "Design of Superhydrophobic Porous Coordination Polymers through the Introduction of External Surface Corrugation by the Use of an Aromatic Hydrocarbon Building Unit", Angew Chem. Int. Ed. 2014, 53, 8225 -8230.

Saha et al., "Photocatalytic Metal-Organic Framework from CdS Quantum Dot Incubated Luminescent Metallohydrogel", J. Am Chem. Soc. 2014, 136, 14845-14851.

Serre et al., "Superhydrophobicity in Highly Fluorinated Porous Metal-Organic Frameworks", Angew. Chem. Int. Ed. 2012, 51, 6048-6050.

Stavila et al., "MOF-Based Electronic and Opto-Electronic Devices", Chem. Soc. Rev., 2014, 43, 5994-6010.

Su et al., "Bioinspired Interfaces with Superwettability: From Materials to Chemistry" J. Am. Chem. Soc. 2016, 138, 1727-1748.

Suh et al., "Hydrogen Storage in MetalOrganic Frameworks", Chem. Rev. 2012, 112, 782-835.

Tuteja et al., "Designing Superoleophobic Surfaces", Dec. 7, 2007 vol. 318 Science www.sciencemag.org Reports, http://science.sciencemag.org/ on Jun. 11, 2020, pp. 1618-1623.

Van de Voorde et al., "Adsorptive separation on metal-organic frameworks in the liquid phase", Chem. Soc. Rev., 2014, 43, 5766-5788.

Wang et al., "Directing the Formation of Vinyl-Functionalized Silica to the Hexagonal SBA-15 or Large-Pore Ia3d Structure", Chem. Mater. 2003, 15, 5029-5035.

Liu, H.; Guo, P.; Regueira, T.; Wang, Z.; Du, J. & Chen, G. Irreversible change of the pore structure of ZIF-8 in carbon dioxide capture with water coexistence. J. Phys. Chem. C 120, 13287-13294 (2016).

Tanabe, K. K. & Cohen, S. M. Postsynthetic modification of metal-organic frameworks—a progress report. Chem. Soc. Rev. 40, 498-519 (2011).

\* cited by examiner

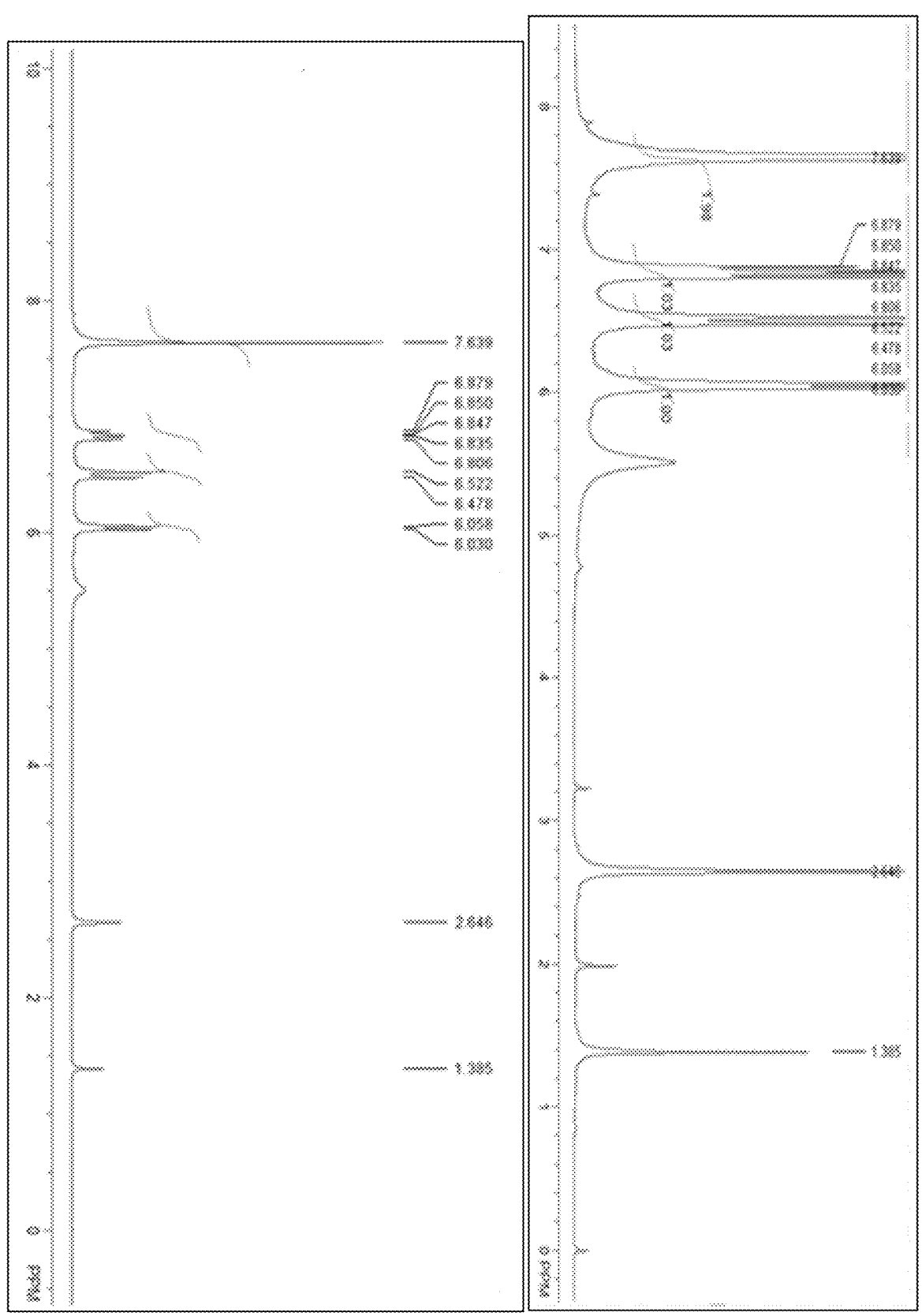
FIG. 9A                    FIG. 9B

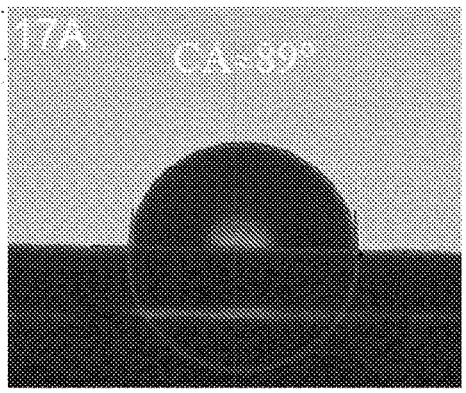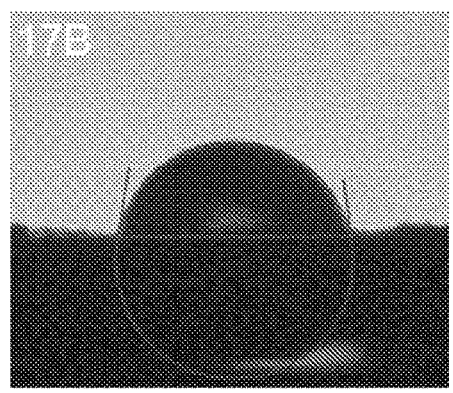
FIGS. 17A-17B
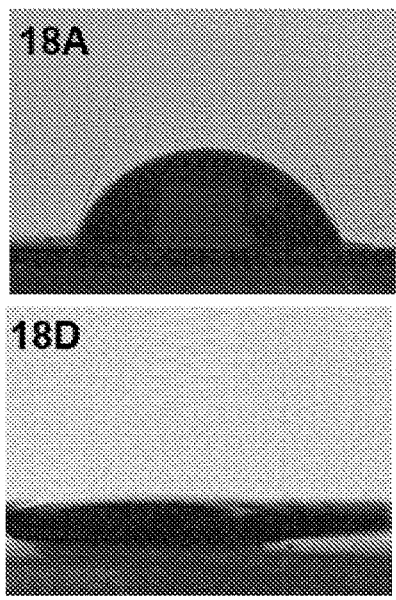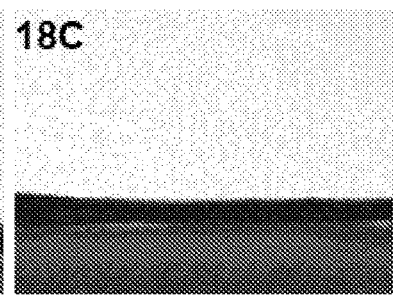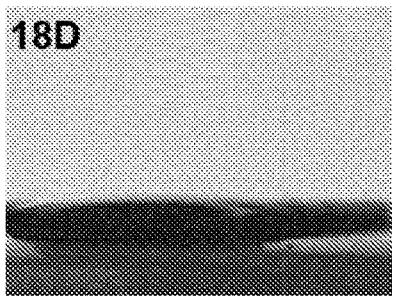
FIGS. 18A-18E

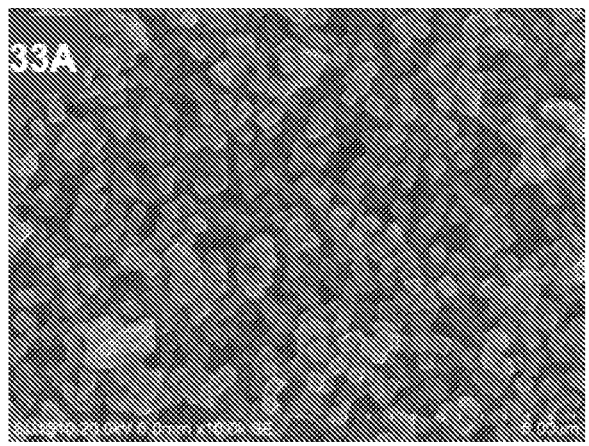
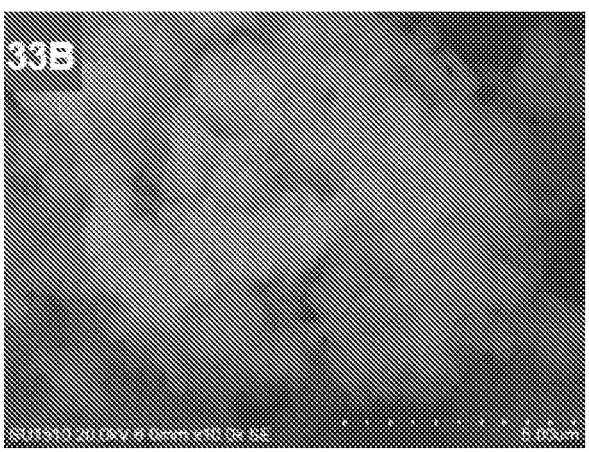
FIGS. 33A-33B
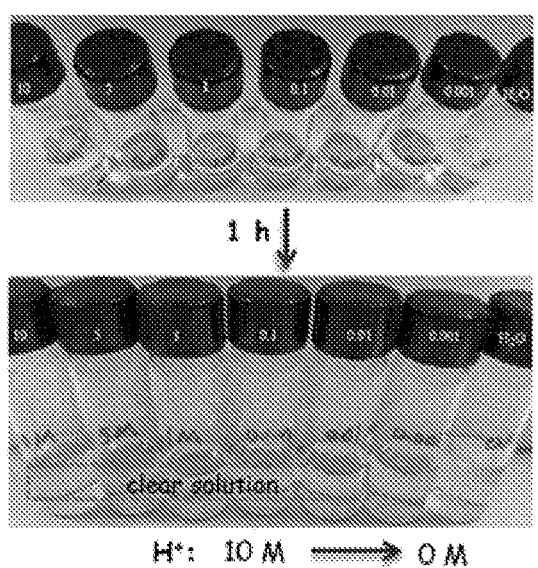
FIG. 34

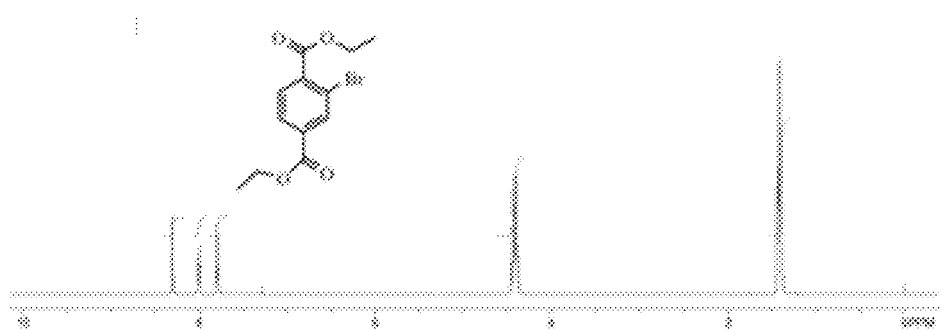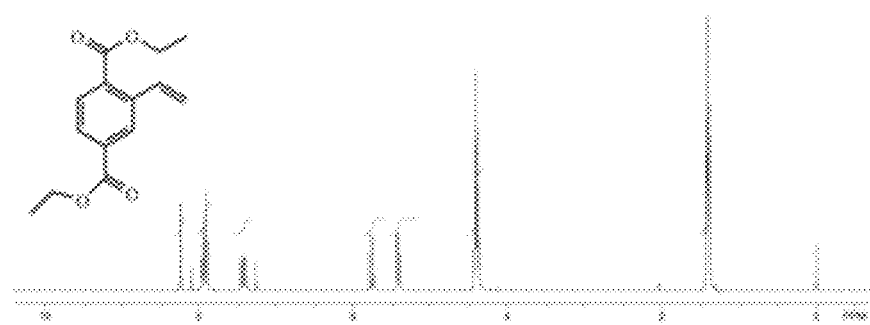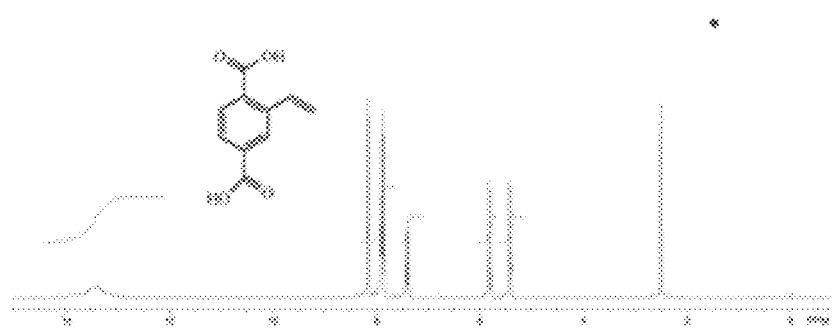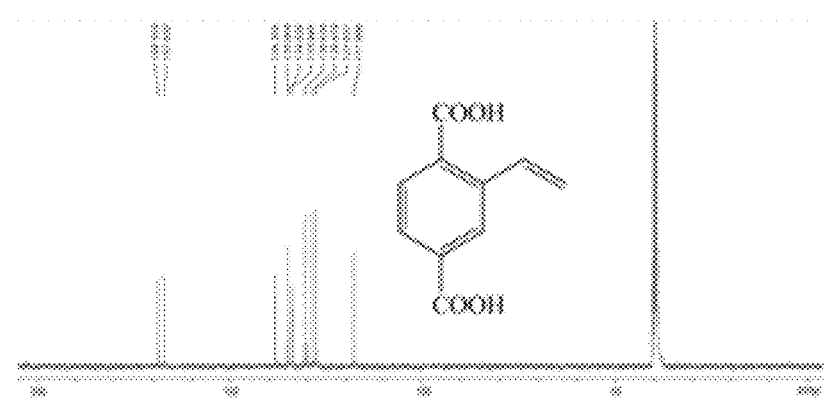
FIG. 43

AMPHIPHOBIC POROUS MATERIALS

CROSS-REFERENCE TO RELATED APPLICATIONS

This application is the 35 U.S.C. 371 national stage application of PCT Application No. PCT/US2018/012700 entitled "AMPHIPHOBIC POROUS MATERIALS", filed Jan. 5, 2018, which claims priority to, and the benefit of, U.S. provisional application entitled "AMPHIPHOBIC POROUS MATERIALS" having Ser. No. 62/443,099, filed Jan. 6, 2017, the contents of both of which are incorporated by reference in their entireties.

STATEMENT REGARDING FEDERALLY SPONSORED RESEARCH OR DEVELOPMENT

This invention was made with government support DMR1352065 awarded by the National Science Foundation. The Government has certain rights in the invention.

TECHNICAL FIELD

The present disclosure generally relates to porous materials and methods of making and using thereof.

BACKGROUND

The custom design of surfaces with controlled wettability properties has been attracting continuous attention from both academia and industry (Liu, et al., Acc. Chem. Res. 43, 368-377, 2010; Darmanin, et al., Adv. Mater. 25, 1378-1394, 2013; Li, Chem. Soc. Rev. 36, 1350-1368, 2007; Zhang, et al., Adv. Mater. 28, 6292-6321, 2016; Su, et al., J. Am. Chem. Soc. 138, 1727-1748, 2016; Xu, et al., Nat. Commun. 6, 8949, 2015; Huang, et al., Angew. Chem. Int. Ed. 55, 7379-7383, 2016). In particular, amphiphobic surfaces that repel water and compounds with low surface tension (oils, for example) are of great interest due to their various prospective applications, such as oil transportation, microfluidics, and nano-object manipulation (Bellanger, et al., Chem. Rev. 114, 2694-2716, 2014; Pan, et al., J. Am. Chem. Soc. 135, 578-581, 2013; Tuteja, et al., Science 318, 1618-1622, 2007; Kota, et al., Adv. Mater. 21, 665-669, 2009; Liu, et al., Adv. Mater. 21, 665-559, 2009; Xue, et al., Adv. Mater. 23, 4270-4273, 2011; Ionoy, et al., Adv. Funct. Mater. 16, 1153-1160, 2006; Xu, et al., Angew. Chem. Mt. Ed. 54, 4527-4530, 2015). Albeit tremendous efforts have been devoted to creating such amphiphobic surfaces on a variety of substrates over the past several years, the impartment of amphiphobicity on porous materials, specifically single crystalline, has not yet been explored (Bellanger, et al., Chem. Rev. 114, 2694-2716, 2014; Pan, et al., J. Am. Chem. Soc. 135, 578-581, 2013; Tuteja, et al., Science 318, 1618-1622, 2007; Kota, et al., Adv. Mater. 21, 665-669, 2009; Liu, et al., Adv. Mater. 21, 665-559, 2009)

As an emerging class of porous materials with high single crystallinity, metal-organic frameworks (MOFs) which feature amenability to design, high surface areas, tunable pore sizes, tailorable functionality, have recently been extensively investigated for applications in gas storage, separation, carbon capture, catalysis, sensing, and so on (Zhou, et al., Chem. Soc. Rev. 43, 5415-5418, 2014; James, et al., Chem, Soc, Rev. 32, 276-288, 2003; Furukawa, et al., Science 341, 1230444, 2013; Ma, et al., Chem. Commun. 46, 44-53, 2010; Suh, et al., Chem. Rev. 112, 782-835, 2011; Hu, et al., Nat. Commun. 6, 7328, 2015; Liao, et al., Nat. Commun. 6, 8697, 2015; McDonald, et al., Nature 519, 303-308, 2015; Rabone, et al., Science 329, 1053-1057, 2010; Liu, et al., Chem. Soc. Rev. 43, 6011-6061, 2014; Saha, et al., J. Am. Chem. Soc. 136, 14845-14851, 2014; Mo, et al., J. Am. Chem. Soc. 136, 1746-1749, 2014; Li, et al., Nat. Commun. 6, 8248, 2015; Zhou, et al., Adv. Mater. 27, 7072-7077, 2015; Hu, et al., Chem. Soc. Rev. 43, 5815-5840, 2014; Peng, et al., Nat. Commun. 5, 4406, 2014; Van de Voorde, et al., Chem. Soc. Rev. 43, 5766-5788, 2014; Stavila, et al., Chem. Soc. Rev. 43, 5994-6010, 2014; Park, et al., J. Am. Chem. Soc. 137, 1774-1777, 2015). However, an issue for their wide applications in practice includes the performance under a variety of environments (e.g. stability in humid conditions, interferences by organic vapors in the atmosphere), which necessitate the sophisticated control of the surface wettability of MOFs (Yao, et al., Chem. Soc. Rev. 43, 4470-4493, 2014; Pera-Titus, et al., Chem. Rev. 114, 1413-1492, 2014; DeCoste, et al., Chem. Rev. 114, 5695-5727, 2014; Burtch, et al., Chem. Rev. 114, 10575-10612, 2014). Recent studies indicate the observation of framework degradation upon the exposure of MOFs to wet $CO_2$, even for those claimed with moisture stability (Mottillo, et al., Angew. Chem. Mt. Ed. 53, 7471-7474, 2014; Liu, et al., J. Phys. Chem. C 120, 13287-13294, 2016). To repel water molecules, thereby protecting MOFs against hydrolysis while preserving crystallinity and intact porosity, some approaches have been developed to impart hydrophobicity/super-hydrophobicity on the exterior surfaces of MOFs (Decoste, et al., J. Am. Chem. Soc. 134, 1486-1489, 2012; Came-Sanchez, et al., Adv. Mater. 27, 869-873, 2015; Tanabe, et al., Chem. Soc. Rev. 40, 498-519, 2011; Nguyen, et al., J. Am. Chem. Soc. 132, 4560-4561, 2010; McGuire, et al., Chem. Commun. 51, 5199-5217, 2015; Yang, et al., Adv. Mater. 24, 4010-4013, 2012; Jayaramulu, et al., Angew. Chem. Mt. Ed. 55, 1178-1182, 2016; Deria, et al., J. Am. Chem. Soc. 135, 16801-16804, 2013; Came-Sanchez, et al., Adv. Mater. 27, 869-873, 2015; Rao, et al., Angew. Chem. Mt. Ed. 53, 7471-7474, 2014; Chen, et al., Nat. Commun. 5, 5131, 2014; Chen, et al., Chem. Commun. 49, 6846-6848, 2013; Chen, et al., Angew. Chem. Mt. Ed. 54, 13902-13906, 2015; Zhang, et al., J. Am. Chem. Soc. 138, 920-925, 2016). e.g. Jiang and co-workers recently developed a facile yet general coating approach to modify hydrophobic polydimethysiloxane on the surfaces of MOF materials, which exhibited significant enhancement in moisture/water stability (Zhang, et al., J. Am. Chem. Soc. 136, 16978-16891, 2014). However, some environments coexist with water and organic compounds. Therefore amphiphobicity is needed to repel both water and organic molecules to prevent the water attack while minimizing the interferences by organic compounds. Nonetheless, amphiphobic MOFs have not yet been achieved despite their intriguing properties and attractive potentials for a variety of applications (Xue, et al., Adv. Mater. 23, 4270-4273, 2011; Ionov, et al., Adv. Funct. Mater. 16, 1153-1160, 2006; Xu, et al., Angew. Chem. Int. Ed. 54, 4527-4530, 2015).

There remains a need for improved porous materials that overcome the aforementioned deficiencies.

SUMMARY

A variety of amphiphobic porous materials are provided. A variety of methods are provided such that porous materials can be readily functionalized to impart amphiphobic properties. In some aspects, the amphiphobic porous materials include a porous framework comprising a metal organic framework, wherein the metal organic framework including a plurality of ligands having a structure according to one of the following formulas

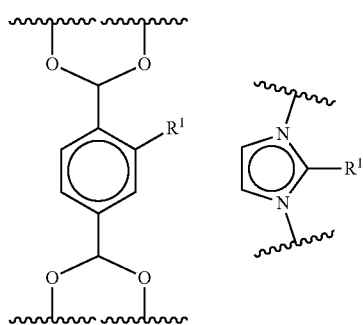

where

represents a bond to a metal atom, and where each occurrence of $R^1$ is either H, alkyl, alkenyl, perfluoroalky, partially fluorinated alkyl, perfluorothioalkyl, or partially fluorinated thioalkyl so long as at least some of the $R^1$ comprise a perfluoroalky, partially fluorinated alkyl, perfluorothioalkyl, or partially fluorinated thioalkyl; and an outer surface of the porous framework, wherein the perfluoroalky, partially fluorinated alkyl, perfluorothioalkyl, or partially fluorinated thioalkyl are located on the outer surface. In some aspects, at least some of the $R^1$ have a structure according to $R^2$; wherein $R^2$ is —$R^3SR^4$, where $R^3$ is none or an alkyl, and $R^4$ is a perfluoroalkyl or partially fluorinated alkyl; and wherein the $R^2$ are located on the outer surface. In some aspects, $R^3$ is a $C_2$-$C_6$ alkyl, and $R^4$ is a $C_6$-$C_{12}$ perfluoroalkyl or partially fluorinated alkyl.

In some aspects, amphiphobic porous materials are provided having a porous framework having an outer surface, the outer surface with a plurality of perfluoroalkyl moieties covalently attached to the outer surface. The porous framework can be a metal organic framework comprising a plurality of metal atoms and a plurality of organic ligands coordinating the metal atoms to form the porous framework. The organic ligands can include or di-carboxylic acid ligands, tri-carboxylic acid ligands, azole ligands, and a combination thereof. The organic ligands can be di-carboxylic acid ligands selected from the group consisting of oxalic acid, malonic acid, succinic acid, glutaric acid, phthalic acid, isopthalic acid, terepthalic acid, and other straight chain-chain and branched-chain di-carboxylic acid ligands having from about 7 to 15 carbon atoms. The organic ligands can be tri-carboxylic acid ligands selected from the group consisting of citric acid, isocitric acid, aconitic acid, propane-1,2,3-tricarboxylic acid, trimesic acid, and other straight-chain and branched-chain tri-carboxylic acids having from 7 to 15 carbon atoms. The organic ligands can be azole ligands selected from the group consisting imidazole, 1,2,3-Triazole, 1,2,4-Triazole, pyrrodiazole, oxadiazole, thiadiazole, and other azole ligands having from about 2 to 7 carbon atoms. The atoms can be selected from the group consisting of Mg, Ca, Ba, Pb, Sn, Zr, Ti, Hf, Cr, Ni, Al, V, Sc, Ga, In, Zn, Cu, Ni, Fe, Mn, Cd, Ag, Y, La, Pr, Eu, Gd, Tb, Dy, Ho, Er, Yb, and a combination thereof. The amphiphobic porous material can have a surface area from about 100 $m^2/g$ to about 7,000 $m^2/g$. The amphiphobic porous material can have a pore volume from about 0.3 $cm^3/g$ to 1.3 $cm^3/g$.

In some aspects, the porous framework is a porous organic polymer. The porous organic polymer can have a surface area from 20 m2/g to 8,000 m2/g. The porous organic polymer can have a pore size from 5 angstroms to 500 angstroms. The porous organic polymer can be selected from the group consisting of a conjugated microporous polymer, a porous aromatic framework, a porous polymer network, and a porous organic framework. The porous organic polymer can include one or more reactive coupling groups capable of reacting with a second functional group on the prefluoroalkyl moieities to form a covalent bond.

In some aspects, each of the organic ligands comprise one or more reactive coupling groups capable of reacting with a second functional group on the prefluoroalkyl moieities to form a covalent bond. The reactive coupling groups can be primary amines and the second functional groups are selected from the group consisting of amine-reactive linking groups such as isothiocyanates, isocyanates, acyl azides, NHS esters, sulfonyl chlorides, aldehydes, glyoxals, epoxides, oxiranes, carbonates, aryl halides, imidoesters, carbodiimides, anhydrides, and fluorophenyl esters. The reactive coupling groups can be thiol groups and the second functional groups are selected from the group consisting of sulfhydryl reactive groups such as maleimides, haloacetyls, and pyridyl disulfides. The reactive coupling groups can be photoreactive coupling groups such as aryl azides or diazirines. The reactive coupling groups can be alkenes that reacted with a thiol on the perfluoroalkyl moieties to form a covalent bond.

The amphiphobic porous materials can demonstrate a contact angle of greater than about 90° for water and organic solvents such as glycerol, 2-hydroxybenzaldehyde, benzonitrile, chlorobenzene, and dodecane. The outer surface of the amphiphobic porous material can demonstrate a contact angle of greater than about 160° for water.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 3A) PXRD patterns, (FIG. 3B) $N_2$ sorption isotherms measured at 77 K, (FIG. 3C) SEM image of ZIF-8-V, (FIG. 3D) SEM image of ZIF-8-VF, (FIG. 3E)$^{19}$F MAS NMR curves, (FIG. 3F) XPS spectra of ZIF-8-VF before and after surface $Ar^+$ ions etching (* side band).

FIG. 4A shows the contact angles of various liquid on the pressed pellet made using ZIF-8-VF sample. FIG. 4B shows water adsorption (solid symbols) and desorption (open symbols) isotherms collected at 298 K. FIG. 4C shows toluene adsorption isotherms collected at 298 K.

FIG. 5A and FIG. 5D show selected PXRD patterns of ZIF-8 and ZIF-8-VF aging under 1 atm of water saturated $CO_2$ at 45° C. for different duration times. FIG. 5B and FIG. 5C show SEM images of ZIF-8 before and after aging under the above conditions for 240 h. FIGS. 5E-5F show SEM images of ZIF-8-VF before and after aging under the above conditions for 720 h. Main peaks of unknown crystalline phase are marked with black arrows.

FIG. 6A and FIG. 6E show selected PXRD patterns of MOF-5 and MOF-5-VF aging under 1 atm of water saturated $CO_2$ at 45° C. for different duration times. FIGS. 6B-6C show SEM images and FIG. 6D shows $N_2$ sorption isotherms of MOF-5 before and after aging under the above conditions for 4 h. FIGS. 6F-6G show SEM images and $N_2$ sorption isotherms of MOF-5-VF before and after aging under the above conditions for 168 h. FIG. 6H shows $N_2$ sorption isotherms of MOF-5-VF before and after aging under the above conditions for 4 h.

(FIG. 8A) $^1$H NMR, and (FIG. 8B) $^{13}$C NMR spectra of 2-vinyl-imidazole.

FIGS. 9A-9B show liquid NMR spectra of digested ZIF-8-V sample (FIG. 9A) and corresponding enlarged spectrum (FIG. 9B). $^1$H NMR spectrum of the digested sample displayed the same relative integrated peak intensities compared with that of the as-synthesized 2-vinyl-imidazole linkers, although, some chemical shift, stemming from the protonation of imidazole ring by DCl, was observed. These results indicate that 2-vinyl-imidazole linkers are stable under the synthetic conditions of ZIF-8-V.

(FIG. 11A) 1H,1H,2H,2H-perfluorodecanethiol compound, and (FIG. 11B) digested ZIF-8-VF sample. The chemical shift of F species in the digested ZIF-VF sample are similar to that of the 1H,1H,2H,2H-perfluorodecanethiol compound.

FIGS. 17A-17B show contact angles of water on the pressed pellet of (FIG. 17A) ZIF-8-V and (FIG. 17B) ZIF-8.

FIGS. 18A-18E show contact angles of various organic compounds on the pressed pellet of ZIF-8-V. (FIG. 18A) glycerol, (FIG. 18B) 2-hydroxybenzaldehyde, (FIG. 18C) benzonitrile, (FIG. 18D) chlorobenzene, and (FIG. 18E) dodecane.

(FIG. 19A) activated ZIF-8, and (FIG. 19B) ZIF-8 after aging at 100% relative humidity and 45° C. under $CO_2$ for 10 d. The sharp decrease of the BET surface area (from 957 m$^2$/g to 378 m$^2$/g) indicates the structural decomposition of the ZIF-8 sample after long-term exposure to humidified $CO_2$.

(FIG. 29A) water, (FIG. 29B) glycerol, (FIG. 29C) 2-hydroxybenzaldehyde, (FIG. 29D) benzonitrile, (FIG. 29E) chlorobenzene, and (FIG. 29F) dodecane.

(FIG. 30A) water, (FIG. 30B) glycerol, (FIG. 30C) 2-hydroxybenzaldehyde, (FIG. 30D) benzonitrile, (FIG. 30E) chlorobenzene, and (FIG. 30F) dodecane.

(FIG. 32A) 60% relative humidity, (FIG. 32B) water, and (FIG. 32C) 100% relative humidity and 45° C. under $CO_2$. These results indicate that MOF-5-V is moisture sensitive.

FIGS. 33A-33B show SEM images of MOF-5-V. (FIG. 33A) before and (FIG. 33B) after aging under 1 atm of water saturated $CO_2$ at 45° C. for 24 h.

FIG. 34 shows stability tests of ZIF-8-V in acid solutions. Photos of ZIF-8-V crystals in various $H_2SO_4$ aqueous solutions with $H^+$ concentration from 10 M to 0 M. The ZIF-8-V crystals were digested within 1 h in the acid solutions with $H^+$ concentration higher than 0.01 M. PXRD studies indicate that ZIF-8-V can survive in acid solutions with $H^+$ concentration lower than 0.001 M for at least 7 days.

FIG. 43 shows liquid NMR spectra of various compounds.

DETAILED DESCRIPTION

Figure 1:
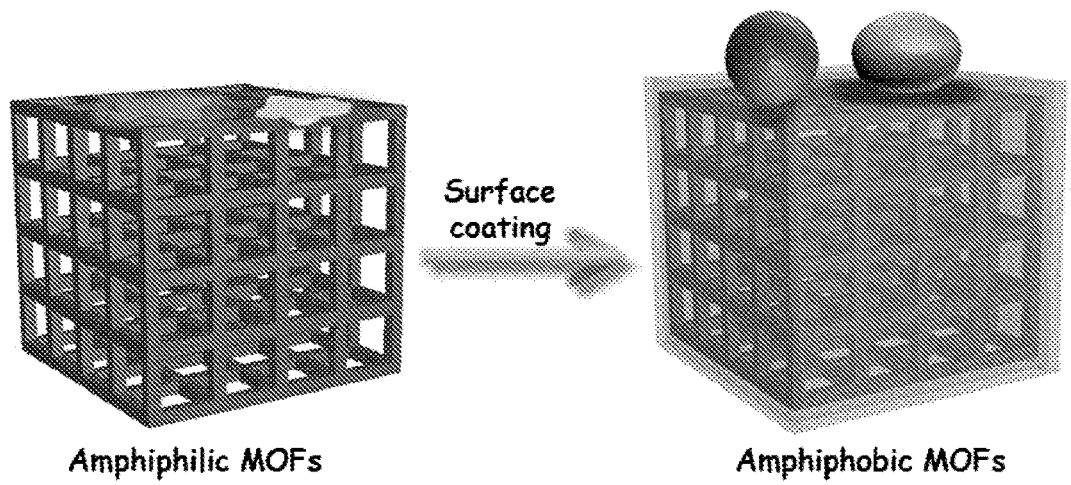
FIG. 1 shows amphiphobic surface engineering for MOFs. The resultant MOFs exhibit both superhydrophobicity and oleophobicity while retaining high crystallinity and intact porosity.

The sophisticated control of surface wettability for target-specific applications has attracted widespread interest for use in a plethora of applications. Despite the recent advances in modification of non-porous materials, surface wettability control of porous materials, particularly single crystalline, remains undeveloped. Here we contribute a general method to impart amphiphobicity on porous materials as demonstrated by chemically coating the exterior of porous organic polymers and metal-organic framework (MOF) crystals with an amphiphobic surface. As amphiphobic porous materials, the resultant amphiphobic porous materials exhibit both superhydrophobicity and oleophobicity in addition to retaining high crystallinity and intact porosity.

Amphiphobicity is imparted to a variety of porous framework materials. For example, to impart amphiphobicity on the MOFs, we rationally designed vinyl-functionalized linkers for targeted construction of MOFs, where the vinyl groups can remain intact during the formation process of MOF crystals, yet are sufficiently reactive for further chemical modifications (Wang, et al., *Chem. Mater.* 15, 5029-5035, 2003). After controllable functionalization of the exterior amphiphilic crystal surfaces with perfluoroalkyl groups via thiol-ene reaction, the resultant MOFs exhibit both superhydrophobicity and oleophobicity while retaining high crystallinity and intact porosity.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The terms "reactive coupling group" and "reactive functional group" are used interchangeably herein to refer to any chemical functional group capable of reacting with a second functional group under the given conditions to form a covalent bond. Those skilled in the art will recognize that some functional groups may react under certain conditions but not under others. Accordingly, some functional groups may be reactive coupling groups only certain conditions, e.g. under conditions where the groups react to form a covalent bond. The selection of reactive coupling groups is within the ability of the skilled artisan. Examples of reactive coupling groups can include primary amines ($-NH_2$) and amine-reactive linking groups such as isothiocyanates, isocyanates, acyl azides, NHS esters, sulfonyl chlorides, aldehydes, glyoxals, epoxides, oxiranes, carbonates, aryl halides, imidoesters, carbodiimides, anhydrides, and fluorophenyl esters. Most of these conjugate to amines by either acylation or alkylation. Examples of reactive coupling groups can include aldehydes ($-COH$) and aldehyde reactive linking groups such as hydrazides, alkoxyamines, and primary amines. Examples of reactive coupling groups can include thiol groups ($-SH$) and sulfhydryl reactive groups such as maleimides, haloacetyls, and pyridyl disulfides. Examples of reactive coupling groups can include photoreactive coupling groups such as aryl azides or diazirines. Examples of reactive coupling groups can include click reactive coupling groups capable of forming covalent bonds through click reactions. Well-known reactions include the hetero-Diels-Alder reaction, the thiol-ene coupling, the Staudinger ligation, native chemical ligation, and the amidation reaction between thio acids or thio esters and sulfonyl azides (referred to as 'sulfo-click'). As used herein, the terms "sulfo-click" and "sulfo-click chemistry" are used to refer to a reaction between thio acids and sulfonyl azides containing molecules, creating a covalent bonds between the two molecules. Examples of sulfo-click chemistry are described in U.S. Patent Application Publication 2011/0130568 and PCT Publication WO 2012/021486. The coupling reaction may include the use of a catalyst, heat, pH buffers, light, or a combination thereof.

The terms "pore diameter" and "pore size", as used interchangeably herein, refer to a measure of the effective diameter of the pores in the composition. The pore diameter can be the effective diameter of the largest gas molecule that can pass through the majority of the pores in the composition. The pore diameter can be estimated from the average pore diameter obtained from crystallographic measurements. The pore diameter can be estimated from measured adsorption isotherms for an inert gas such as $N_2$ using models such as the Horvath-Kawazoe model.

The term "conjugated microporous polymer (CMP)", as used herein, refers to a class of ultrahigh surface area materials characterized by an amorphous structure made through coupling of aromatic monomers leading to extended conjugation. The extended conjugation of a conjugated microporous polymer can lead to the formation of electronic bands much like those found in conductive metals. A conjugated microporous polymer can have a surface area from about 300 $m^2/g$ to about 2,000 $m^2/g$, about 400 $m^2/g$ to about 1500 $m^2/g$, or about 500 $m^2/g$ to about 3000 $m^2/g$.

The term "porous aromatic framework (PAF)", as used herein, refers to a class of ultrahigh surface area materials characterized by a rigid aromatic open-framework structure constructed by covalent bonds. Porous aromatic frameworks lack the extended conjugation found in conjugated microporous polymers. A porous aromatic framework can have a surface area from about 500 $m^2/g$ to about 7,000 $m^2/g$, about 1,000 $m^2/g$ to about 6,000 $m^2/g$, or about 1,500 $m^2/g$ to about 5,000 $m^2/g$.

The terms "porous polymer network (PPN)" and "interpenetrating polymer network (IPN)", as used interchangeably herein, refer to a class of high surface area materials containing at least two polymers, each in network form wherein at least one of the polymers is synthesized and/or crosslinked in the presence of the other. The polymer networks are physically entangled with each other and in some embodiments may be also be covalently bonded. Porous polymer networks can have a surface area from about 20 m$^2$/g to about 6,000 m$^2$/g, about 40 m$^2$/g to about 500 m$^2$/g, or about 80 m$^2$/g to about 400 m$^2$/g.

The terms "porous organic framework (POF)" and "covalent organic framework (COF)", as used interchangeably herein, refer to a class of highly crystalline, high surface area materials formed of small organic building blocks made entirely from light elements (H, B, C, N, and O) that are known to form strong covalent bonds. Porous organic frameworks can have a surface area from about 100 m$^2$/g to about 5,000 m$^2$/g, about 150 m$^2$/g to about 4,000 m$^2$/g, or from about 300 m$^2$/g to about 3,000 m$^2$/g.

The term "porous organic polymer (POP)", as used herein, refers generally to high surface area materials formed from organic segments covalently bonded to form an extended porous structure. Porous organic polymers can include conjugated microporous polymers, porous aromatic frameworks, porous polymer networks, and porous organic frameworks. The porous organic polymer can be crystalline, semi-crystalline, or amorphous. The porous organic polymer can have a surface greater than about 20 m$^2$/g, 50 m$^2$/g, 100 m$^2$/g, 500 m$^2$/g, or greater than about 1,000 m$^2$/g. The porous organic polymer can have a surface area up to about 8,000 m$^2$/g, 7,000 m$^2$/g, 6,000 m$^2$/g, 5,000 m$^2$/g, or 4,000 m$^2$/g. As used herein, the term "porous organic polymer" does not include zeolite structures or mesoporous silica structures.

The term "stable", as used herein, refers to compositions that are stable over time, stable under aqueous conditions, and/or stable under basic conditions. A composition is stable over time when, under standard operating conditions such as elevated temperatures and/or pressures, the composition does not change pore size by more than 1%, 2%, 5%, or 10% and/or does not change olefin uptake capacity by more than 1%, 2%, 5%, or 10% for a period of at least 1, 2, 10, 20, or 30 days. A composition is stable under aqueous conditions when it does not change pore size by more than 1%, 2%, 5%, or 10% and/or does not change olefin uptake capacity by more than 1%, 2%, 5%, or 10% after being exposed to an air environment with at least 60%, at least 70%, at least 80%, or at least 90% relative humidity for at least 12 hours or for at least 1, 2, 3, 4, 5, or 10 days. A composition is stable under basic conditions when it does not change pore size by more than 1%, 2%, 5%, or 10% and/or does not change olefin uptake capacity by more than 1%, 2%, 5%, or 10% after exposure to boiling 6M NaOH solution for a period of at least 120 minutes The term "alkyl" refers to the radical of saturated aliphatic groups (i.e., an alkane with one hydrogen atom removed), including straight-chain alkyl groups, branched-chain alkyl groups, cycloalkyl (alicyclic) groups, alkyl-substituted cycloalkyl groups, and cycloalkyl-substituted alkyl groups.

In preferred embodiments, a straight chain or branched chain alkyl has 30 or fewer carbon atoms in its backbone (e.g., $C_1$-$C_{30}$ for straight chains, and $C_3$-$C_{30}$ for branched chains), preferably 20 or fewer, more preferably 15 or fewer, most preferably 10 or fewer. Likewise, preferred cycloalkyls have 3-10 carbon atoms in their ring structure, and more preferably have 5, 6, or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, phosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, more preferably from one to six carbon atoms in its backbone structure. Likewise, "lower alkenyl" and "lower alkynyl" have similar chain lengths. Throughout the application, preferred alkyl groups are lower alkyls. In preferred embodiments, a substituent designated herein as alkyl is a lower alkyl.

It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —CF$_3$, —CN and the like. Cycloalkyls can be substituted in the same manner.

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

The term "alkylthio" refers to an alkyl group, as defined above, having a sulfur radical attached thereto. In preferred embodiments, the "alkylthio" moiety is represented by one of —S-alkyl, —S-alkenyl, and —S-alkynyl. Representative alkylthio groups include methylthio, ethylthio, and the like. The term "alkylthio" also encompasses cycloalkyl groups, alkene and cycloalkene groups, and alkyne groups. "Arylthio" refers to aryl or heteroaryl groups. Alkylthio groups can be substituted as defined above for alkyl groups.

The terms "alkenyl" and "alkynyl", refer to unsaturated aliphatic groups analogous in length and possible substitution to the alkyls described above, but that contain at least one double or triple bond respectively.

Amphiphobic Porous Materials

A variety of amphiphobic porous materials are provided that display high levels of porosity along with superhydrophobic and oleophobic properties. The amphiphobic porous materials can be prepared by selectively attaching perlfuorinated alkyl groups to the outer surface of a porous framework. A variety of porous frameworks are known in the art and can be used in this context. In some embodiments, the porous framework is a metal organic framework. In some embodiments, the porous framework can be a porous organic polymer. The perfluoroalkyl groups can be covalently bonded to the porous framework using reactinv coupling groups. A variety of such groups are known in the art.

The reactive coupling groups are chosen so that they are capable of reacting with complementary groups on the perfluorolkyl moieties to form covalent bonds. By carefully choosing the size of the perfluoroalkyl moieties, an amphiphobic porous material can be prepared wherein the perfluoralkyl moieties are attached just to the outer surface of the porous framework (i.e. the perfluoralkyl moieties do not substantially penetrate into the pores of the porous framework).

The amphiphobic porous materials can exhibit superhydrophobicity, e.g. a contact angle with water of about 150°, 165°, 170°, or more. The amphiphobic porous material can exhibit oleophobicity, i.e. a contact angle with organic solvents of about 75°, 80°, 85°, 90°, 95°, 100° or more. The organic solvents can include glycerol, 2-hydroxybenzaldehyde, benzonitrile, chlorobenzene, or dodecane. The amphiphobic porous materials can be designed to have a range of surface areas and porosities. In some aspects, the amphiphobic porous material has a surface area of about 100 m²/g to about 7,000 m²/g, about 100 m²/g to about 5,000 m²/g, about 500 m²/g to about 5,000 m²/g, about 100 m²/g to about 2,500 m²/g, or about 500 m²/g to about 1,500 m²/g. The amphiphobic porous material can have a pore volume from about 0.3 cm³/g to 1.3 cm³/g, about 0.4 cm³/g to 1.2 cm³/g, or about 0.5 cm³/g to 1.1 cm³/g, Metal Organic Frameworks The porous framework can be a metal organic framework. A variety of metal organic frameworks are known. The metal organic framework can include plurality of metal atoms and a plurality of organic ligands coordinating the metal atoms to form the porous framework. The ligands in the metal organic framework can be functionalized with reactive coupling groups such that they are capable of forming covalent bonds with the perfluoralkyl moieties to attach them to the outer surface of the porous framework. The metal organic framework can be made with a variety of metals, such as the metal atoms Mg, Ca, Ba, Pb, Sn, Zr, Ti, Hf, Cr, Ni, Al, V, Sc, Ga, In, Zn, Cu, Ni, Fe, Mn, Cd, Ag, Y, La, Pr, Eu, Gd, Tb, Dy, Ho, Er, Yb, or a combination thereof.

The metal organic framework can be made with a variety of ligands capable of supporting the porous structure. In some aspects, the ligands are di-carboxylic acid ligands, tri-carboxylic acid ligands, azole ligands, or a combination thereof. Suitable di-carboxylic acid ligands can include oxalic acid, malonic acid, succinic acid, glutaric acid, phthalic acid, isopthalic acid, terepthalic acid, and other straight chain-chain and branched-chain di-carboxylic acid ligands having from about 7 to 15 carbon atoms. Suitable tri-carboxylic acid ligands can include citric acid, isocitric acid, aconitic acid, propane-1,2,3-tricarboxylic acid, trimesic acid, and other straight-chain and branched-chain tri-carboxylic acids having from 7 to 15 carbon atoms. Suitable azole ligands can include imidazole, 1,2,3-Triazole, 1,2,4-Triazole, pyrrodiazole, oxadiazole, thiadiazole, and other azole ligands having from about 2 to 7 carbon atoms.

In some aspects, the amphiphobic porous materials include a porous framework comprising a metal organic framework, wherein the metal organic framework including a plurality of ligands having a structure according to one of the following formulas

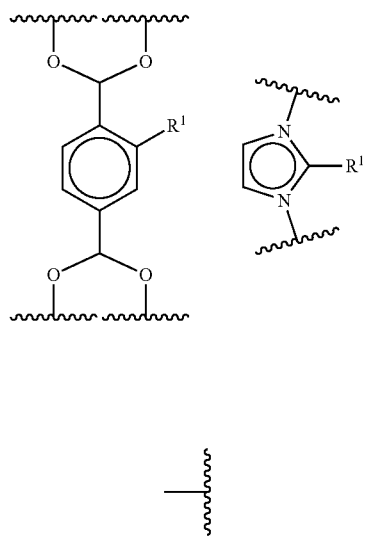

where represents a bond to a metal atom, and where each occurrence of $R^1$ is either H, alkyl, alkenyl, perfluoroalkyl, partially fluorinated alkyl, perfluorothioalkyl, or partially fluorinated thioalkyl so long as at least some of the $R^1$ comprise a perfluoroalky, partially fluorinated alkyl, perfluorothioalkyl, or partially fluorinated thioalkyl; and an outer surface of the porous framework, wherein the perfluoroalky, partially fluorinated alkyl, perfluorothioalkyl, or partially fluorinated thioalkyl are located on the outer surface. In some aspects, at least some of the $R^1$ have a structure according to $R^2$; wherein $R^2$ is —$R^3SR^4$, where $R^3$ is none or an alkyl, and $R^4$ is a perfluoroalkyl or partially fluorinated alkyl; and wherein the $R^2$ are located on the outer surface. In some aspects, $R^3$ is a $C_2$-$C_8$, $C_2$-$C_6$, or $C_2$-$C_8$ alkyl, and $R^4$ is a $C_4$-$C_{15}$, $C_6$-$C_{15}$, or $C_6$-$C_{12}$ perfluoroalkyl or partially fluorinated alkyl.

The metal organic framework can be designed to have a range of surface areas and porosities. In some aspects, the metal organic framework has a surface area of about 100 m²/g to about 5,000 m²/g, about 500 m²/g to about 5,000 m²/g, about 100 m²/g to about 2,500 m²/g, or about 500 m²/g to about 1,500 m²/g. The metal organic framework can have a pore volume from about 0.3 cm³/g to 1.3 cm³/g, about 0.4 cm³/g to 1.2 cm³/g, or about 0.5 cm³/g to 1.1 cm³/g, Porous Organic Polymers The porous framework can be a porous organic polymer. The porous organic polymer can be a conjugated microporous polymer, a porous aromatic framework, a porous polymer network, or a porous organic framework. The porous organic polymer can be crystalline, semi-crystalline, or amorphous. The porous organic polymer can be stable. For example, the porous organic polymer can be stable under aqueous conditions, stable under basic conditions, stable under high pressure, or a combination thereof.

The porous organic polymer can be a conjugated microporous polymer, a porous aromatic framework, a porous polymer network, a porous organic framework, or a mesoporous organic polymer. Suitable porous polymers can include fluoropolymers, e.g. polytetrafluoroethylene or polyvinylidene fluorides, polyolefins, e.g. polyethylene or polypropylene; polyamides; polyesters; polysulfone, poly(ethersulfone) and combinations thereof, polycarbonate, polyurethanes. Suitable porous aromatic frameworks can include cross-linked poly-tetraphenylmethane, poly-tera-phenyl silane, and poly-triphenyl amine polymers.

The porous organic polymer can have a range of pore sizes. The porous organic polymer can have a pore size from about 5 Å to about 2,000 Å, from about 5 Å to about 1,500 Å, from about 5 Å to about 1,000 Å, from about 5 Å to about 500 Å. In some embodiments a composition useful for the separation of ethylene from ethane can have a pore size of about 2 Å to about 20 Å, from about 2 Å to about 15 Å, from about 5 Å to about 15 Å, from about 5 Å to about 10 Å, or about 8 Å.

The porous organic polymer can contain monomer units having an aryl moiety. A variety of porous organic polymers can be made with aryl moieties. For example, the porous organic polymer can contain a monomer unit containing an aryl moiety selected from the group consisting of substituted and unsubstituted benzene, naphthalene, anthracene, biphenyl, pyridine, pyrimidine, pyridazine, pyrazine and triazine.

In some embodiments the porous organic polymer contains a monomer unit selected from

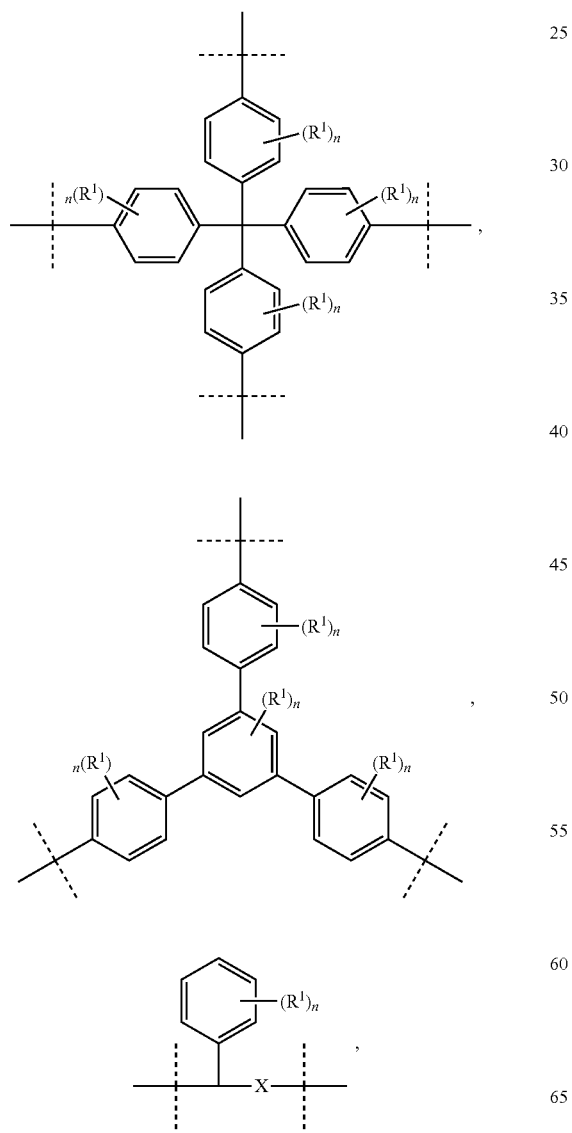

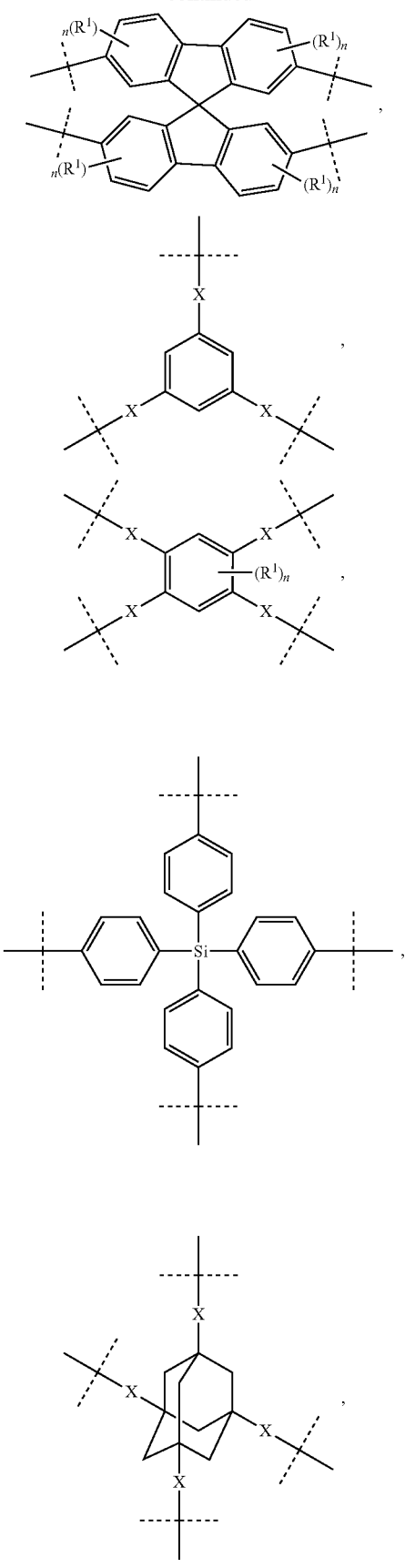

-continued

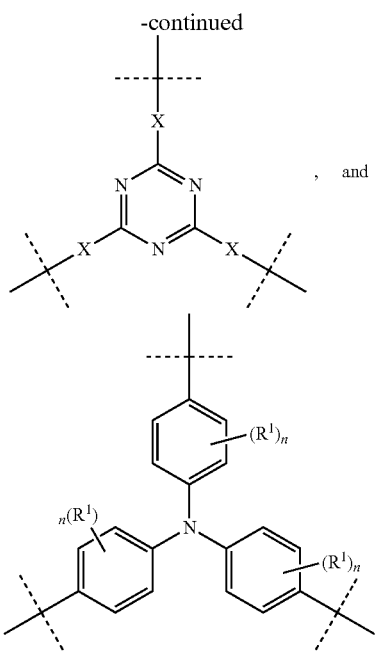

, and wherein each occurrence of X is independently selected from —CH$_2$—, phenylene, and -≡-, optionally containing one or more R$^1$ substituents; wherein each occurrence of R$^1$ is independently selected from substituted and unsubstituted alkyl, heteroalkyl, alkylthio, alkoxy, amino, and acidic functional groups having from 1 to 20, from 1 to 12, from 1 to 10, or from 1 to 5 carbon atoms; wherein each occurrence of n is an integer 1, 2, 3, or 4, and at least one, at least two, at least three, or at least four reactive coupling groups per monomer unit capable of forming covalent bonds with the perfluoroalkyl moieties. Suitable reactive coupling groups can include vinyl groups or any reactive coupling groups described herein.

Perfluoroalkyl Moieties

The porous framework can have an outer surface functionalized with perfluoroalkyl moieties. By selecting perfluoroalkyl moieties that will not permeate into the pores of the porous framework, essentially just the outer surface of the porous framework can be functionalized. This can allow for retention of gas adsorption, surface, area, and the porous nature of the porous framework while imparting amphiphobic properties to the material.

A variety of perfluoroalkyl moieties can be used in this regard. The perfluoroalkyl moiety can be a linear or branched chain fluorinated alkyl group having from 7 to 20, 8 to 20, 9 to 20, or 10 to 20 carbon atoms. The perfluoroalkyl moieties can include a reactive coupling group capable of reacting with the reactive coupling groups in the outer surface of the porous framework to form a covalent bond.

EXAMPLES

Example 1: Imparting Amphiphobicity in Metal-Organic Framework Crystals

Methods

Materials and Measurements

Commercially available reagents were purchased in high purity and used without purification. Solvents were purified according to standard laboratory methods. THF was distilled over LiAlH$_4$. DMF was distilled over CaH$_2$. Nitrogen sorption isotherms at the temperature of liquid nitrogen were measured using Micromeritics ASAP 2020M and Tristar system. The samples were outgassed for 12 h at 100° C. before the measurements. $^1$H NMR spectra were recorded on a Bruker Avance-400 (400 MHz) spectrometer. Chemical shifts are expressed in ppm downfield from TMS at δ=0 ppm, and J values are given in Hz. Scanning electron microscopy (SEM) was performed on a Hitachi SU 1510. X-ray powder diffraction (XRD) patterns were measured with a Rigaku Ultimate VI X-ray diffractometer (40 kV, 40 mA) using CuKα (λ=1.5406 Å) radiation. Photographs of water and organic compounds on the surface of the samples in the pressed pellet form were measured with SL200KB (USA KNO Industry Co.), equipped with a CCD camera. XPS spectra were performed on a Thermo ESCALAB 250 with Al Kα irradiation at θ=90° for X-ray sources, and the binding energies were calibrated using the C1s peak at 284.9 eV. An Ar$^+$ sputter beam (2 keV, 100 s) was used for depth profiling of ZIF-8-VF and MOF-5-VF after the initial data was collected. High-angle-annular-dark-field (HAADF) scanning, STEM imaging, and energy dispersive X-ray spectroscopy (EDX) mapping were carried out by Titan ChemiSTEM operated at 200 kV. Water adsorption and desorption isotherms were obtained via SMS Instruments DVS Advantage. The balance has a sensitivity of 0.1 μg. These isotherms were measured at 25° C. by monitoring the weight change of the sample as a function of relative humidity of water. The relative humidity of water was stepped up from 0% to 98% with an increment of 10% in each step and then was stepped down to 0%. Real time weight, temperature, and relative humidity were recorded. Toluene adsorption isotherms were measured via Micromeritics 3Flex. These isotherms were collected at 25° C. by monitoring the volume change.

Synthesis of Single Crystal ZIF-8-V

Single crystal of ZIF-8-V was obtained by slowly evaporating the mixture of trimethylamine (3 μL) and cyclohexane into a DMF (2 mL) solution of Zn(NO$_3$)$_2$.6H$_2$O (0.033 mmol) and 2-vinyl-imidazole (0.1 mmol) for 7 d at room temperature.

Synthesis of Powder ZIF-8-V Crystal

2-Vinyl-imidazole (0.094 g, 1.0 mmol) and zinc nitrate hexahydrate [Zn(NO$_3$)$_2$.6H$_2$O] (0.149 g, 0.50 mmol) in DMF (15 mL) was placed in a desiccator under an atmosphere of the mixture of triethylamine (5 mL) and cyclohexane (200 mL). The reaction was allowed to proceed at room temperature for 48 h. The crystalline powder was obtained by centrifugation, washing with methanol (3×25 mL), and activating with methanol (3×25 mL) for three-days before being dried under vacuum at room temperature. Yield (0.09 g, 72%) CHN calculated for C$_{10}$H$_{10}$N$_4$Zn: C, 48.0; H, 4.0; N, 22.3%. Found: C, 48.3; H, 4.40; N, 20.1%.

Covalent Post-Synthetic Modification of ZIF-8-V

Activated ZIF-8-V powder (0.10 g) was suspended in (trifluoromethyl)benzene (10 mL) solution containing 10 v/v % 1H,1H,2H,2H-perfluorodecanethiol and catalytic amount of azobisisobutyronitrile (AIBN). The reaction was carried out at 60° C. for 10 h under N$_2$ attach perfluoroalkyl groups on the crystal surface by the thiol-ene click reaction. The product denoted as ZIF-8-VF was obtained by centrifugation, washed with methanol (3×25 mL), and dried under vacuum at room temperature. CHN found for ZIF-8-VF: C, 49.3; H, 4.49; N, 18.5%.

Example 2

Synthesis of 2-vinyl-imidazole

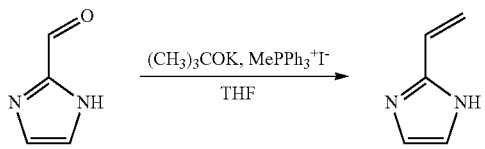

Methyltriphenylphosphonium iodide (42.0 g, 104 mmol, 2.0 equiv) was added to a suspension of $(CH_3)_3COK$ (12.2 g, 109 mmol, 2.1 equiv) in THF (150 mL) at room temperature under $N_2$ atmosphere. After 0.5 h, imidazole-2-carboxaldehyde (5.0 g, 52 mmol, 1.0 equiv) was added and the mixture was stirred at room temperature for another 24 h. After the reaction was quenched by the addition of $NH_4Cl$ solution, the mixture was extracted with an excess of ethyl acetate, and then the combined organic phase was washed with brine and dried over $MgSO_4$. The residue was purified by flash column chromatography on silica gel to afford 2-vinyl-imidazole (4.2 g, 86%) as light yellow solid. $^1H$ NMR (400 MHz, CDCl$_3$, 298K, TMS): δ 11.75 (s, 1H), 7.08 (s, 2H), 6.62-6.70 (m, 1H), 5.93 (d, 1H, J=18 Hz), 5.33 (d, 1H, J=11.6 Hz) ppm. $^{13}C$ NMR (100 MHz, CDCl$_3$) δ 116.41, 122.62, 125.79, 146.36 ppm.

Synthesis of 2-vinylterephthalic acid

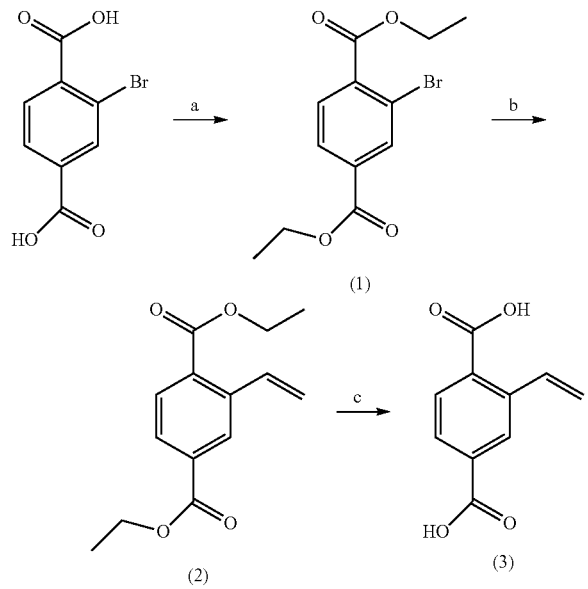

Reagents: (a) $CH_3CH_2OH$, $H_2SO_4$, 80° C.; (b) vinyltributyltin, $Pd(PPh_3)_4$, toluene, 100° C.; (c) $Li(OH).H_2O$, MeOH, $H_2O$, 60° C.

diethyl 2-bromoterephthalate (1)

A mixture of 2-bromoterephthalic acid (5 g, 20.5 mmol), concentrated $H_2SO_4$ (4.0 mL) and EtOH (100 mL) was refluxed for 12 h under $N_2$ atmosphere. The mixture was extracted with an excess of $Et_2O$, and then the combined organic phase was washed with $NaHCO_3$ aqueous solution, brine and dried over $MgSO_4$. The residue was purified by flash column chromatography on silica gel to afford diethyl 2-bromoterephthalate (5.62 g, 91%) as transparent liquid. $^1H$ NMR (400 MHz, CDCl$_3$, 298K, TMS): δ 8.3 (d, 1H, J=1.6 Hz), 7.99-8.02 (m, 1H), 7.79 (d, 1H, J=1.6 Hz), 4.38-4.45 (m, 4H), 5.33 (d, 1H, J=11.6 Hz) ppm.

diethyl 2-vinylterephthalate (2)

1 (5.0 g, 16.7 mmol), vinyltributyltin (6.34 g, 20.0 mmol) and $Pd(PPh_3)_4$ (0.97 g, 0.83 mmol) were dissolved in dry toluene and the resulting mixture was refluxed at 100° C. under $N_2$ atmosphere for 24 h. The residue was purified by flash column chromatography on silica gel to the title compound as light yellow liquid (3.51 g, 85%). $^1H$ NMR (400 MHz, CDCl$_3$, 298K, TMS): δ 8.24 (d, 1H, J=1.2 Hz), 7.89-7.97 (m, 2H), 7.39-7.46 (m, 1H), 5.74-5.79 (m, 1H), 5.41-5.44 (m, 1H), 4.37-4.44 (m, 4H), 1.39-1.44 (m, 6H) ppm.

2-vinylterephthalic acid (3)

$LiOH.H_2O$ (37.8 g, 900 mmol) was added to a solution of 2 (2.00 g, 8.0 mmol) in MeOH-water (2:1; 80 mL). After the reaction mixture was stirred at 60° C. for 24 h, the solution was acidified with HCl (2.0 mol/L). The residual was extracted with an excess of EtOAc and the combined organic phase was washed with brine and dried over $MgSO_4$, filtered and concentrated under vacuum to yield 3 as a white solid (1.55 g, quantitative yield). $^1H$ NMR (400 MHz, CDCl$_3$, 298K, TMS): δ 13.5 (br, 1H), 8.16 (s, 1H), 7.86-7.92 (m, 2H), 7.36-7.43 (m, 1H), 5.81 (d, 1H, J=17.6 Hz), 5.41 (d, 1H, J=11.2 Hz) ppm. $^{13}C$ NMR (100 MHz, CDCl$_3$) δ 117.91, 127.64, 128.67, 130.63, 133.95, 134.02, 135.06, 138.36, 167.03, 168.56 ppm.

Synthesis of Single Crystal MOF-5-V

Single crystal of MOF-5-V was obtained by heating a solution of $Zn(NO_3)_2.6H_2O$ (0.3 mmol) and 2-vinylterephthalic acid (0.1 mmol) in the mixture of DMF (1 mL) and methanol (1 mL) for 12 h at 85° C.

Synthesis of Powder MOF-5-V Crystal

Zinc acetate dihydrate (0.219 g, 1.0 mmol) diethylforamide (5.0 mL) solution was slowly added into the 2-vinylterephthalic acid (0.075 g, 0.39 mmol) diethylforamide solution (5.0 mL) under magnetic stirring at room temperature for 12 h. The crystalline powder was obtained by centrifugation, washing with DMF and CHCl$_3$ for several times, and activating with CHCl$_3$ (3×25 mL) for three-days before being dried under vacuum at room temperature. Elemental Analysis (activated sample): Calculated for $Zn_4O(C_{10}H_6O_4)_3$ (%): C, 42.49; H, 2.14. Found (%): C, 40.32; H, 2.25.

Synthetic Procedure for ZIF-8 and MOF-5

ZIF-8 and MOF-5 were synthesized according to the previous reported procedures (Morris, et al., *J. Am. Chem. Soc.* 130, 12626-12627, 2008; Tranchemontagne, et al., *Tetrahedron* 64, 8553-8557, 2008).

Covalent Post-Synthetic Modification of MOF-5-V 1H,1H,2H,2H-perfluorodecanethiol coated MOF-5-V was operated according to the similar procedure to that of ZIF-8-VF. Elemental Analysis (activated sample): Found (%): C, 43.51; H, 1.96.

Digestion of ZIF-8-V and ZIF-8-VF

Approximately 10 mg of ZIF-8-V and ZIF-8-VF were digested by sonication in 1.0 mL of d$_6$-DMSO and 100 μL of 20% DCl in D$_2$O solution. Upon complete dissolution of the crystals, this solution was used for $^1H$ NMR analysis.

Single-Crystal X-Ray Diffraction Studies

The X-ray diffraction data for ZIF-8-V were collected using Bruker D8 Venture PHOTON 100 CMOS system equipped with a Cu K$_\alpha$ INCOATEC ImuS micro-focus source (λ=1.54178 Å). The X-ray diffraction data for MOF-5-V were collected using synchrotron radiation (λ=0.41328 Å) at Advanced Photon Source Beamline 15-ID-B of ChemMatCARS in Argonne National Lab, Argonne, Ill. Indexing was performed using APEX2 (Difference Vectors method) (Bruker, 2014, APEX2, Version 2013.6-2, Bruker AXS Inc., Madison, Wis., USA). Data integration and reduction were performed using SaintPlus 6.01 (Bruker, 2013, SAINT-V8.32A, Data Reduction Software). Absorption correction was performed by multi-scan method implemented in SADABS (Sheldrick, G. M., 1996, SADABS, Program for Empirical Absorption Correction, University of Gottingen, Germany). Space groups were determined using XPREP implemented in APEX2 (Bruker, 2014, APEX2, Version 2013.6-2, Bruker AXS Inc., Madison, Wis., USA). Structures were solved using SHELXS-97 (direct methods) and was refined using SHELXL-2015 (full-matrix least-squares on F) through OLEX2 interface program (Morris, *J. Am. Chem. Soc.* 130, 12626-12627, 2008; Sheldrick, G. M., 1990, *Acta Cryst, A* 46, 467-473; Sheldrick, G. M., 2008, *Acta Cryst, A* 64, 112-122).

ZIF-8-V

All framework atoms were refined anisotropically. Hydrogen atoms were placed in geometrically calculated positions and were included in the refinement process using riding model. Disordered content of structural pores have been modeled as 0 atoms. The length of C7-C5 bond has been restrained using DFIX. No ADP restraints have been used. Crystal data and refinement conditions are shown in Table 1.

MOF-5-V

The cluster and the ligand are disordered in the structure. The atoms of the major part of disorder were refined anisotropically. The minor part of disorder was refined isotropically and using restraints. The vinyl group has not been located due to disorder over approximately eight positions. The content of structural voids was not located due to the disorder. Crystal data and refinement conditions are shown in Table 2.

Example 3

Synthesis of Vinyl Prefunctionalized MOF

Figures 7A, 7B, 7C:
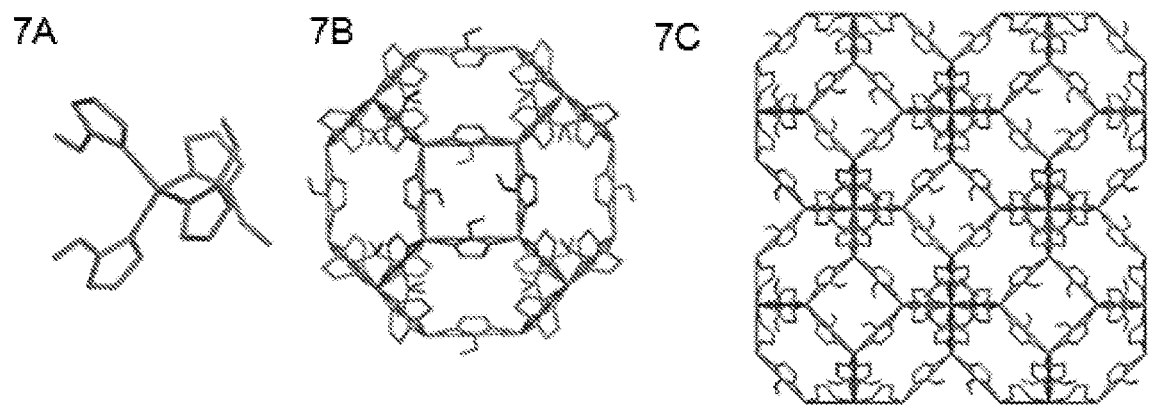
FIGS. 7A-7C are representations of the crystal structure of ZIF-8-V.
Figure 8A:
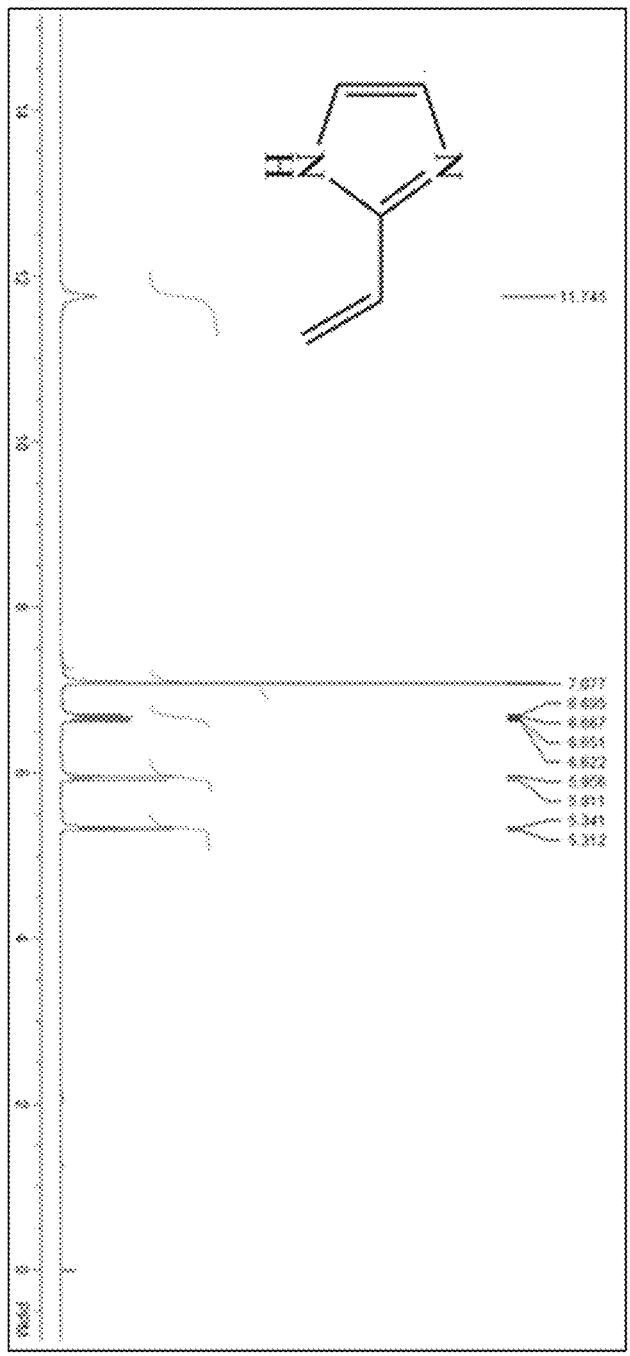
FIGS. 8A-8B show liquid NMR spectra.
Figure 8B:
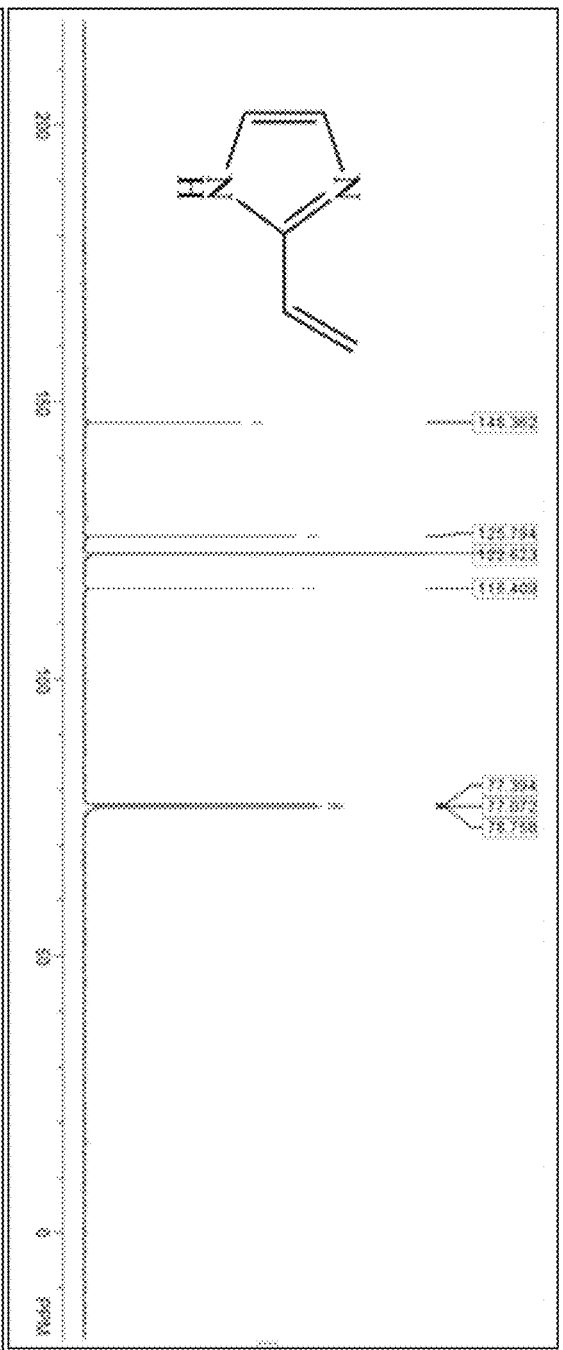

As a representative example of MOFs, a vinyl-functionalized crystalline zeolite imidazole framework was prepared using the protocol reported in the literature, and it is isostructural with ZIF-8 as revealed by single crystal X-ray diffraction analysis (FIGS. 7A-7C) (Morris, et al., *J. Am. Chem. Soc.* 130, 12626-12627, 2008). The guest solvent-free crystal product is designated as ZIF-8-V with a formula of $Zn(C_5H_5N_2)_2$, and the retention of vinyl groups on the linkers during the crystal formation process was further confirmed by liquid $^1H$ NMR analysis of the digested ZIF-8-V sample (FIGS. 8A-8B and FIGS. 9A-9B).

Crystal Surface Coating with Perfluoroalkyl Groups

Figure 2:
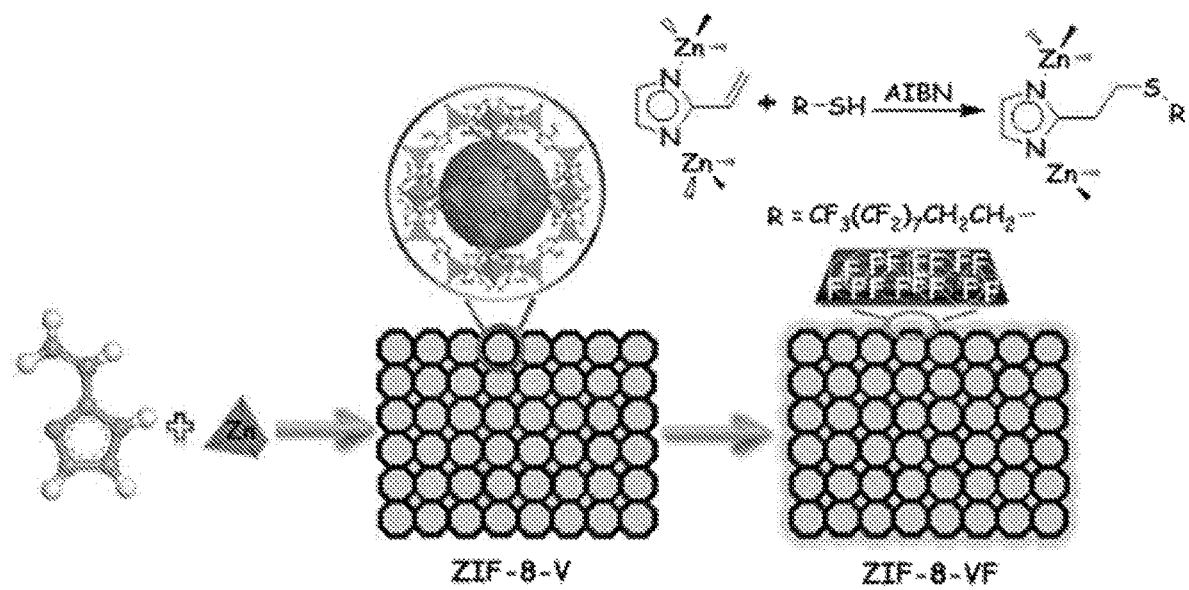
FIG. 2 is a schematic illustration to impart amphiphobicity on ZIF-8-V. Synthetic route to create amphiphobic surface via grafting perfluoroalkyl groups on the exterior surface of the ZIF-8-V crystal.

To controllably introduce the fluorinated groups onto the exterior surface of ZIF-8-V, we hypothesize that, if a relatively bulky fluorinated compound that cannot permeate into the pore of the material is employed, the reaction would only occur on the exterior surface of the crystals. Additionally, if these fluorocarbon chains are long enough, the surface energy of the sample would be significantly reduced (FIG. 1) (Pan, et al., *J. Am. Chem. Soc.* 135, 578-581, 2013; Tuteja, et al., *Science* 318, 1618-1622, 2007). To demonstrate this proof-of-concept, 1H,1H,2H,2H-perfluorodecanethiol was chosen as a typical compound for the surface modification of ZIF-8-V crystals, which was achieved via the thiol-ene click reaction to afford ZIF-8-VF (FIG. 2) (Hayase, et al., *Angew. Chem. Mt. Ed.* 52, 10788-10791, 2013).

Structural Characterization

Figures 3A, 3B, 3C, 3D, 3E, 3F:
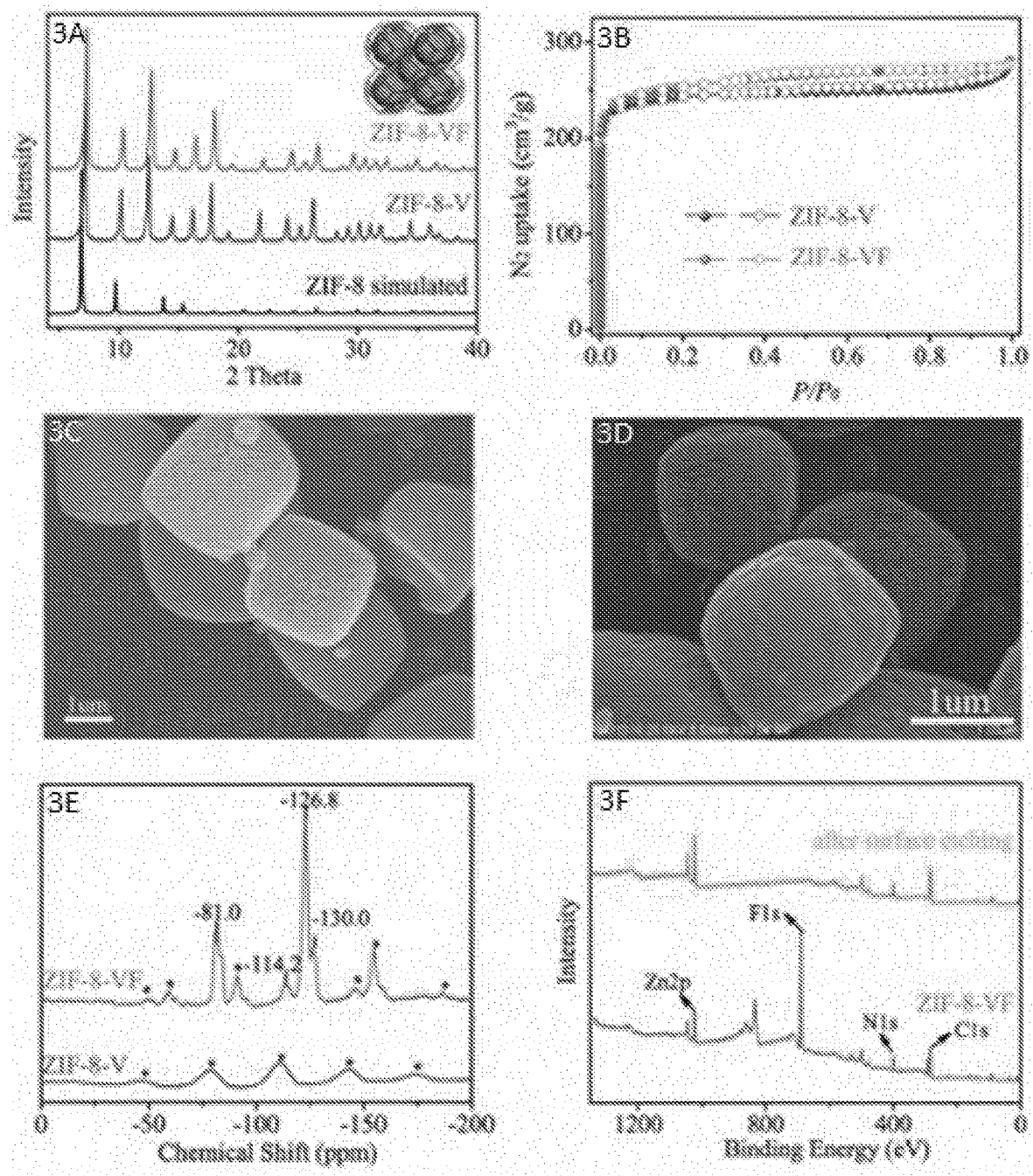
FIGS. 3A-3F are structural characterizations.

FIG. 3A shows powder x-ray diffraction (PXRD) patterns of ZIF-8-V and ZIF-8-VF, which agree well with the calculated ones of ZIF-8-V, indicating the good retention of crystallinity and structural integrity during the post-synthetic modification process. $N_2$ sorption isotherms collected at 77 K (FIG. 3B) reveal that both ZIF-8-V and ZIF-8-VF exhibit the classic type I adsorption behaviour, a characteristic of microporous materials. Derived from the $N_2$ adsorption data, ZIF-8-V and ZIF-8-VF have similar BET (Brunauer, Emmett, and Teller) surface areas (816 and 850 $m^2 g^{-1}$) and pore volumes (0.42 $cm^3 g^{-1}$), suggesting that the post modification process should primarily occur on the exterior surface of the crystals with negligible blockage of the pores in the pristine material, thereby still accessible for guest gas molecules. The SEM images (FIGS. 3C-3D) show that there is little change in the overall morphology of the crystals after the chemical modification reaction but the surfaces of the ZIF-8-VF crystals are rougher than those of ZIF-8-V crystals, further indicating the occurrence of the reaction on the exterior surface of the crystals. It is worth noting that such roughness of the surface has been reported to be beneficial to the enhancement of the hydrophobicity and oleophobicity (Bellanger, et al., H.; *Chem. Rev.* 114, 2694-2716, 2014).

Figure 10:
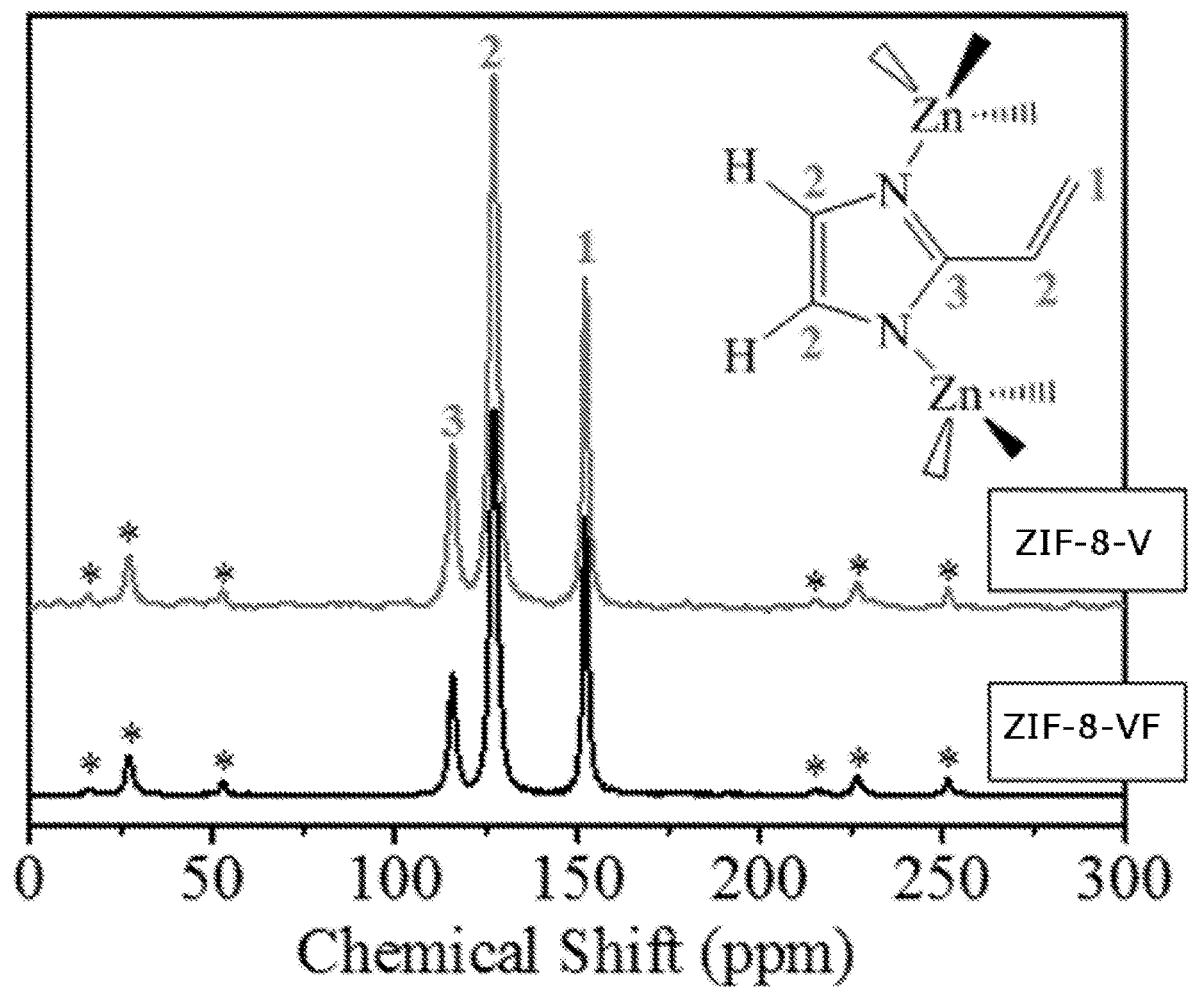
FIG. 10 shows $^{13}$C solid state NMR spectra of ZIF-8-V and ZIF-8-VF. There is almost no identifiable difference between the two samples, suggesting that the amount of incorporated perfluoroalkyl groups should be very small.
Figures 11A, 11B:
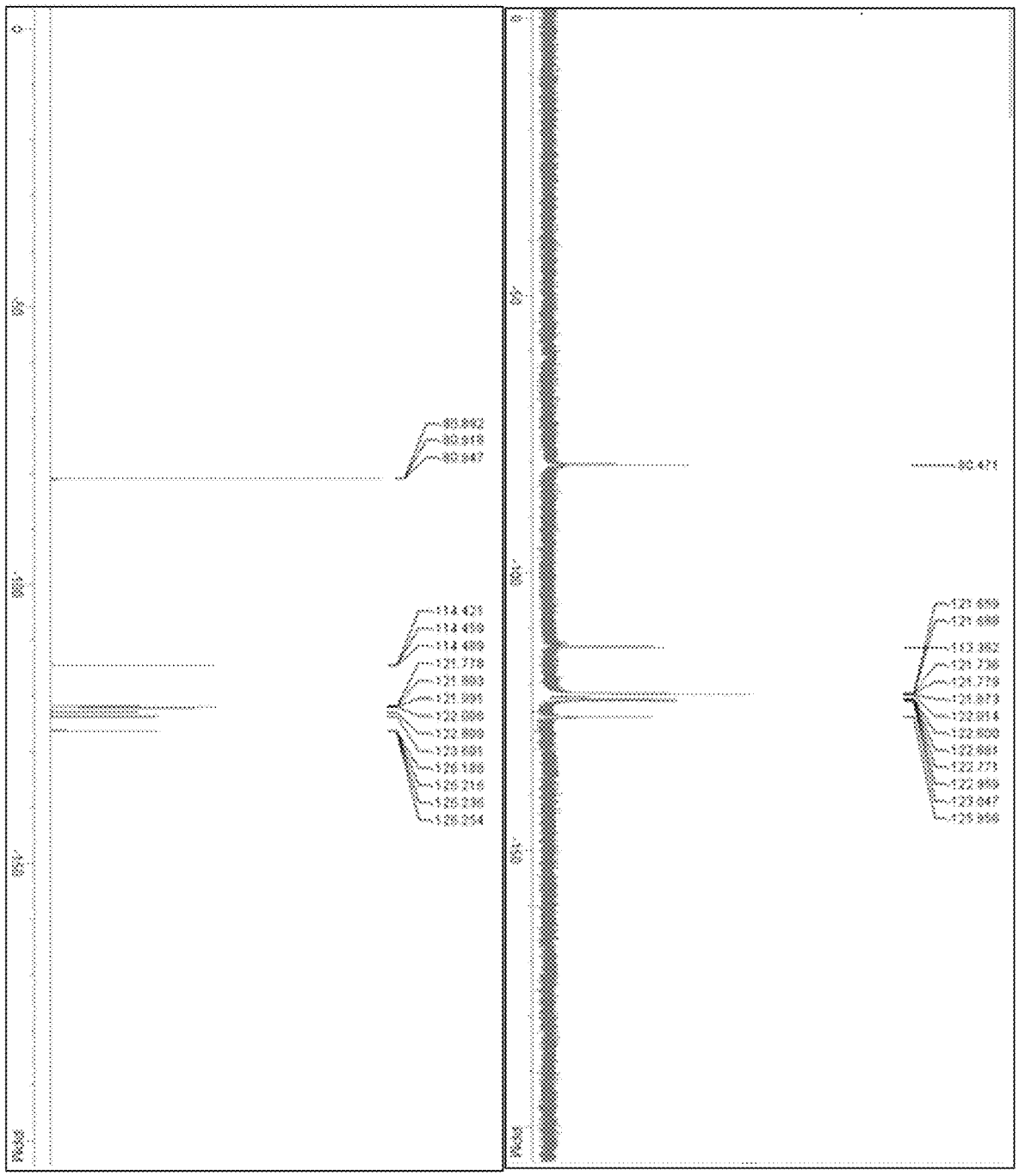
FIGS. 11A-11B show liquid $^{19}$F NMR spectra.
Figure 12:
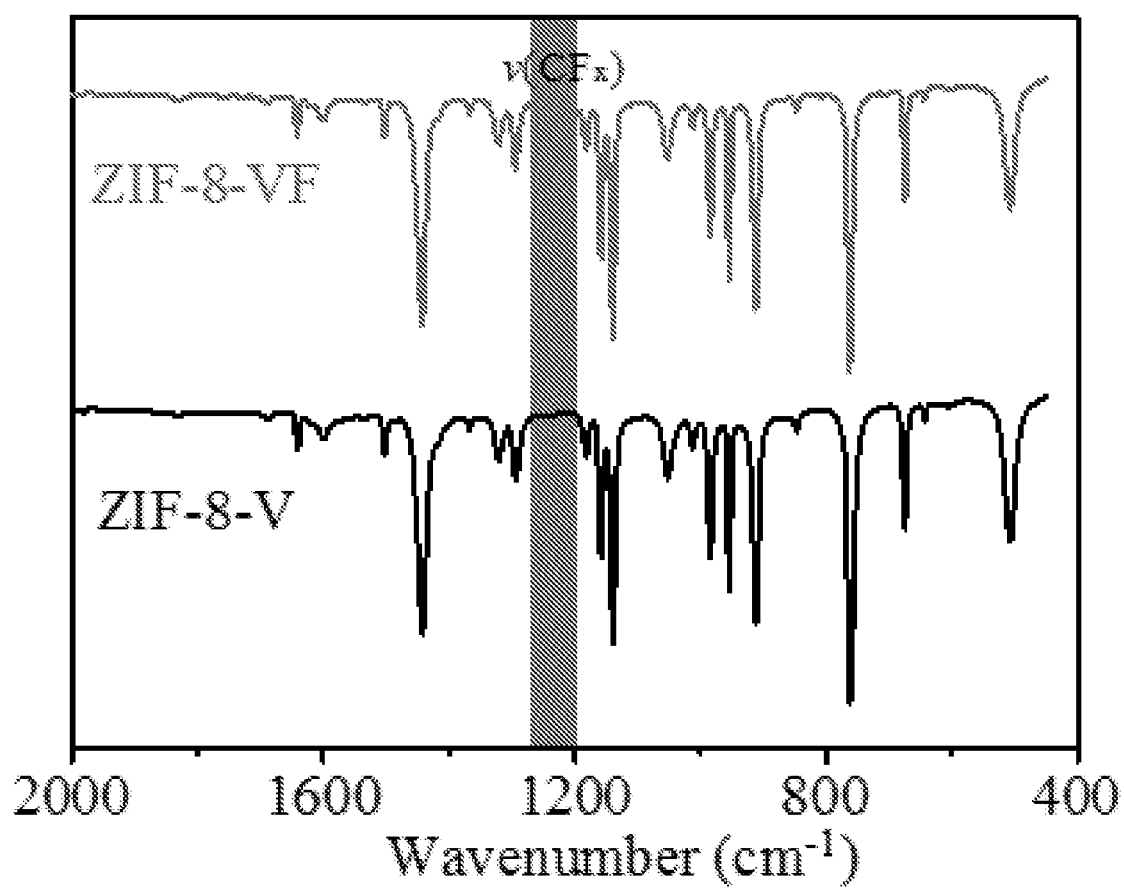
FIG. 12 shows FT-IR spectra of ZIF-8-V and ZIF-8-VF. The appearance of characteristic bands of C—F at 1241 and 1211 cm$^{-1}$ in ZIF-8-VF indicates the successful grafting of perfluoroalkyl groups (Qian, et al., *J. Am. Chem. Soc.* 136, 15849-15852).
Figures 13A, 13B:
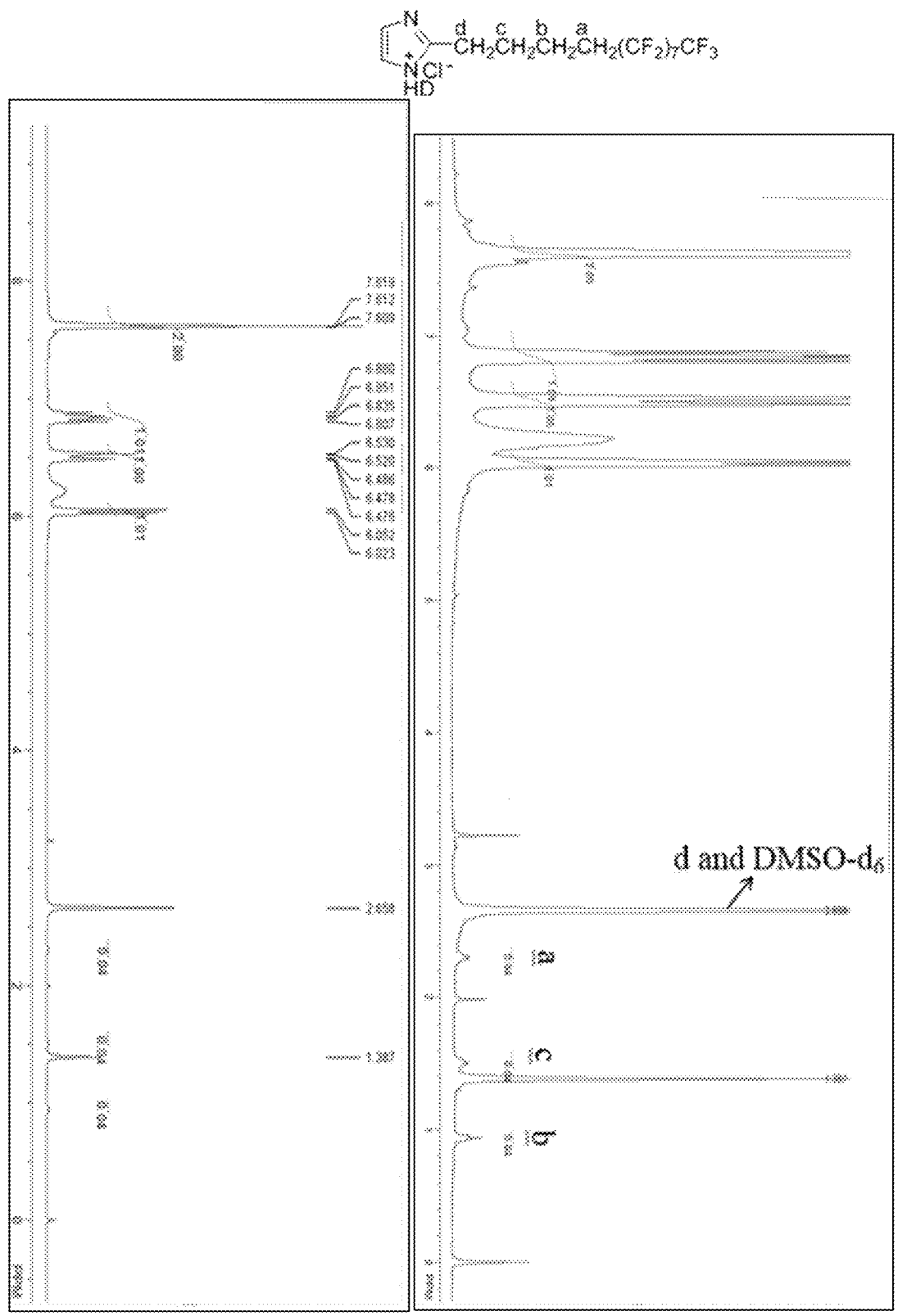
FIGS. 13A-13B show liquid NMR spectra of digested ZIF-8-VF sample (FIG. 13A) and corresponding enlarged spectrum (FIG. 13B). The chemical shift of d is overlapped with d6-DMSO. These spectra reveal that only about 2.0% of vinyl groups have been grafted with perfluoroalkyl groups.
Figure 14A:
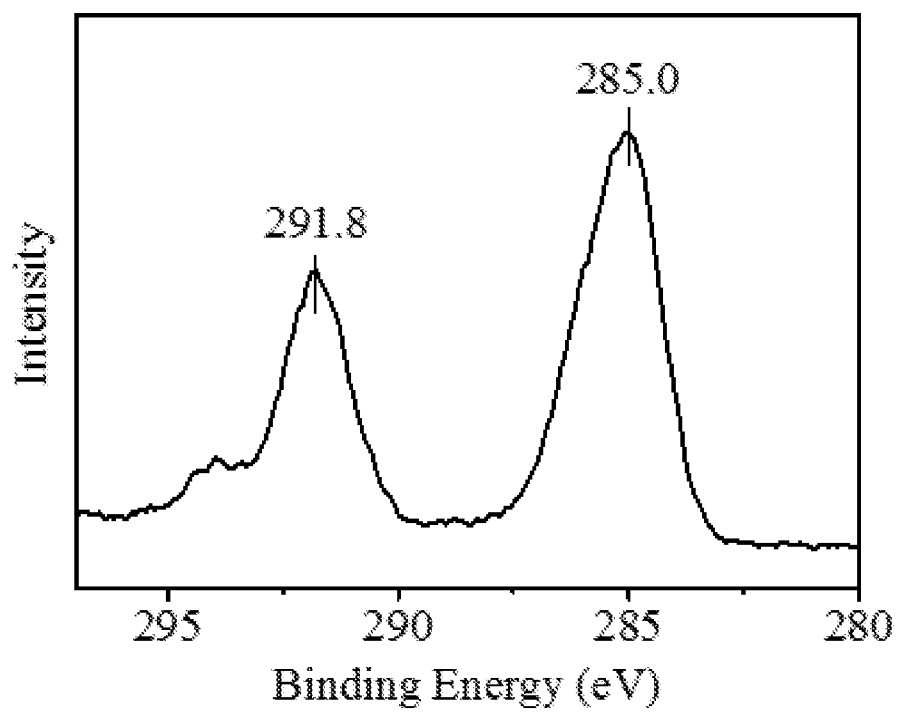
FIGS. 14A-14C show XPS spectra of ZIF-8-VF sample (FIG. 14A) C1s, (FIG. 14B) F1s, and (FIG. 14C) S2p. These strong XPS signals of C1s at relatively high binding energy, F1s, and S2p indicate that there are a lot of perfluoroalkyl groups grafted on the surface of the ZIF-8-VF sample.
Figure 14B:
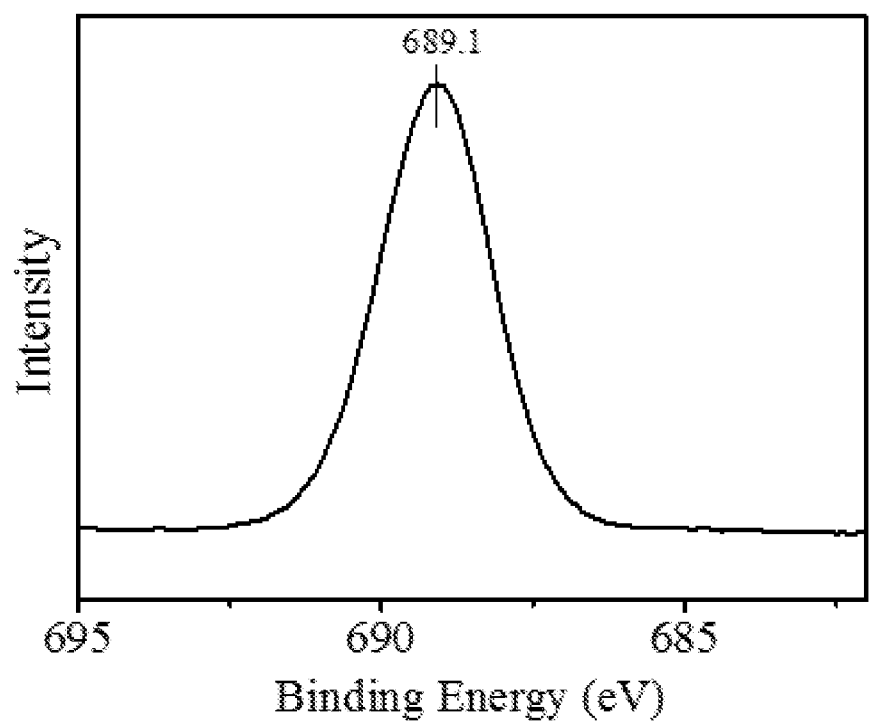
Figure 14C:
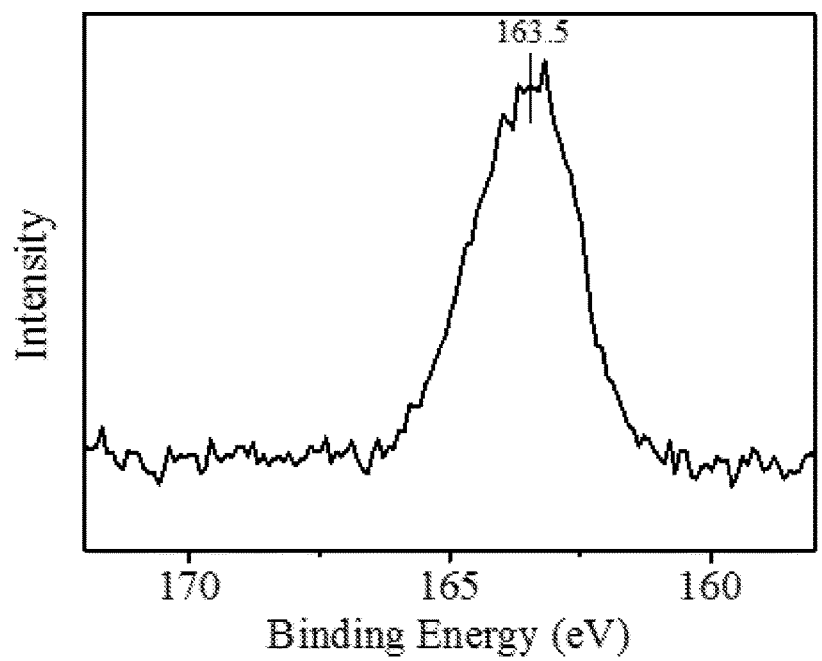
Figure 15A:
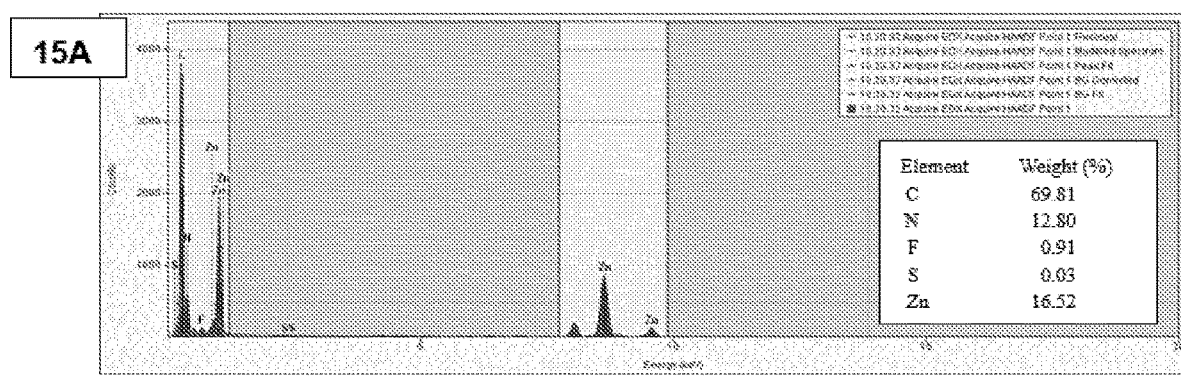
FIGS. 15A-15B show energy-dispersive X-ray (EDX) spectroscopy results (FIG. 15A) and HADDF-STEM and corresponding element mapping (FIG. 15B) of ZIF-8-VF sample. Signals were accumulated for 3 min.
Figure 15B:
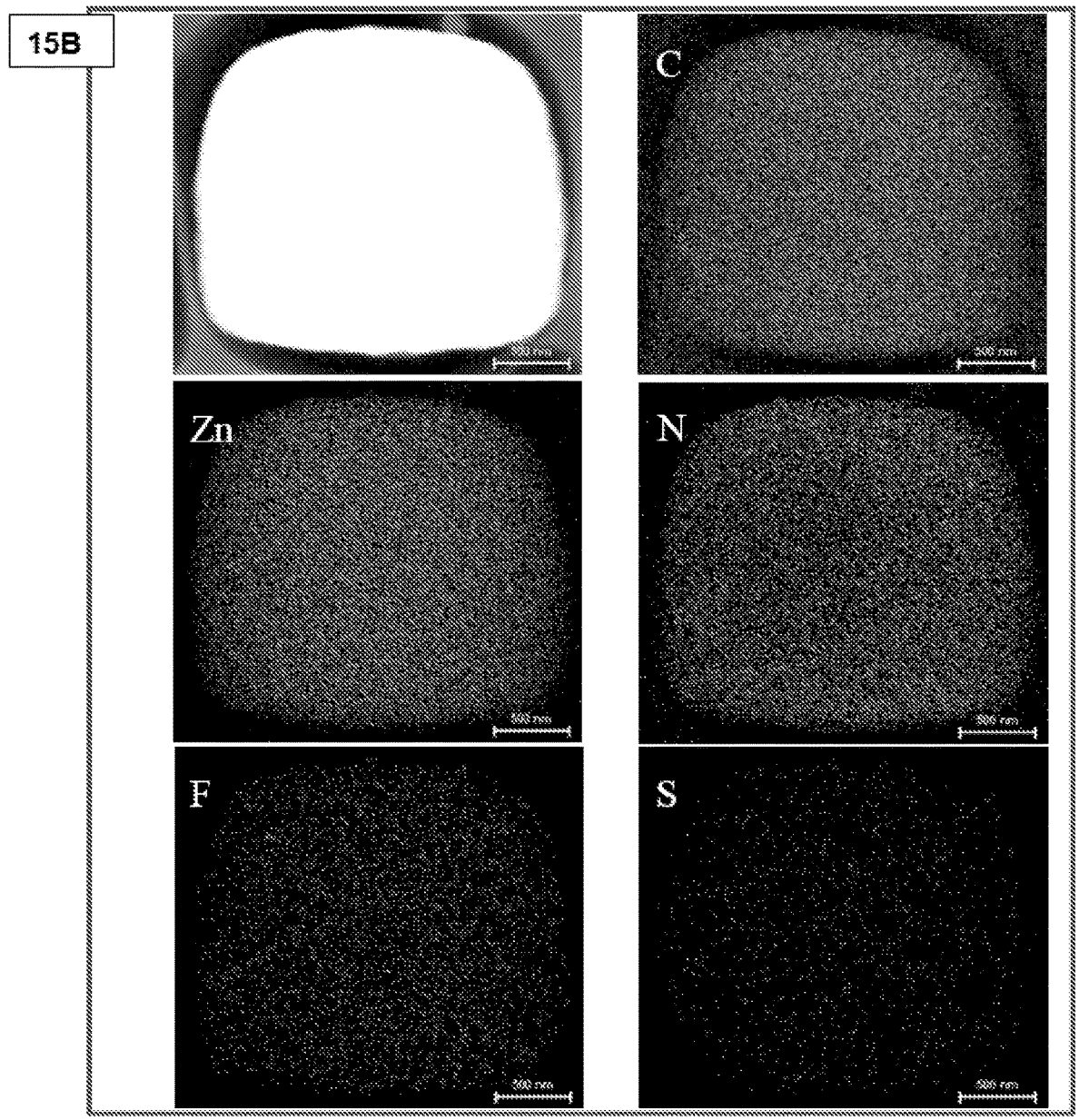
Figure 16A:
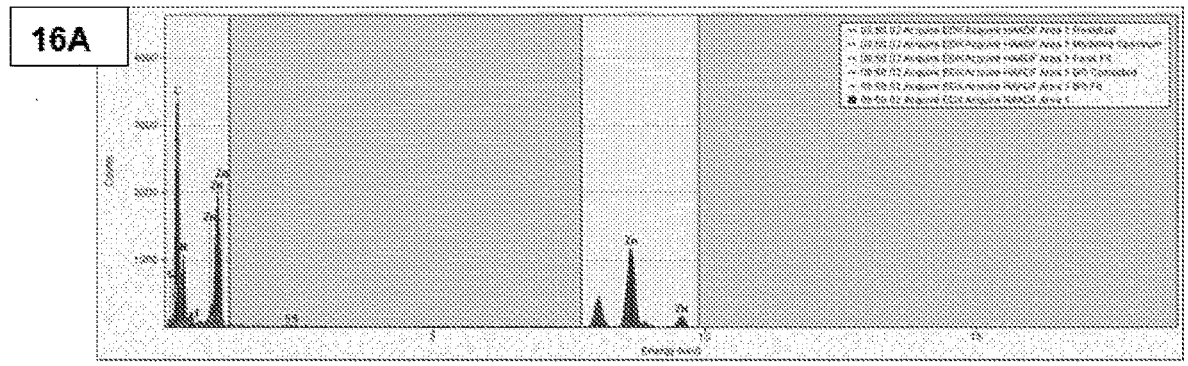
FIGS. 16A-16B show energy-dispersive X-ray (EDX) spectroscopy results (FIG. 16A) and HADDF-STEM and corresponding element mapping (FIG. 16B) of ZIF-8-VF sample after surface cleaning by plasma (25% $O_2$ and 75% Ar) for 2 min. Signals were accumulated for 3 min.
Figure 16B:
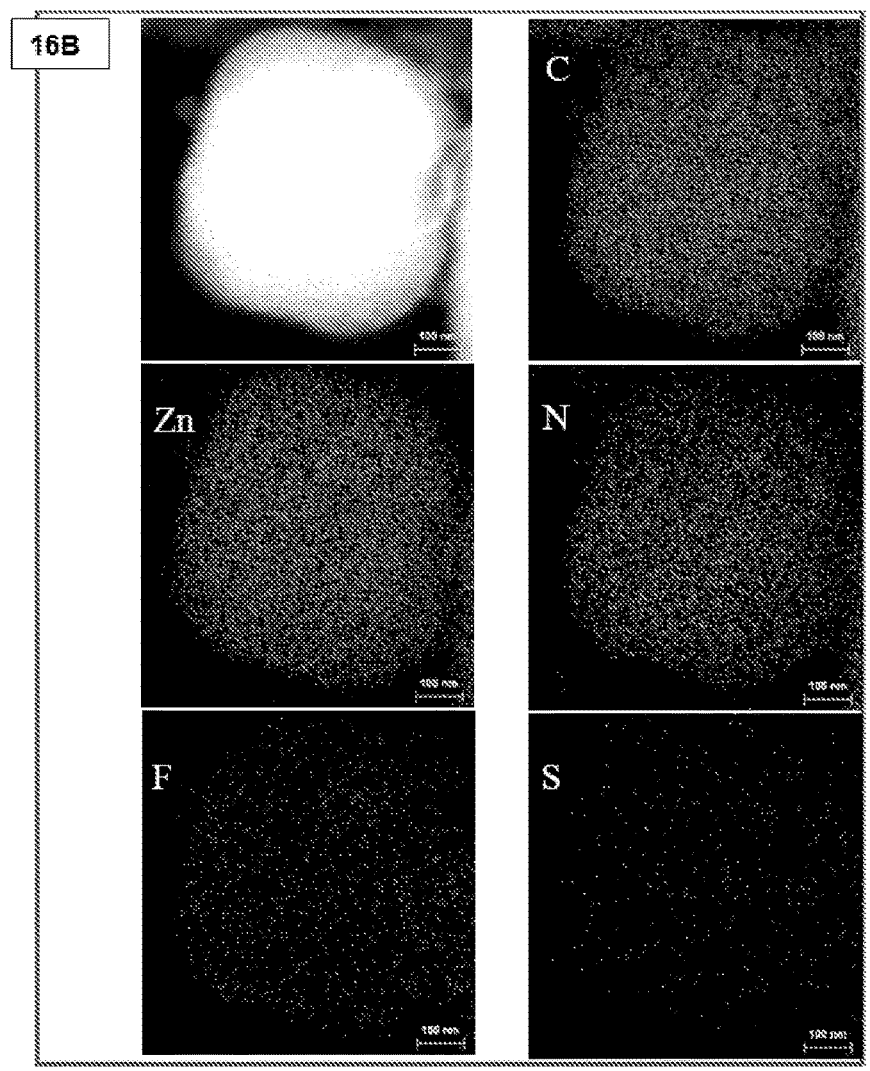

To identify the surface coating, the $^{13}C$ and $^{19}F$ MAS NMR spectra of ZIF-8-V and ZIF-8-VF were collected (FIG. 3E and FIG. 10). Albeit no distinct difference in the $^{13}C$ NMR spectra are observed for the two samples, ZIF-8-VF shows clear $^{19}F$ NMR signals with the same chemical shifts as those of the 1H,1H,2H,2H-perfluorodecanethiol compound (FIGS. 11A-11B), which can be attributed to the much higher natural abundance of $^{19}F$ nuclei than that of $^{13}C$ nuclei. In addition, the FT-IR spectra of the ZIF-8-VF show the characteristic bands of C—F at 1241 and 1211 $cm^{-1}$ as compared with the pristine ZIF-8-V (FIG. 12). These results indicate that the perfluoroalkyl groups have been successfully introduced on ZIF-8-V, but the grafting degree is relatively low. To quantify the degree of post-synthetic modification, the ZIF-8-VF crystals were digested and analyzed by the liquid $^1H$ NMR spectroscopy (FIGS. 13A-13B). The results show that 98% of vinyl groups are still intact, which means that ~2% of the vinyl groups are involved in the thiol-ene reaction probably occurring only on the exterior surface of the ZIF-8-V. To further prove the exterior surface modification, XPS spectroscopy experiments were conducted (FIG. 3F and FIGS. 14A-14C), which reveal that ZIF-8-VF exhibits very strong signals associated with the F species. However, after the surface removal by Ar ion etching treatment (2 KeV, 100s), the amount of residual F species is very small. These results suggest that the perfluoroalkyl groups should be mainly attached to the vinyl groups on the exterior surface of ZIF-8-V crystals, which is further confirmed by the energy-dispersive X-ray (EDX) mapping of the ZIF-8-VF sample before and after surface plasma cleaning process (FIGS. 15A-16B).

Examination of Amphiphobic Properties

Figure 4A:
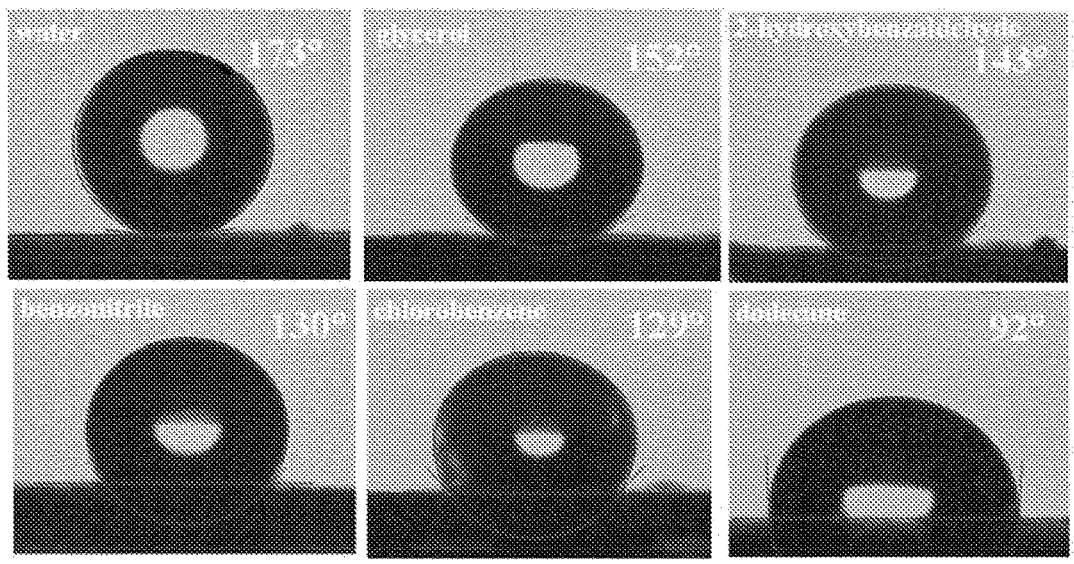
FIGS. 4A-4C show wettability tests and vapor sorption performance.
Figure 4B:
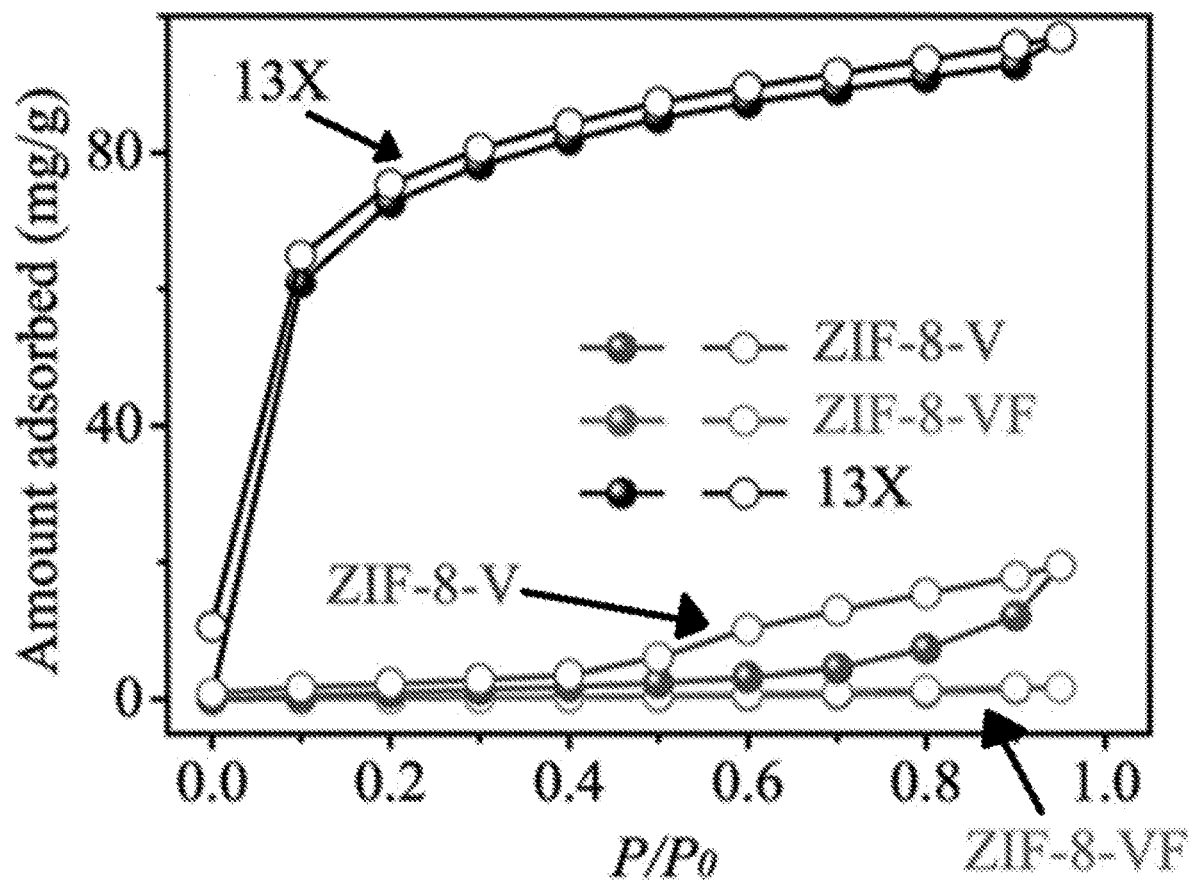
Figure 4C:
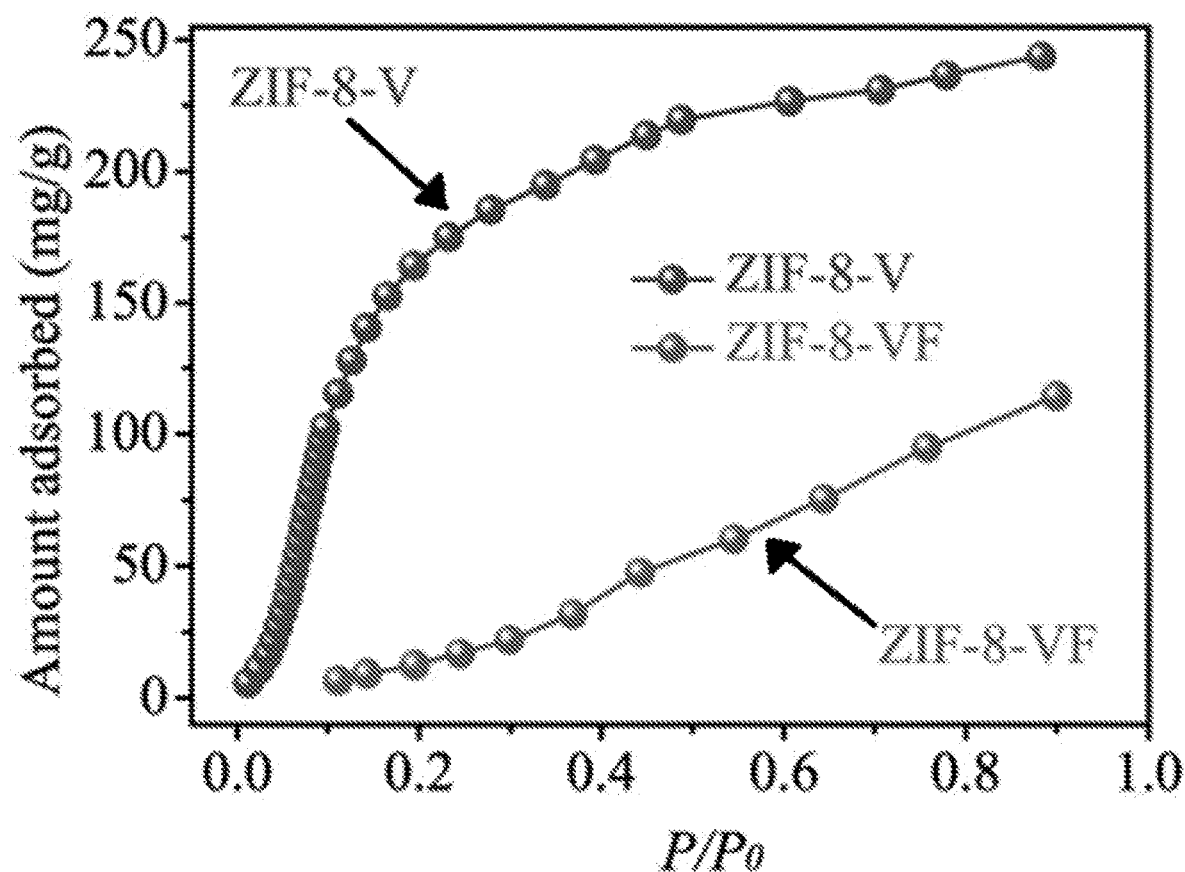

The surface wettability of ZIF-8-V and ZIF-8-VF was characterized by contact angle measurements. FIG. 4A shows contact angles of water and a series of organic compounds on the surface of ZIF-8-VF. Notably, the contact angle of water on ZIF-8-VF sample is as high as 173°, indicating its extraordinarily superhydrophobic feature. In contrast, ZIF-8-V gives the water contact angle at 89° (FIGS. 17A-17B). These results confirm that the surface coating of perfluoroalkyl groups significantly enhances the hydrophobicity of the material. Furthermore, when a series of organic compounds with different surface tensions, including glycerol, 2-hydroxybenzaldehyde, benzonitrile, chlorobenzene, and dodecane, were contacted with the surface of ZIF-8-VF, the contact angles at 150°, 143°, 130°, 129°, and 92°, respectively were observed, indicating the oleophobic feature of ZIF-8-V. The results of the contact angle experiments coupled with the permanent porosity, as revealed from the $N_2$ sorption measurement, thereby identify ZIF-8-VF as an amphiphobic porous material. In contrast, the contact angles of 2-hydroxybenzaldehyde, benzonitrile, chlorobenzene, dodecane on ZIF-8-V are less than 5° (FIGS. 18A-18E), indicating its superoleophilic nature. The superhydrophobic behaviour of the ZIF-8-VF was further illustrated by water vapour adsorption experiments (FIG. 4B). As a comparison, hydrophilic zeolite 13X exhibits strong affinity for water even at very low relative humidity ($P/P_0<0.1$). Hydrophobic ZIF-8-V exhibits a hysteresis loop at relative humidity higher than 0.5, indicating that ZIF-8-V is capable of adsorbing water at high humidity. Interestingly, ZIF-8-VF adsorbs a negligible amount of water even at $P/P_0$ up to 0.9, which is anticipated to be effective to preclude the entrance of water within the interior pores of the MOF (C. Serre, et al., *Angew. Chem. Int. Ed.* 51, 6048-6051, 2012; Yang, et al., *J. Am. Chem. Soc.* 133, 18094-18097, 2011; Padial, et al., *Angew. Chem. Int. Ed.* 52, 8290-8294, 2013). Toluene sorption isotherms collected at 298 K also reveal quite different adsorption behaviors for ZIF-8-V and ZIF-8-VF (FIG. 4C). For example, when $P/P_0$ is 0.15, it is observed that the adsorption capacity of toluene in ZIF-8-V and ZIF-8-VF is 143 and 7 mg $g^{-1}$, respectively. The repellency of ZIF-8-VF for toluene should stem from its excellent oleophobicity. The above results highlight that the surface coated amphiphobic perfluoroalkyl groups serve as a shield to effectively prevent the access of water and organic compounds into the micropores of MOFs.

Investigation of Chemical Shielding Effect

Figure 5A:
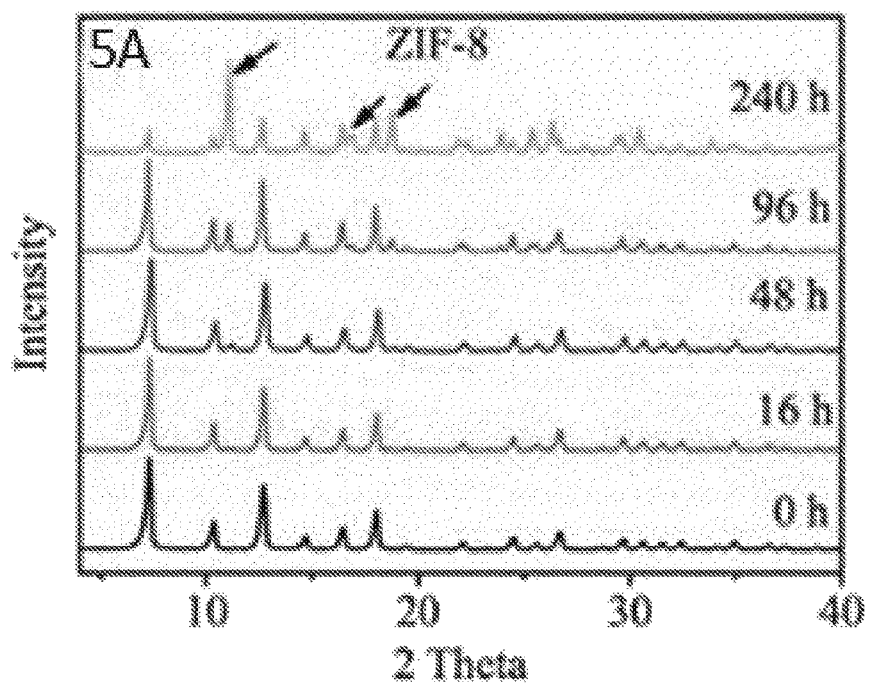
FIGS. 5A-5F show a stability comparison of ZIF-8 and ZIF-8-VF.
Figures 5B, 5C:
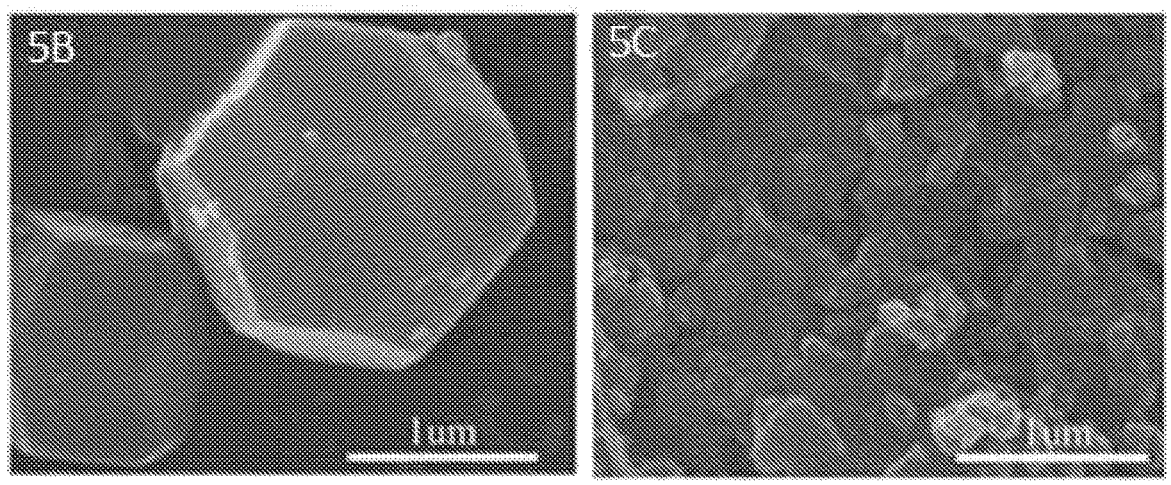
Figure 5D:
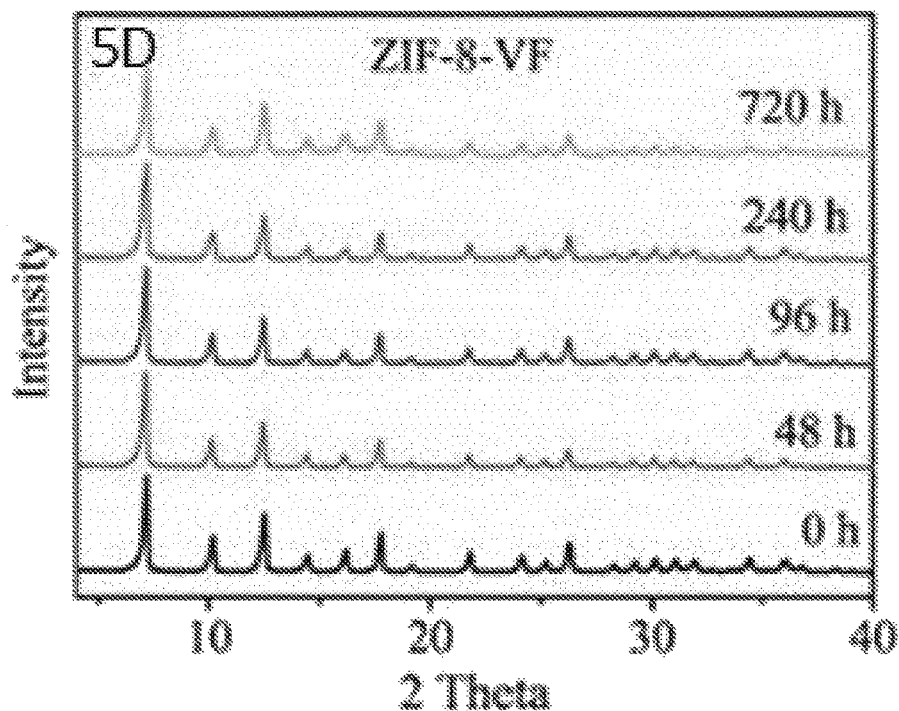
Figures 5E, 5F:
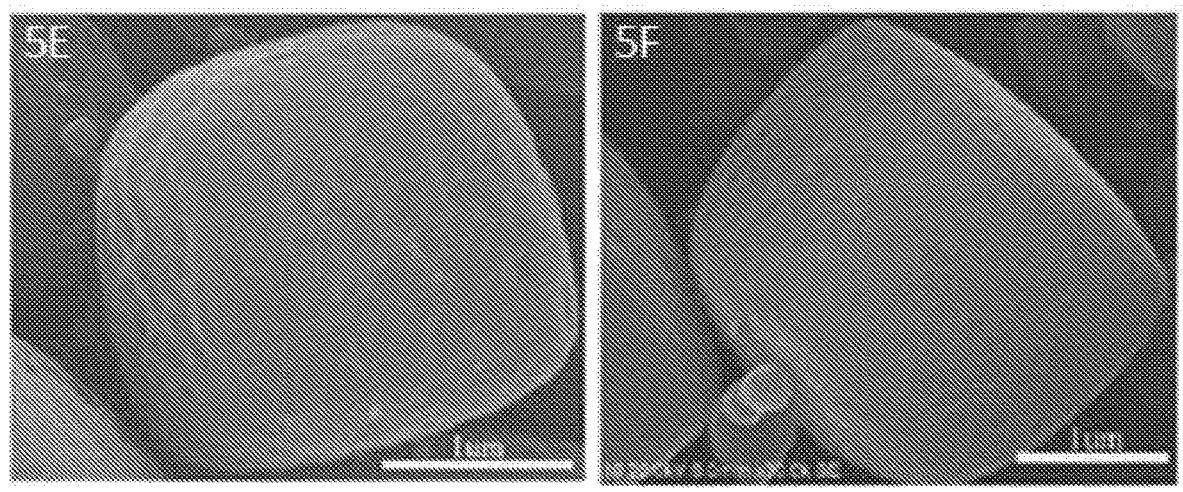
Figure 6A:
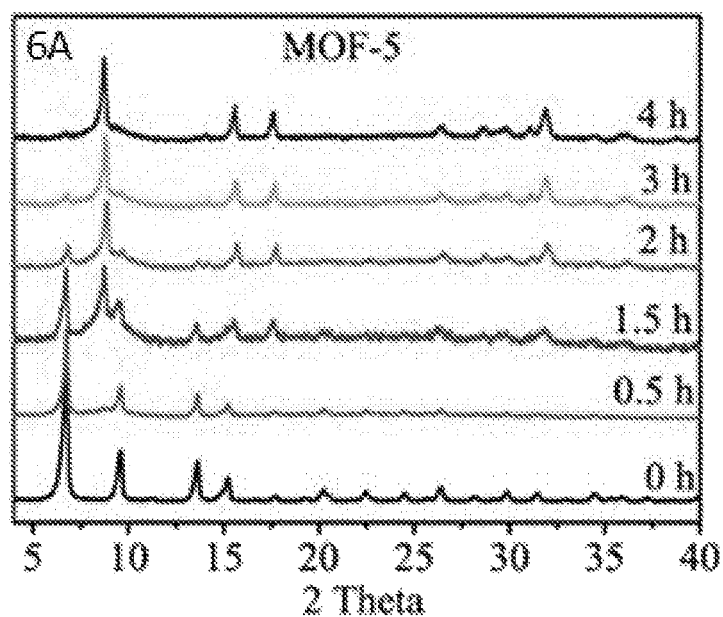
FIGS. 6A-6H show a stability comparison of MOF-5 and MOF-5-VF.
Figures 6B, 6C:
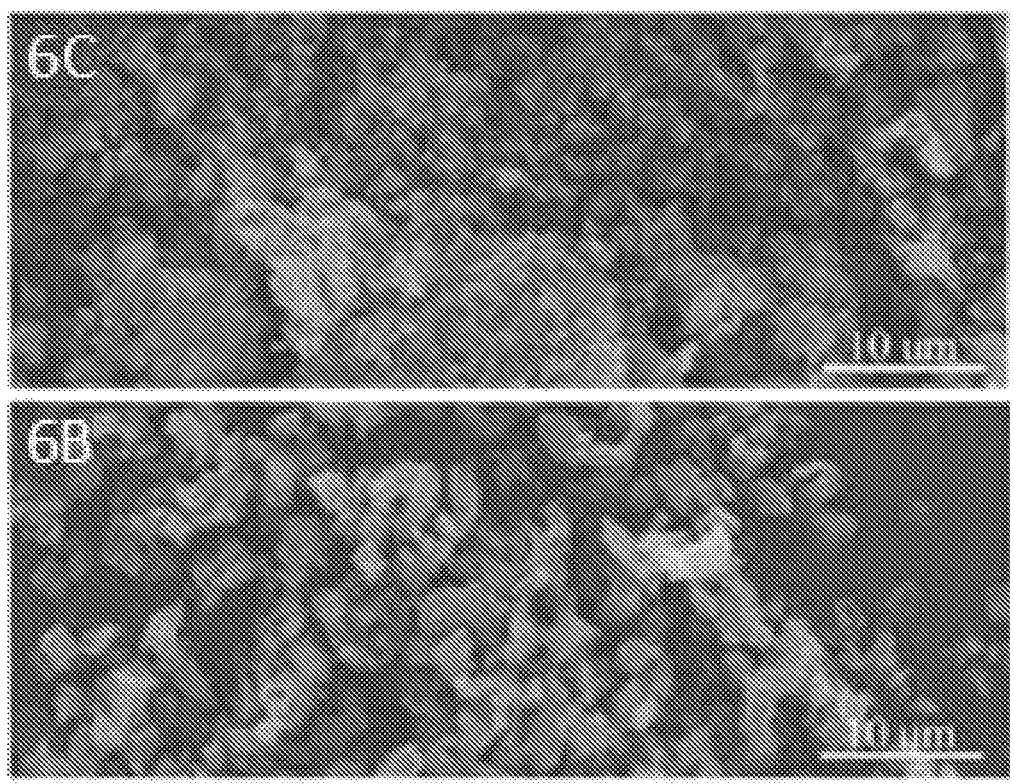
Figure 6D:
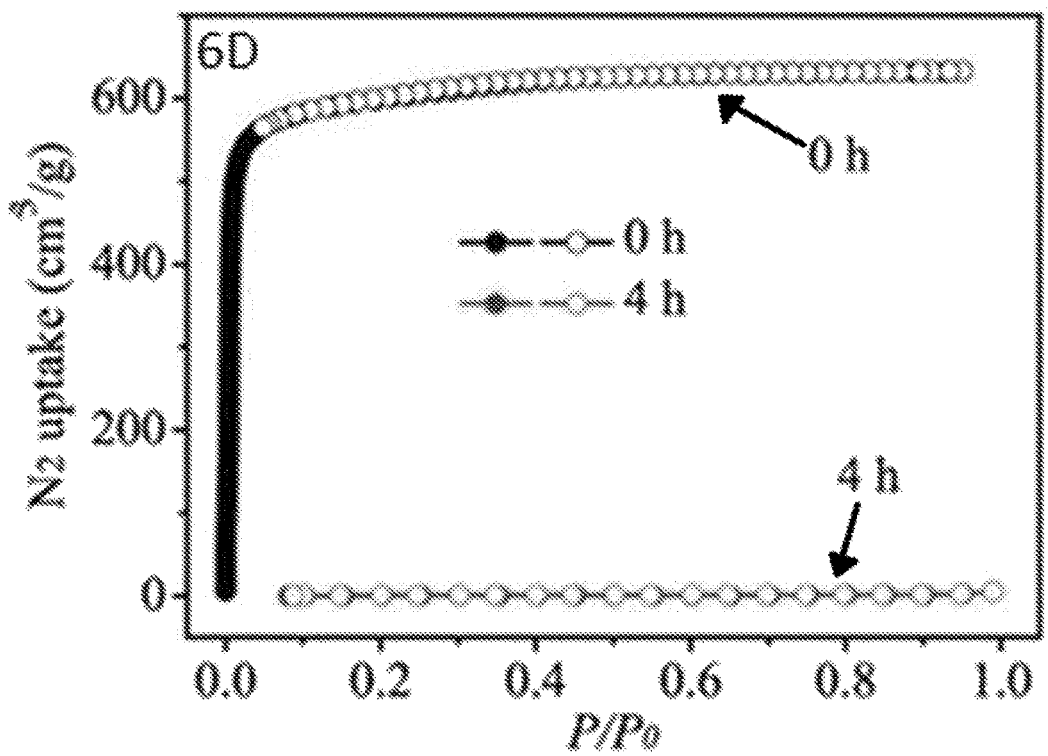
Figures 6E, 6F, 6G:
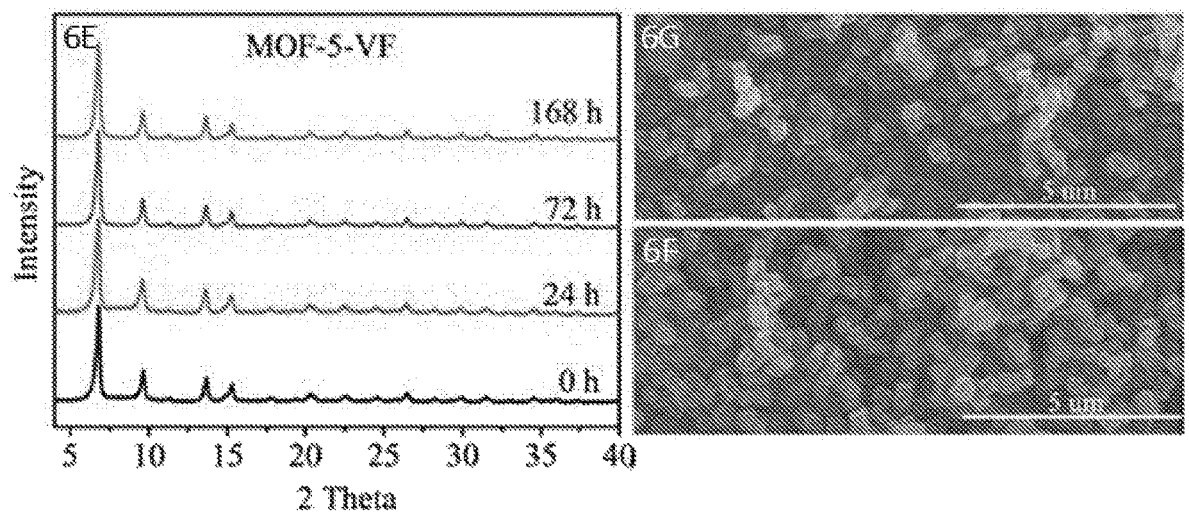
Figure 6H:
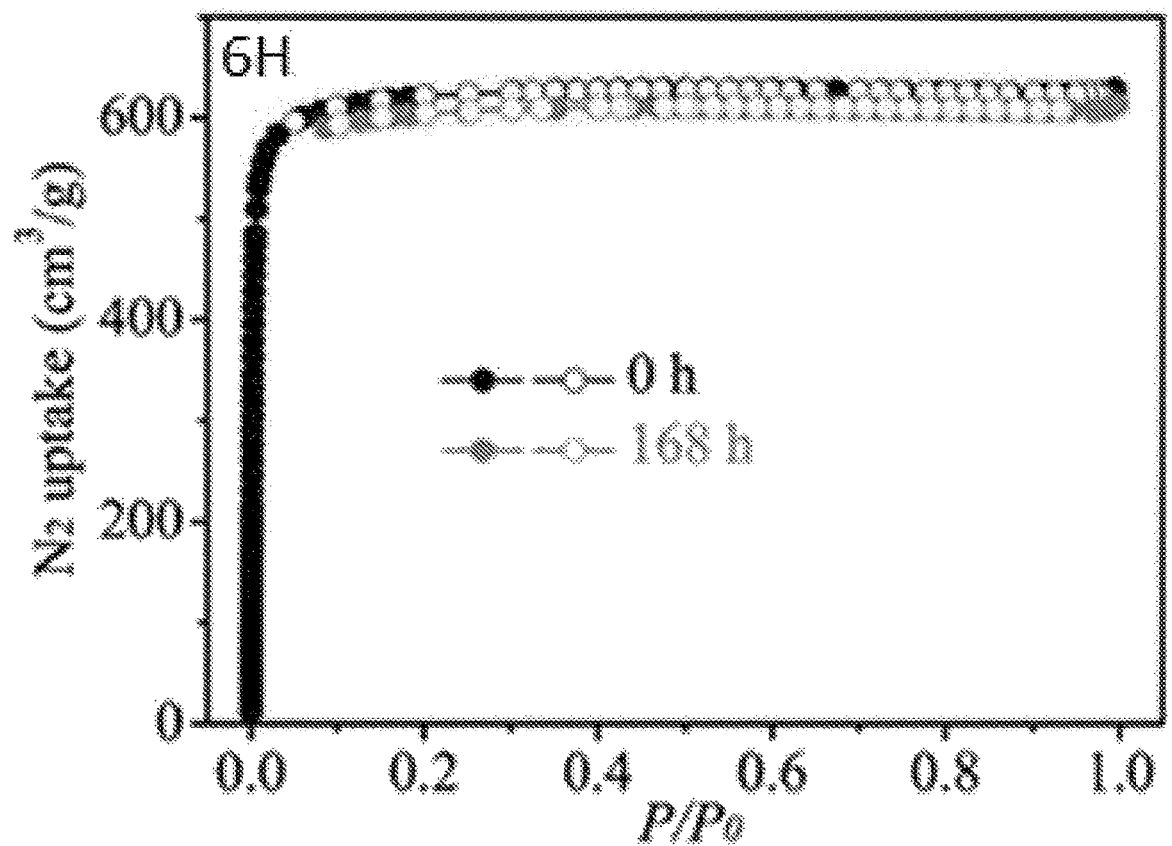
Figures 19A, 19B:
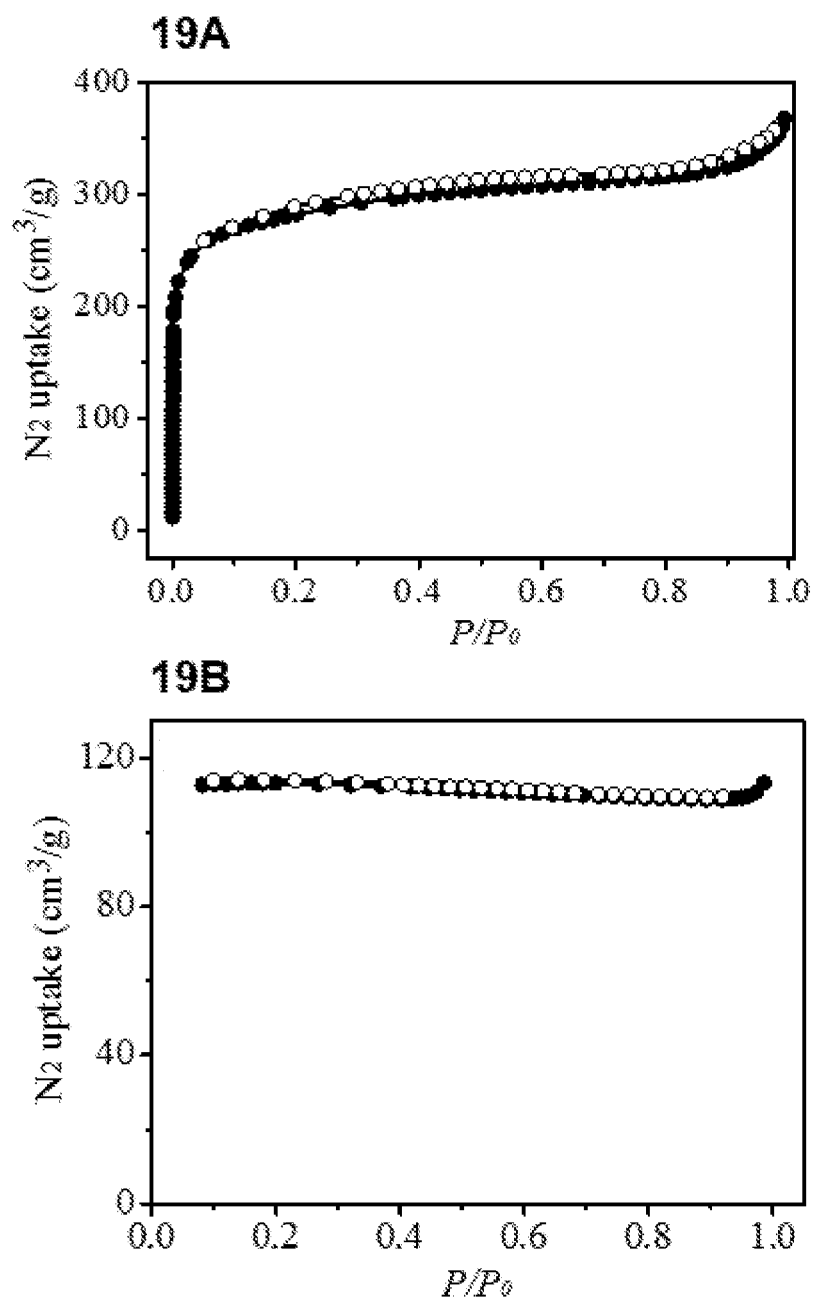
FIGS. 19A-19B show $N_2$ sorption isotherms.
Figure 20:
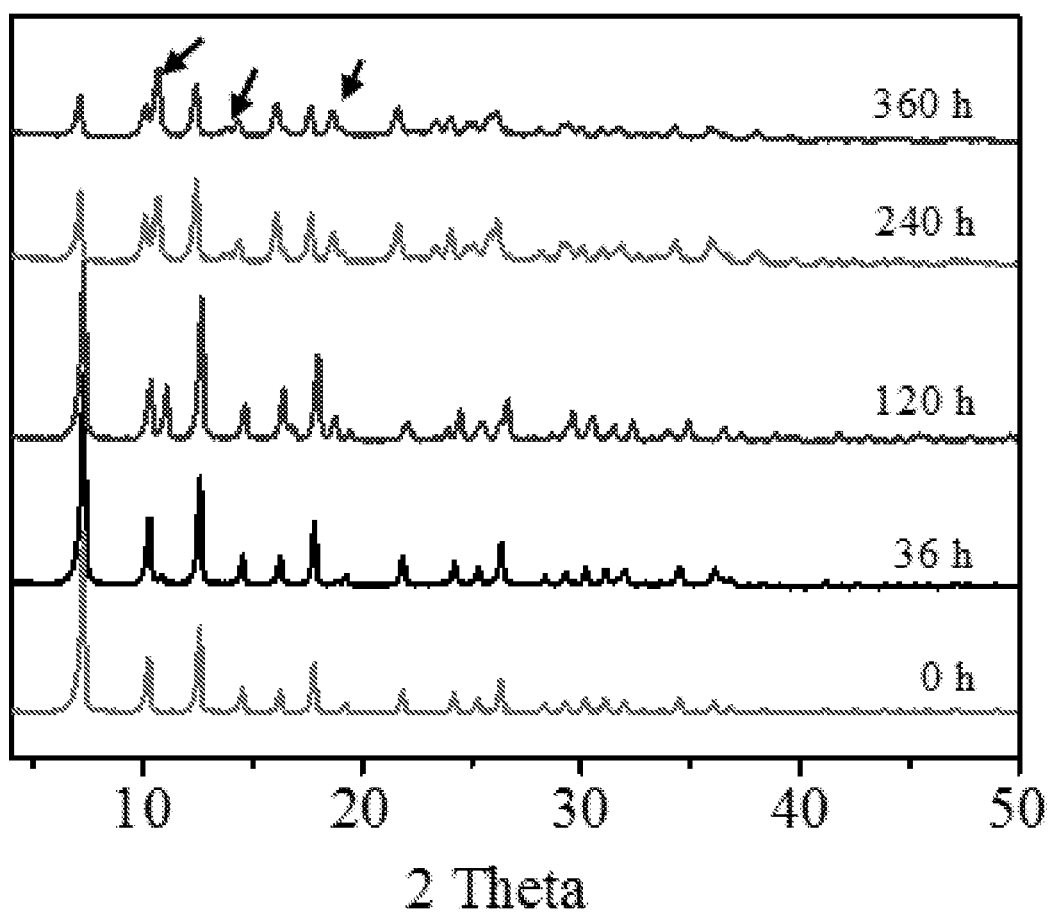
FIG. 20 shows selected PXRD patterns of ZIF-8-V aged at 100% relative humidity and 45° C. under $CO_2$ for different duration times. Main peaks of unknown crystalline phase are marked with black arrows. These results indicate the ZIF-8-V sample experienced a chemical decomposition for long-term exposure in humidified $CO_2$ environment.
Figure 21:
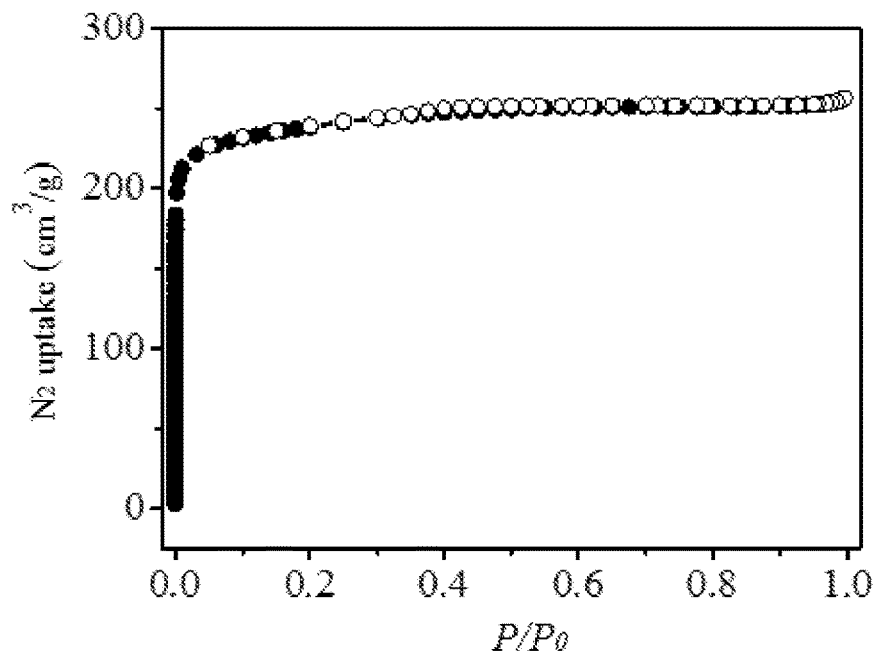
FIG. 21 shows $N_2$ sorption isotherms of ZIF-8-VF after aging at 100% relative humidity and 45° C. under $CO_2$ for 720 h. The well retained BET surface area and pore volume indicate that ZIF-8-VF sample is highly stable for long-term aging in a humid $CO_2$ environment.

The long-term stability under practical environments (e.g. humidity) has been recognized as an issue for MOFs, which can be accessed via the method of accelerated aging (Mottillo, et al., *Angew. Chem. Int. Ed.* 53, 7471-7474, 2014). To evaluate the chemical shielding effect resulted from amphiphobicity, the PXRD patterns of various ZIF materials that are exposed to 100% relative humidity under $CO_2$ atmosphere at 45° C. were monitored for different duration times. When ZIF-8, one of the claimed very stable MOF materials, was aged under the above conditions for 16 h, it was observed that some additional peaks associated to an unknown phase appeared, as shown by the black arrows in FIG. 5A (Zhang, et al., *Chem. Rev.* 112, 1001-1033, 2012; Phan, et al., *Acc. Chem. Res.* 43, 58-67, 2010). Moreover, the ratio of the unknown phase increases with the increase of exposure time. For instance, after 240 h, a large portion of ZIF-8 was transformed, indicative of structural degradation of ZIF-8. This conclusion is supported by $N_2$ sorption studies at 77 K, suggesting a remarkable reduction in the surface area (from 957 to 378 m$^2$ g$^{-1}$, FIGS. 19A-19B) as well as SEM images showing clear cracks of the crystals (FIGS. 5B-5C). Similar changes in the PXRD patterns were also observed for ZIF-8-V (FIG. 20). In striking contrast, ZIF-8-VF does not experience any change in the PXRD patterns, even after aging under the above conditions over 720 h. The SEM images show that the ZIF-8-VF sample has maintained perfect crystal morphology and its surface area is also fully retained (802 m$^2$ g$^{-1}$, FIG. 21). These results highlight that the amphiphobic surface can serve as a chemical shield to effectively prevent ZIF-8-VF from being attacked by the mixture of $H_2O$ and $CO_2$.

DISCUSSION

Figures 22A, 22B, 22C:
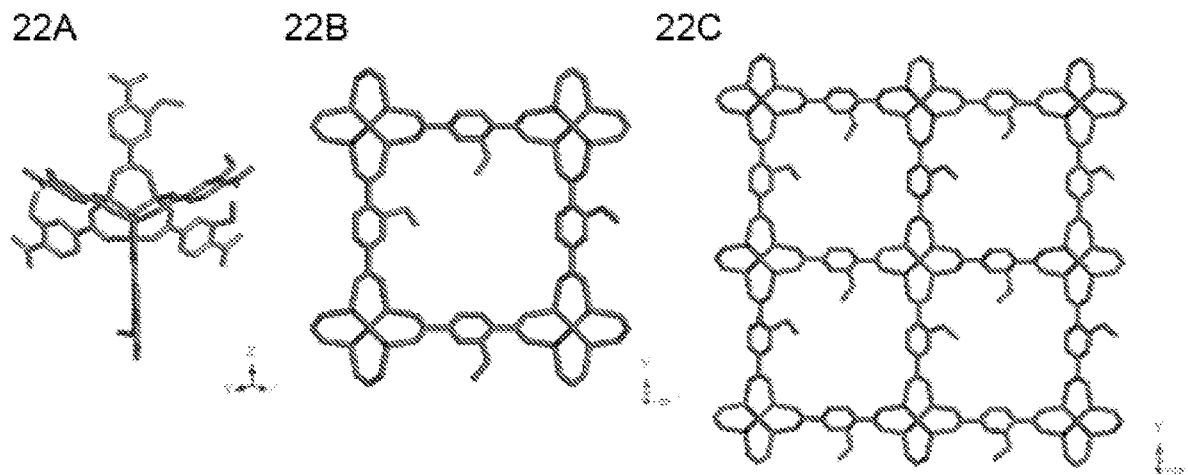
FIGS. 22A-22C are representations of the crystal structure of MOF-5-V.
Figure 23:
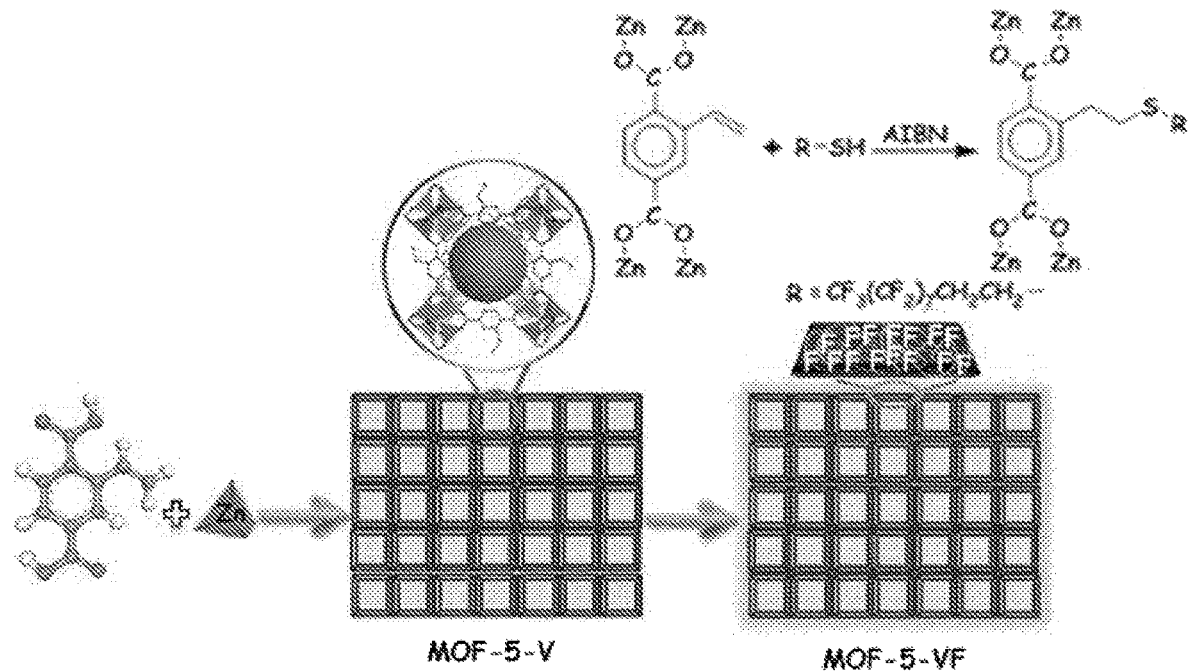
FIG. 23 shows a synthetic route to amphiphobic MOF-5-V (MOF-5-VF). Illustration of creating amphiphobic surface via grafting perfluoroalkyl groups on the surface of the MOF-5-V crystal.
Figure 24:
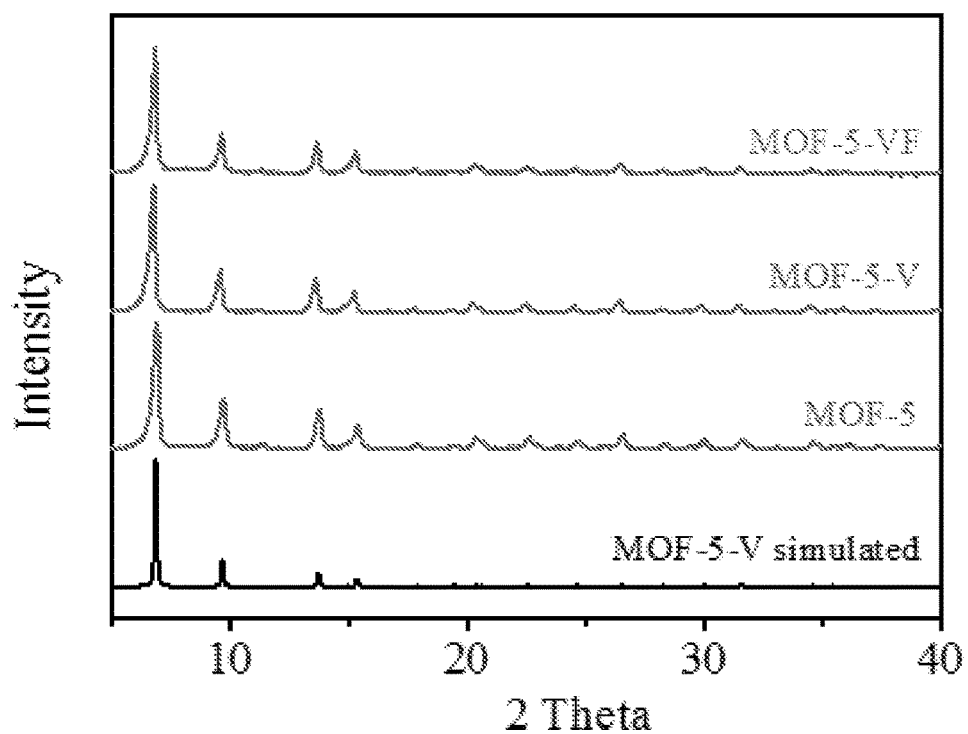
FIG. 24 shows PXRD patterns. These PXRD patterns indicate that MOF-5-V has the same topology structure as MOF-5. After post synthetic modification, the structure of MOF-5-VF is retained, and the high crystallinity of the parent framework is also well maintained.
Figure 25:
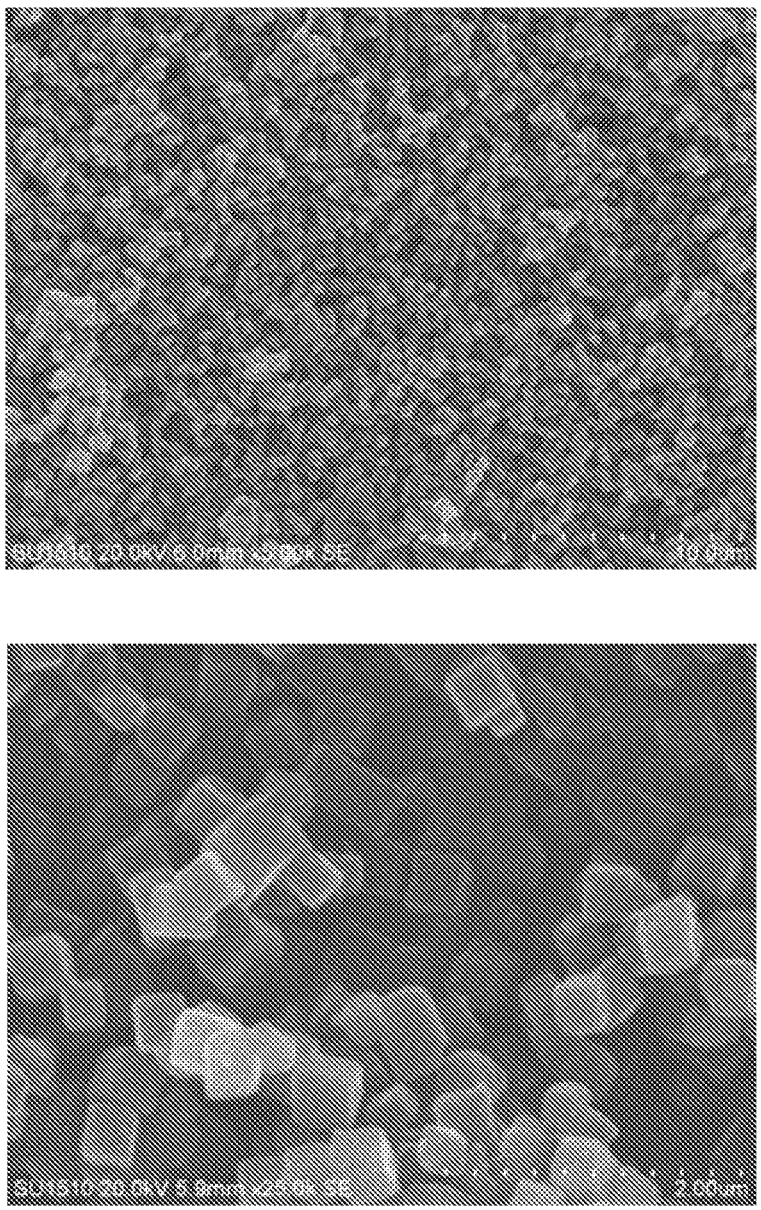
FIG. 25 shows two SEM images of MOF-5-V sample.
Figure 26:
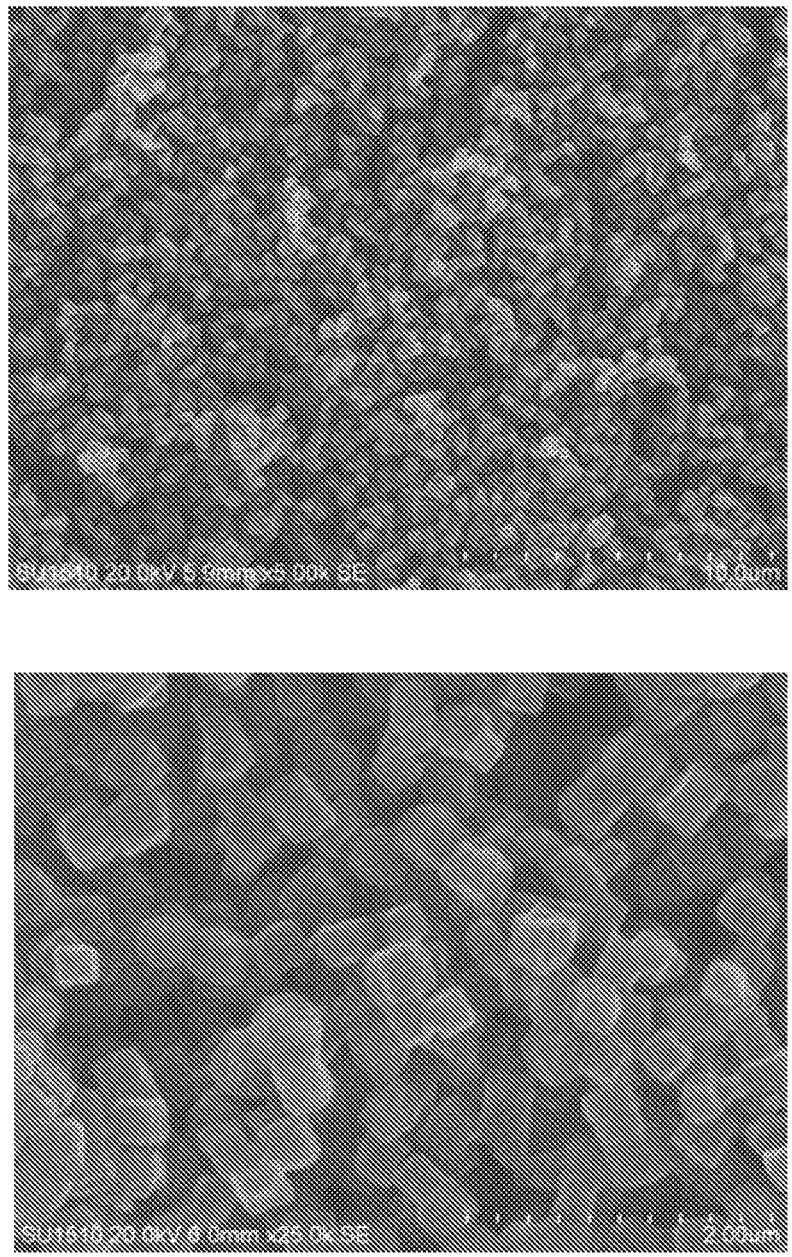
FIG. 26 shows two SEM images of MOF-5-VF sample. These pictures indicate that the crystal morphology is well retained after the introduction of perfluoroalkyl groups.
Figure 27:
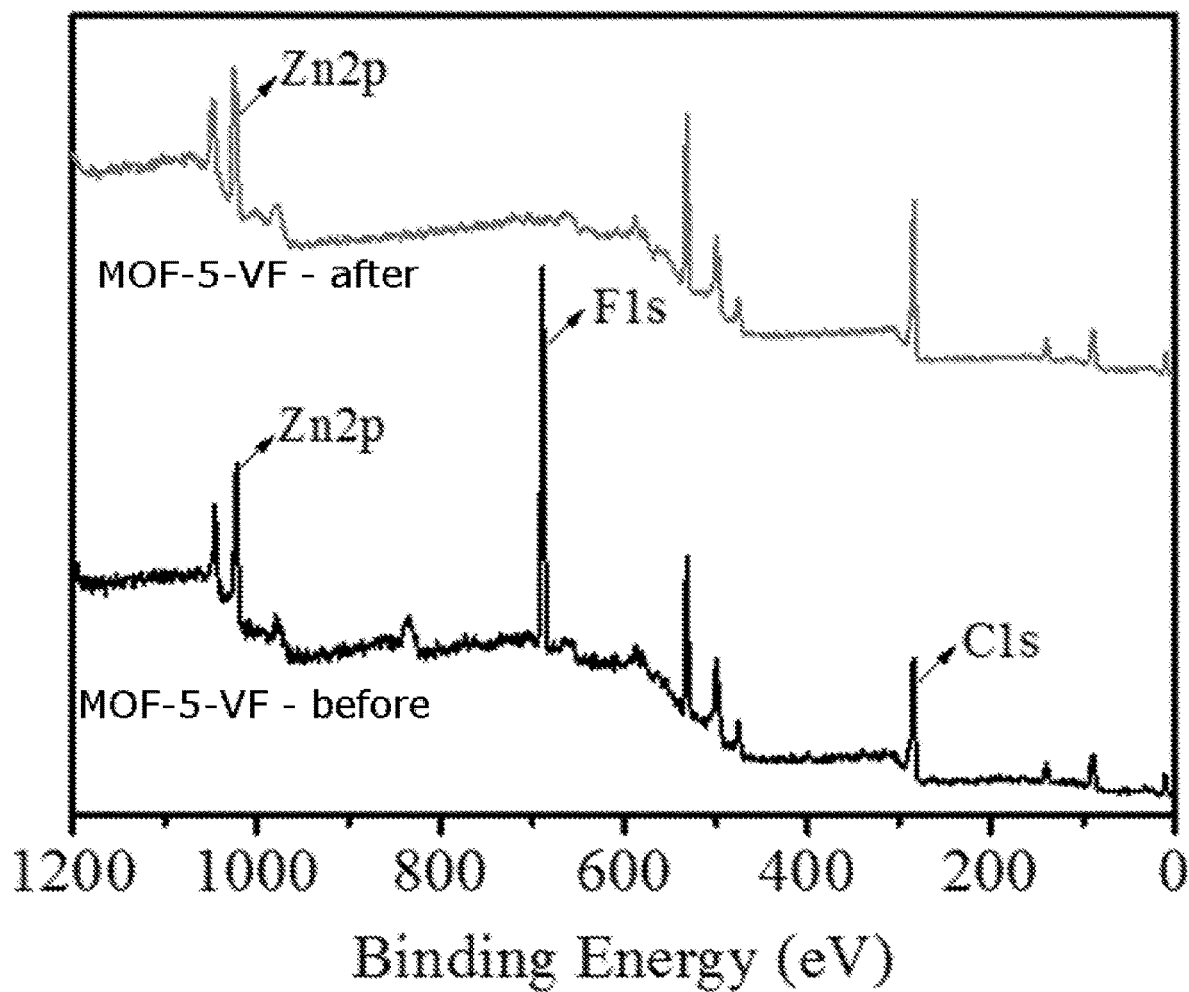
FIG. 27 shows XPS spectra of MOF-5-VF sample before (lower spectra) and after (upper spectra) surface Ar$^+$ ions etching. The strong signal of F species in the as-synthesized MOF-5-VF (around 23 atom %) sample can hardly be detected after surface Ar$^+$ ions etching, suggesting that 1H,1H,2H,2H-perfluorodecanethiol molecules are also mainly attached to the vinyl groups on the surface of the MOF-5-V crystals.
Figure 28:
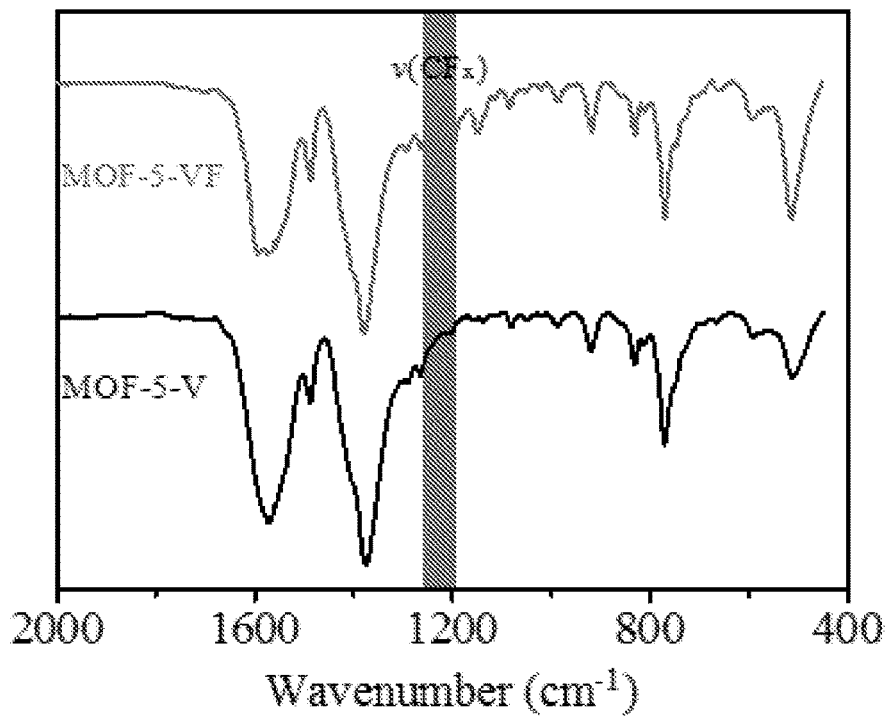
FIG. 28 shows FT-IR spectra of MOF-5-V and MOF-5-VF. The appearance of characteristic bands of C—F at 1241 and 1211 cm$^{-1}$ in MOF-5-VF indicates the successful grafting of perfluoroalkyl groups (Qian, et al., *J. Am. Chem. Soc.* 136, 15849-15852).
Figures 29A, 29B, 29C, 29D, 29E, 29F:
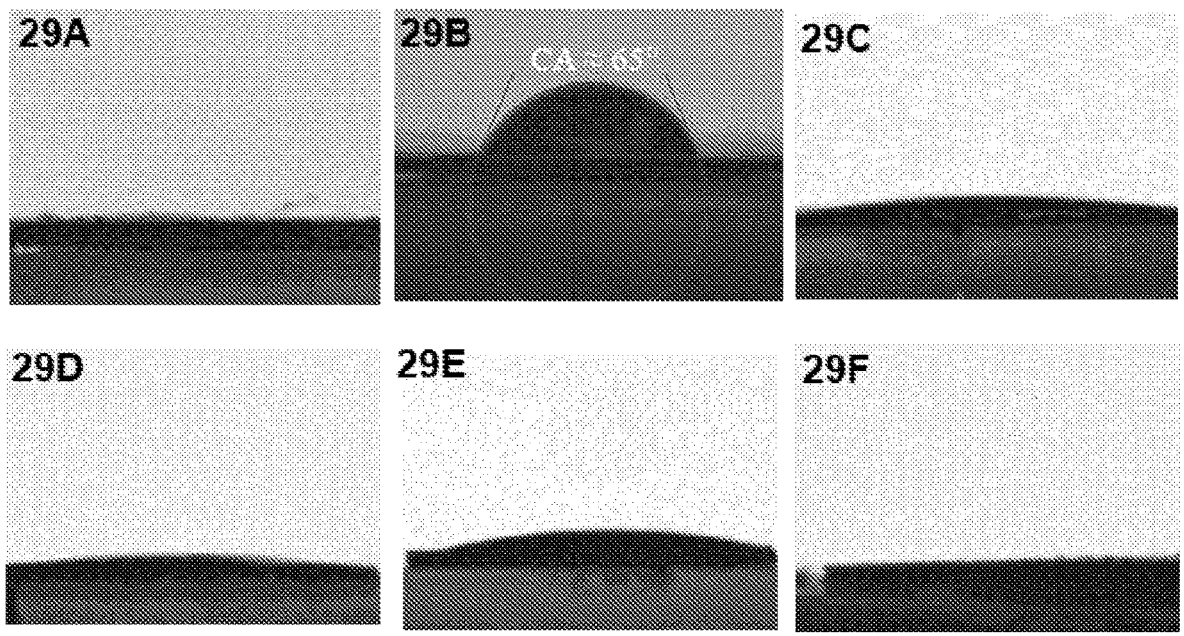
FIGS. 29A-29F show contact angles of various compounds on the pressed pellet of MOF-5-V sample.
Figures 30A, 30B, 30C, 30D, 30E, 30F:
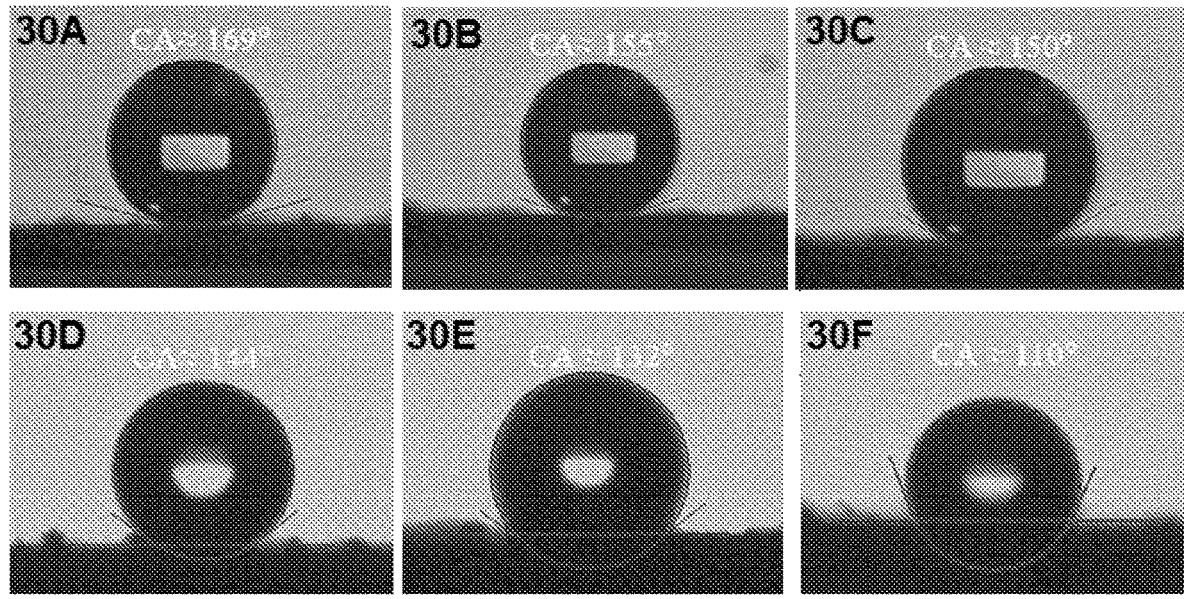
FIGS. 30A-30F show contact angles of various compounds on the pressed pellet made of MOF-5-VF sample.
Figures 31A, 31B:
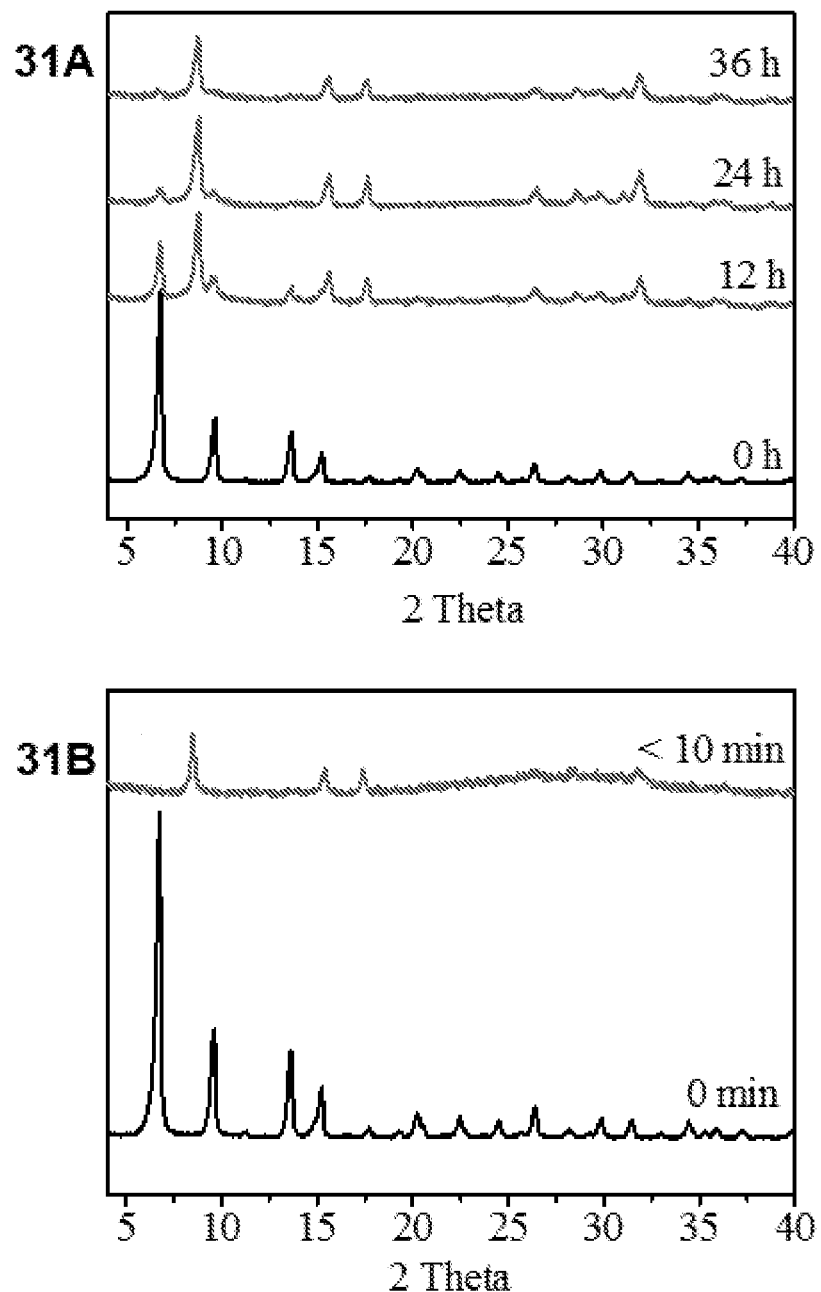
FIGS. 31A-31B show PXRD patterns of MOF-5 exposure to (FIG. 31A) 60% relative humidity, and (FIG. 31B) water for different time. These results indicate that MOF-5 is moisture sensitive.
Figure 32A:
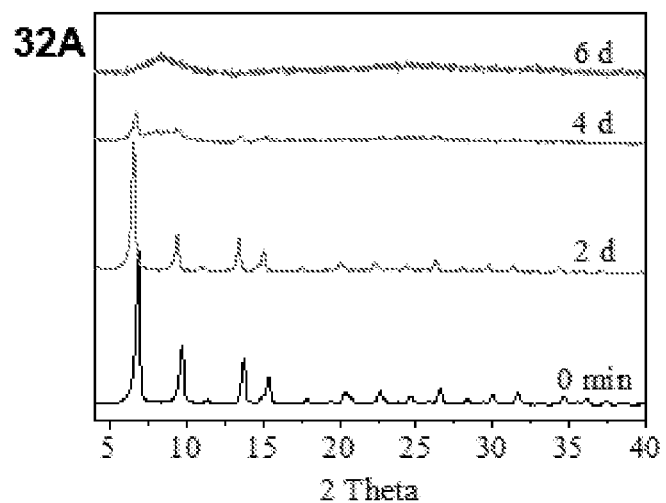
FIGS. 32A-32C show PXRD patterns of MOF-5-V exposure to various environments for different time.
Figure 32B:
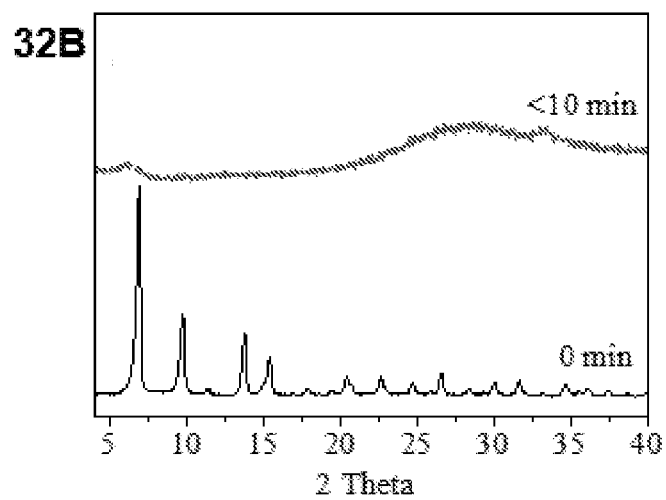
Figure 32C:
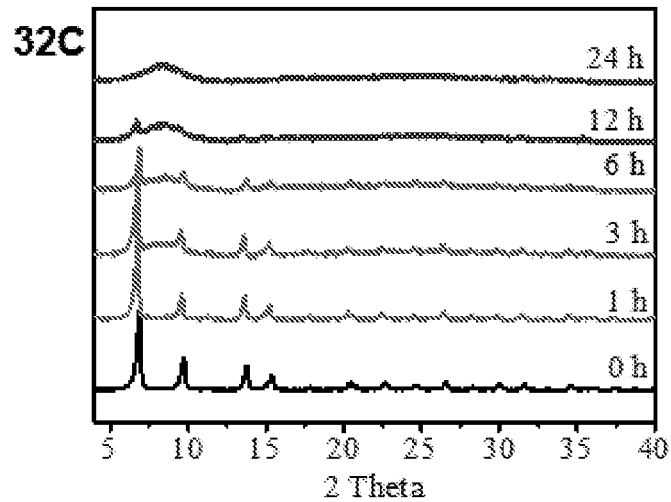
Figure 35:
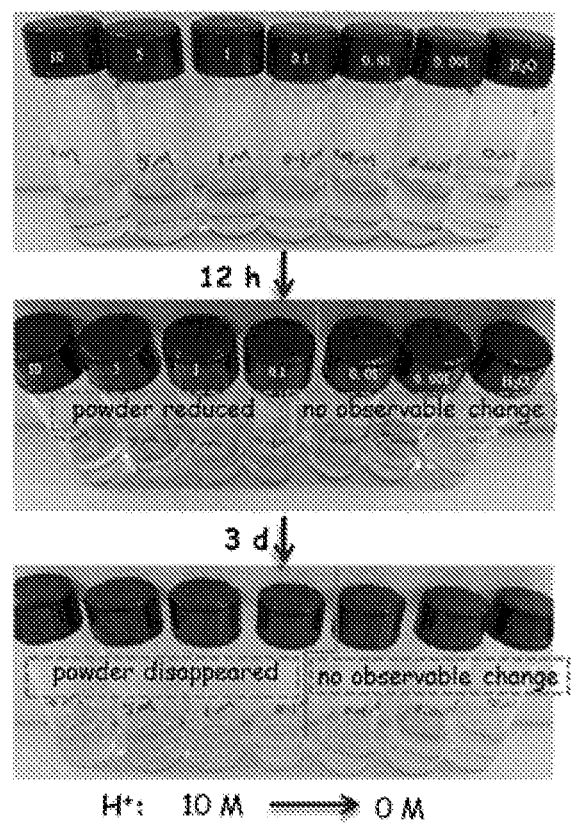
FIG. 35 shows stability tests of ZIF-8-VF in acid solutions. Photos of ZIF-8-VF crystals in various $H_2SO_4$ aqueous solutions with $H^+$ concentration from 10 M to 0 M. The ZIF-8-VF crystals float on all of the testing solutions, but observable digestion of the sample occurs under the acid conditions with the $H^+$ concentration higher than 0.1 M. No significant change was observed for the samples in the $H^+$ concentrations lower than 0.01 M. To make sure there is sufficient acid solution, a large amount of 0.01 M acid solution was used (3 mg of ZIF-8-VF crystals vs 50 mL of acid solution). After 7 days, the ZIF-8-VF crystals still floated on the solution and did not lead to observable structural change, which thus indicates that ZIF-8-VF can tolerate the $H_2SO_4$ solutions with $H^+$ concentration lower than 0.01 M. These results suggest that ZIF-8-VF is more stable than ZIF-8-V in acid solutions.
Figure 36:
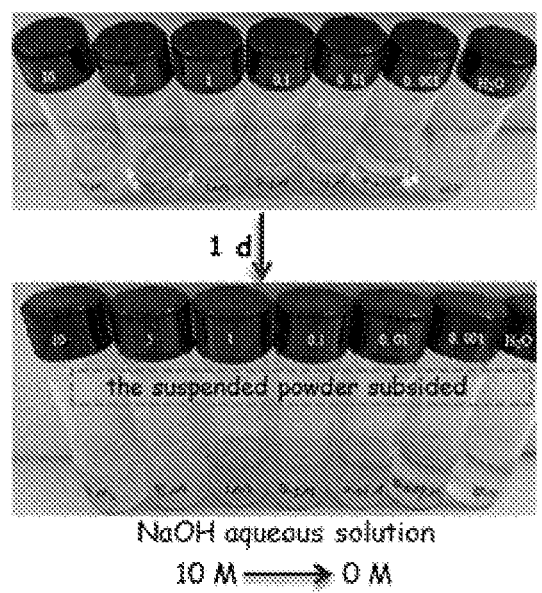
FIG. 36 shows stability tests of ZIF-8-V in basic solutions. Photos of ZIF-8-V in various NaOH aqueous solutions with $OH^-$ concentration from 10 M to 0 M. The suspended ZIF-8-V crystals subsided after 1 day for all the solutions tested. PXRD results revealed that samples immersed in those solutions did not experience any significant change after 7 days, thus suggesting the retention of structural integrity.
Figure 37:
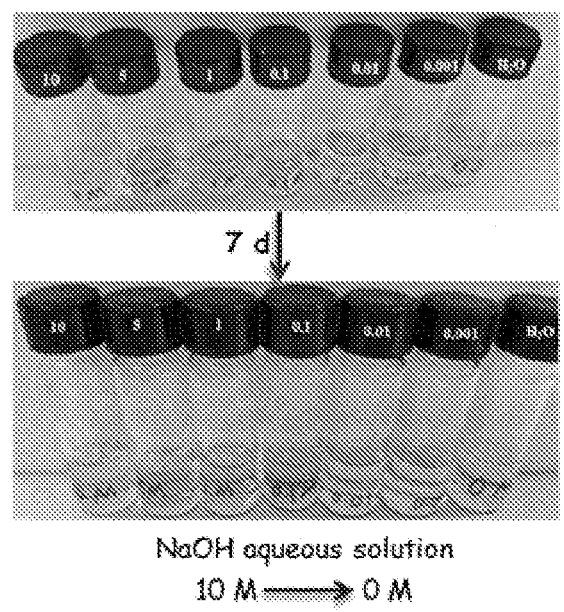
FIG. 37 shows stability tests of ZIF-8-VF in basic solutions. Photos of ZIF-8-VF crystals in various NaOH aqueous solutions with $OH^-$ concentration from 10 M to 0 M. The ZIF-8-VF crystals float on all of the testing solutions and continue floating after 7 days. PXRD studies revealed no significant changes in the diffraction patterns for all samples after 7 days, thus indicative of no phase transition or framework collapse for ZIF-8-VF even in 10 M NaOH.
Figure 38:
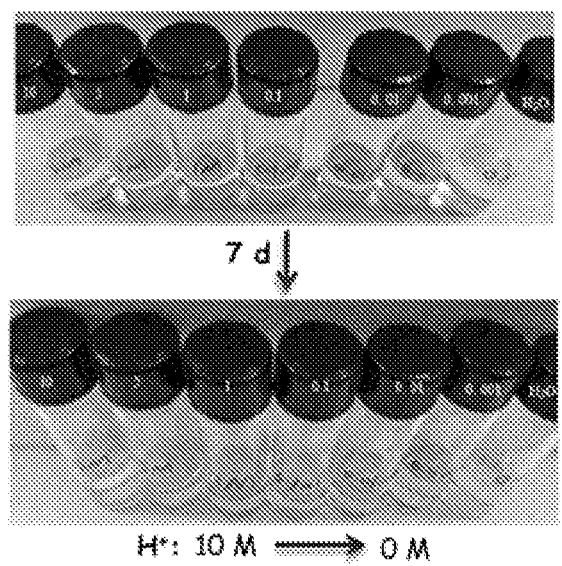
FIG. 38 shows stability tests of MOF-5-VF in acid solutions. Photos of MOF-5-VF crystals in various $H_2SO_4$ aqueous solutions with $H^+$ concentration from 10 M to 0 M. The MOF-5-VF crystals float on all of the testing solutions and continue floating for at least 7 days. PXRD patterns of all samples after 7 day's treatment are well consistent with the original ones, thus indicative of no phase transition or framework collapse for MOF-5-VF even in 10 M $H_2SO_4$. In sharp contrast, exposure to water led to complete degradation of the MOF-5V framework within 10 minutes, as evidenced by the rapidly vanishing PXRD peaks.
Figure 39:
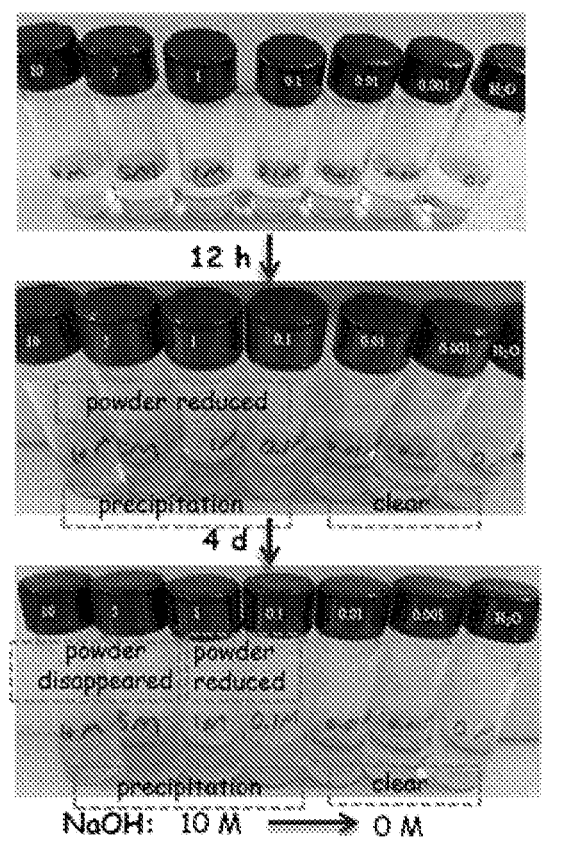
FIG. 39 shows stability tests of MOF-5-VF in basic solutions. Photos of MOF-5-VF crystals in various NaOH aqueous solutions with $OH^-$ concentration from 10 M to 0 M. The MOF-5-VF crystals float on all of the testing solutions, but observable precipitation formed for those in the $OH^-$ concentration higher than 0.1 M. PXRD results reveal that the formed precipitations are amorphous. With respect to the samples in the $OH^-$ concentrations lower than 0.01 M, no observable change occurs and their PXRD patterns are well consistent with the original ones, which indicate that MOF-5-VF can tolerate the basic solutions with $OH^-$ concentrations lower than 0.01 M.
Figure 40:
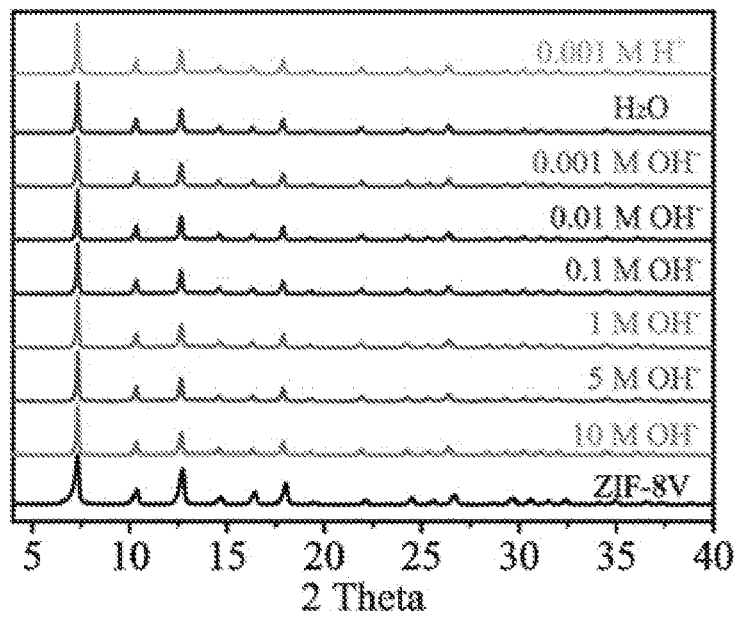
FIG. 40 shows PXRD patterns of ZIF-8-V after treatments in acid and basic solutions with different concentrations for 7 days.
Figure 41:
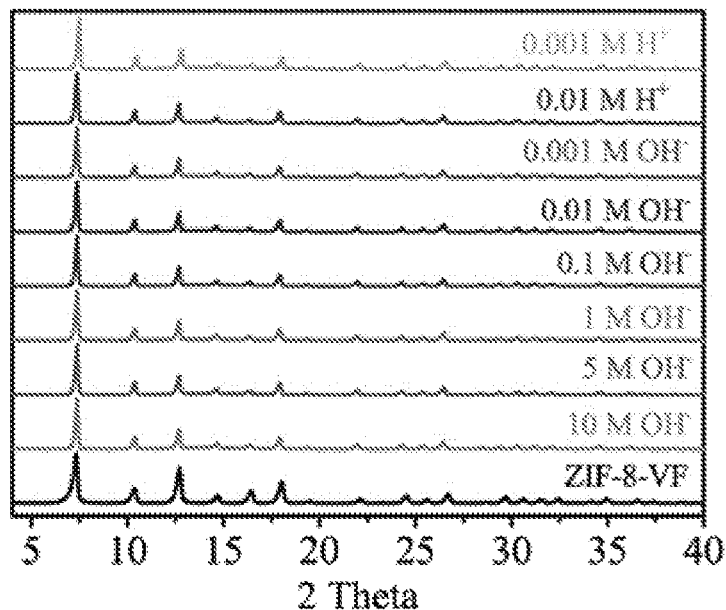
FIG. 41 shows PXRD patterns of ZIF-8-VF after treatments in acid and basic solutions with different concentrations for 7 days.
Figure 42:
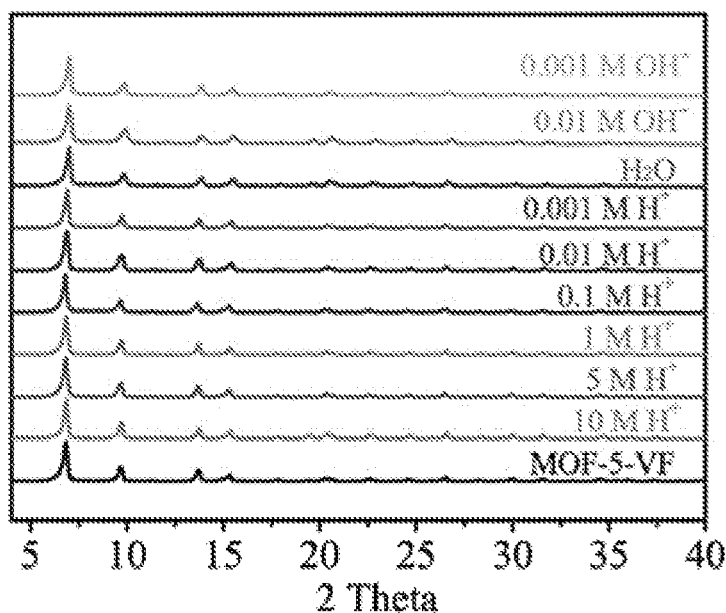
FIG. 42 shows PXRD patterns of MOF-5-VF after treatments in acid and basic solutions with different concentrations for 7 days.

To demonstrate the general applicability of the strategy presented herein, vinyl-functionalized MOF (MOF-5-V, FIGS. 22A-22C) isostructural with MOF-5 that is notoriously water/moisture unstable was synthesized using the custom-designed ligand of 2-vinylterephthalic acid (FIG. 23). After surface chemical coating of the perfluoroalkyl groups (FIGS. 24-28), the resultant material (MOF-5-VF) demonstrates amphiphobic property (FIGS. 29A-30F), which renders it with extraordinary tolerance to the humidified $CO_2$, as evidenced by its well-retained crystallinity, morphology, and surface area after aging under the aforementioned conditions for 7 days (FIGS. 6E-6H). In sharp contrast, as observed from PXRD patterns, MOF-5 starts to transform to the nonporous MOF-69 under the humidified $CO_2$ environment within less than 1.5 h, and such a transformation almost finishes after 4 h as indicated by the complete disappearance of MOF-5 phase in the PXRD patterns. Correspondingly, the SEM images show that the MOF-5 crystals underwent serious corrosion along with the complete loss of its porosity after 4 h (FIGS. 6A-6D). These results highlight the chemical shielding effect of amphiphobicity in protecting the highly unstable MOF-5 analogues under various conditions such as humidified $CO_2$ atmosphere, environment with high humidity, and aqueous solutions (FIGS. 31A-33B). The greatly enhanced stability of amphiphobic MOFs over their pristine ones in both acidic and basic aqueous solutions further underscore the chemical shielding effect of amphiphobicity (FIGS. 34-43).

In summary, we have demonstrated for the first time the successful impartment of amphiphobicity (i.e. superhydrophobic and oleophobic) on the exterior surface of the highly single crystalline porous materials of MOFs. Such amphiphobic surface can serve as a chemical shield to effectively prevent the MOFs from being attacked by water and organic compounds, thereby bestowing the MOFs with ultrastability toward moisture/water and humidified $CO_2$. Our approach contributed herein to create amphiphobic surface has little impact on the crystallinity and porosity of the pristine MOF materials, thereby pioneering a perspective to protect crystalline porous materials under various chemical environments for numerous applications.

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

TABLE 1

Crystal data and structure refinement for ZIF-8-V
Supplementary Table 1 Crystal data and structure refinement for ZIF-8-V.

| | |
|---|---|
| Identification code | ZIF-8-V |
| Empirical formula | $C_{10}H_{10}N_4O_{2.38}Zn$ |
| Formula weight | 289.59 |
| Temperature/K | 100.0 |
| Crystal system | cubic |
| Space group | I-43m |

TABLE 1-continued

Crystal data and structure refinement for ZIF-8-V
Supplementary Table 1 Crystal data and structure refinement for ZIF-8-V.

| | |
|---|---|
| a/Å | 17.1473(6) |
| b/Å | 17.1473(6) |
| c/Å | 17.1473(6) |
| α/° | 90 |
| β/° | 90 |
| γ/° | 90 |
| Volume/Å$^3$ | 5041.8(5) |
| Z | 12 |
| $\rho_{calc}$g/cm$^3$ | 1.145 |
| μ/mm$^{-1}$ | 2.049 |
| F(000) | 1764.0 |
| Crystal size/mm$^3$ | 0.06 × 0.06 × 0.06 |
| Radiation | CuKα (λ = 1.54178) |
| 2Θ range for data collection/° | 10.318 to 117.6 |
| Index ranges | −19 ≤ h ≤ 18, −17 ≤ k ≤ 17, −18 ≤ l ≤ 19 |
| Reflections collected | 11102 |
| Independent reflections | 711 [$R_{int}$ = 0.0778, $R_{sigma}$ = 0.0250] |
| Data/restraints/parameters | 711/1/71 |
| Goodness-of-fit on F$^2$ | 1.143 |
| Final R indexes [I >= 2σ (I)] | $R_1$ = 0.0586, w$R_2$ = 0.1777 |
| Final R indexes [all data] | $R_1$ = 0.0828, w$R_2$ = 0.2128 |
| Largest diff. peak/hole/e Å$^{-3}$ | 0.55/−0.55 |
| Flack parameter | 0.02(3) |

TABLE 2

Crystal data and structure refinement for MOF-5-V
Supplementary Table 2 Crystal data and structure refinement for MOF-5-V.

| | |
|---|---|
| Identification code | MOF-5-V |
| Empirical formula | $C_{24}H_9O_{13}Zn_4$ |
| Formula weight | 766.79 |
| Temperature/K | 100(2) |
| Crystal system | cubic |
| Space group | Fm-3m |
| a/Å | 25.795(7) |
| b/Å | 25.795(7) |
| c/Å | 25.795(7) |
| α/° | 90 |
| β/° | 90 |
| γ/° | 90 |
| Volume/Å$^3$ | 17164(15) |
| Z | 8 |
| $\rho_{calc}$g/cm$^3$ | 0.593 |
| μ/mm$^{-1}$ | 0.237 |
| F(000) | 3016.0 |
| Crystal size/mm$^3$ | 0.04 × 0.04 × 0.04 |
| Radiation | synchrotron (λ = 0.41328) |
| 2Θ range for data collection/° | 3.044 to 26.522 |
| Index ranges | −28 ≤ h ≤ 22, −25 ≤ k ≤ 16, −28 ≤ l ≤ 28 |
| Reflections collected | 7721 |
| Independent reflections | 671 [$R_{int}$ = 0.1641, $R_{sigma}$ = 0.0676] |
| Data/restraints/parameters | 671/8/36 |
| Goodness-of-fit on F$^2$ | 1.041 |
| Final R indexes [I >= 2σ (I)] | $R_1$ = 0.0716, w$R_2$ = 0.2103 |
| Final R indexes [all data] | $R_1$ = 0.1150, w$R_2$ = 0.2477 |
| Largest diff. peak/hole/e Å$^{-3}$ | 0.35/−0.32 |

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. An amphiphobic porous material comprising either:
   i) (a) a porous framework comprising a metal organic framework, wherein the metal organic framework comprises a plurality of ligands having a structure according to one of the following formulas

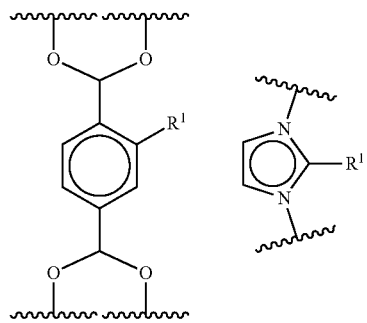

where

represents a bond to a metal atom, and where each occurrence of $R^1$ is either H, alkyl, alkenyl, perfluoroalkyl, partially fluorinated alkyl, perfluorothioalkyl, or partially fluorinated thioalkyl so long as at least some of the $R^1$ comprise a perfluoroalkyl, partially fluorinated alkyl, perfluorothioalkyl, or partially fluorinated thioalkyl; and
   (b) an outer surface of the porous framework, wherein the perfluoroalkyl, partially fluorinated alkyl, perfluorothioalkyl, or partially fluorinated thioalkyl are located on the outer surface; or
   ii) a porous framework having an outer surface, the outer surface comprising a plurality of perfluoroalkyl moieties covalently attached to the outer surface.

2. The amphiphobic porous material of claim 1, part i), wherein at least some of the $R^1$ have a structure according to $R^2$;
   wherein $R^2$ is —$R^3SR^4$, where $R^3$ is none or an alkyl, and $R^4$ is a perfluoroalkyl or partially fluorinated alkyl; and
   wherein the $R^2$ are located on the outer surface.

3. The amphiphobic porous material of claim 2, wherein $R^3$ is a $C_2$-$C_6$ alkyl;
   and
   wherein $R^4$ is a $C_6$-$C_{12}$ perfluoroalkyl or partially fluorinated alkyl.

4. An amphiphobic porous material comprising a porous framework that is a metal organic framework comprising a plurality of metal atoms and a plurality of organic ligands coordinating the metal atoms to form the porous framework, the porous framework having an outer surface, the outer surface comprising a plurality of perfluoroalkyl moieties covalently attached to the outer surface.

5. The amphiphobic porous material of claim 4, wherein the organic ligands are selected from the group consisting of di-carboxylic acid ligands, tri-carboxylic acid ligands, azole ligands, and a combination thereof.

6. The amphiphobic porous material of claim 4, wherein each of the organic ligands comprise one or more reactive coupling groups and a covalent bond between each reactive coupling group and a respective second functional group on the perfluoroalkyl moieties.

7. The amphiphobic porous material of claim 6, wherein the reactive coupling groups are primary amines and the second functional groups are selected from the group consisting of amine-reactive linking groups such as isothiocyanates, isocyanates, acyl azides, NHS esters, sulfonyl chlorides, aldehydes, glyoxals, epoxides, oxiranes, carbonates, aryl halides, imidoesters, carbodiimides, anhydrides, and fluorophenyl esters.

8. The amphiphobic porous material of claim 6, wherein the reactive coupling groups are thiol groups and the second functional groups are selected from the group consisting of sulfhydryl reactive groups such as maleimides, haloacetyls, and pyridyl disulfides.

9. The amphiphobic porous material of claim 6, wherein the reactive coupling groups are photoreactive coupling groups such as aryl azides or diazirines.

10. The amphiphobic porous material of claim 6, wherein the reactive coupling groups are alkenes that reacted with a thiol on the perfluoroalkyl moieties to form a covalent bond.

11. The amphiphobic porous material of claim 4, wherein the metal organic framework comprises a product of a reaction between one or more reactive coupling groups and a second functional group on the perfluoroalkyl moieties to form a covalent bond.

12. The amphiphobic porous material of claim 11, wherein the reactive coupling groups are primary amines and the second functional groups are selected from the group consisting of amine-reactive linking groups, isothiocyanates, isocyanates, acyl azides, NHS esters, sulfonyl chlorides, aldehydes, glyoxals, epoxides, oxiranes, carbonates, aryl halides, imidoesters, carbodiimides, anhydrides, and fluorophenyl esters.

13. The amphiphobic porous material of claim 11, wherein the reactive coupling groups are thiol groups and the second functional groups are selected from the group consisting of sulfhydryl reactive groups, maleimides, haloacetyls, and pyridyl disulfides.

14. The amphiphobic porous material of claim 11, wherein the reactive coupling groups are photoreactive coupling groups of aryl azides or diazirines.

15. The amphiphobic porous material of claim 11, wherein the reactive coupling groups are alkenes that reacted with a thiol on the perfluoroalkyi moieties to form a covalent bond.

16. A method of making an amphiphobic porous material according to claim 1, the method comprising making a porous framework having an outer surface and having a plurality of reactive coupling groups;
applying bulky perfluoroalkyi moieties to the porous framework, wherein the bulky perfluoroalkyi moieties are selected such that they do not fit into the pores of the porous framework; and
reacting the perlfouralkyl moieties with the reactive coupling groups on the outer surface to form a covalent bond.

* * * * *